(12) United States Patent
Kori et al.

(10) Patent No.: US 8,256,014 B2
(45) Date of Patent: Aug. 28, 2012

(54) CONTENT PROCESSING DEVICE, SERVER DEVICE, COMMUNICATION METHOD, AND STORAGE MEDIUM CONTAINING COMPUTER PROGRAM

(75) Inventors: Takayuki Kori, Minato-ku (JP); Takashi Kawakami, Minato-ku (JP); Susumu Takatsuka, Minato-ku (JP); Hideo Tsukazaki, Minato-ku (JP); Kotaro Asaka, Minato-ku (JP)

(73) Assignee: Sony Corporation, Tokyo (JP)

( * ) Notice: Subject to any disclaimer, the term of this patent is extended or adjusted under 35 U.S.C. 154(b) by 1197 days.

(21) Appl. No.: 12/067,293

(22) PCT Filed: Sep. 29, 2006

(86) PCT No.: PCT/JP2006/319511
§ 371 (c)(1),
(2), (4) Date: Mar. 19, 2008

(87) PCT Pub. No.: WO2007/040184
PCT Pub. Date: Apr. 12, 2007

(65) Prior Publication Data
US 2009/0113560 A1    Apr. 30, 2009

(30) Foreign Application Priority Data
Oct. 4, 2005    (JP) .................................. 2005-291488

(51) Int. Cl.
*G06F 7/04*    (2006.01)
*G06F 21/00*    (2006.01)
*H04J 3/16*    (2006.01)
*G06F 21/24*    (2006.01)
*G11B 20/10*    (2006.01)

(52) U.S. Cl. .................. 726/29; 726/6; 726/28; 705/56; 705/57; 370/469

(58) Field of Classification Search .................... 726/29, 726/28, 6; 705/26, 57; 370/469
See application file for complete search history.

(56) References Cited

U.S. PATENT DOCUMENTS

2003/0210709 A1*  11/2003  Inoue ............................ 370/469
2005/0273399 A1*  12/2005  Soma et al. ..................... 705/26
2008/0184348 A1*   7/2008  Tanaka ............................. 726/6

FOREIGN PATENT DOCUMENTS

| EP | 1780654 A1 * | 5/2007 |
| JP | 2001 34520 | 2/2001 |
| JP | 2003 132232 | 5/2003 |
| JP | 2005 141635 | 6/2005 |

OTHER PUBLICATIONS

Kai Hwang; Kulkareni, S.; Yue Hu; "Cloud Security with Virtualized Defense and Reputation-Based Trust Mangement"; Dependable, Autonomic and Secure Computing, 2009. DASC '09. Eighth IEEE International Conference on Digital Object Identifier: 10.1109/DASC.2009.149; Publication Year: Apr. 2009, pp. 717-722.*

* cited by examiner

Primary Examiner — Eleni Shiferaw
Assistant Examiner — Courtney Fields
(74) Attorney, Agent, or Firm — Oblon, Spivak, McClelland, Maier & Neustadt, L.L.P.

(57) ABSTRACT

When a PC 10 connects to a PD 20, the PC 10 decides whether or not the PD 20 holds a group ID and if the PC 10 decides PD 20 holds the group ID, PC 10 decides whether or not the group ID held in the PC 10 and the group ID held in the PD 20 coincide with each other. If the both IDs are not decided that they don't coincide with each other, the PC 10 acquires a device ID corresponding to PD 20 from PD 20 and transfers the device ID and a terminal ID of the PC 10 to a server apparatus 32. Then the PC 10 receives, from the server apparatus 32, a user link completion information representative that an association between first user ID corresponding to the terminal ID and second user ID corresponding to the device ID is completed.

30 Claims, 32 Drawing Sheets

FIG.12

| USER ID 3241 | CREDIT CARD NUMBER 3242 | LEAF ID 3243 | APPARATUS ID 3244 | RECORDER ID 3245 | RELATED USER ID 3246 |
|---|---|---|---|---|---|
| USER ID-A (Yamada Taro) | XXX-XXXX | LEAF ID-A | TERMINAL ID1 | RECORDER ID1 | USER ID-B |
| | | | TERMINAL ID2 | RECORDER ID2 | USER ID-C |
| | | | DEVICE ID1 | — | — |
| | | | DEVICE ID2 | — | — |
| USER ID-B (Suzuki Jiro) | YYY-YYYY | LEAF ID-B | TERMINAL ID10 | RECORDER ID10 | USER ID-A |
| | | | DEVICE ID12 | — | — |
| | | | DEVICE ID13 | — | — |
| ... | ... | ... | ... | ... | ... |

CONTENT PROCESSING DEVICE, SERVER DEVICE, COMMUNICATION METHOD, AND STORAGE MEDIUM CONTAINING COMPUTER PROGRAM

TECHNICAL FIELD

This invention relates to a content processing apparatus, a server apparatus, a communication method and a storage medium having a computer program stored therein.

BACKGROUND ART

Different from a conventional analog content, a digital content of music and so forth can be copied by a plural number of times without any deterioration of the quality. Therefore, in recent years, together with popularization of the Internet and increase in speed and capacity of a PC (personal computer) and so forth, illegal distribution, exchange and so forth of a content without any approval of its author is increasing.

In order to prevent such illegal acts, a copyright management system which makes use of a DRM (Digital Rights Management; digital copyright management) which applies restrictions to circulation and utilization of a content is being popularized. In such a copyright management system as just mentioned, a method (hereinafter referred to as "check-in check-out system") which restricts utilization (reproduction, copying and so forth) of a content based on utilization conditions described in a license (right information) as proposed by the SDMI (Secure Digital Music Initiative) and so forth to manage the copyright of the content is popularly used (refer to, for example, Patent Document 1).

Patent Document 1: Japanese Patent Laid-Open No. 2003-296486

DISCLOSURE OF INVENTION

Technical Problem

However, such a copyright management system of the type which strictly manages the number of copies of an original content as described above adopts such a configuration that, upon copying of a content, an apparatus (content processing apparatus (PC), a content reproduction apparatus (PD) or the like) of a content user is connected to a management server which manages the total number of copies such that copying of the content is permitted/inhibited by this management server. Therefore, not only the performance of the apparatus of the content user, the interconnection scheme of a plurality of apparatus and so forth are limited, but also a copyright management process must be executed every time copying of a content is carried out, which is inefficient. Accordingly, the degree of freedom in content utilization is low, and particularly to a legal content user (in particular, to a person who pays a reasonable consideration to a content producing person and utilizes a content within the range of personal use), the degree of freedom in design where a plurality of apparatus are utilized to share a content is inconveniently low.

Therefore, the inventors of the present invention have investigated a copyright management system which executes copyright management of a group management system. In the copyright management system of the group management system, a plurality of apparatus (content processing apparatus and content reproduction apparatus) owned by the same user are group-registered in a unit of a user such that a content purchased by the user can be shared and utilized (reproduced, copied and so forth) freely among the group-registered apparatus.

However, the conventional copyright management system of the check-in check-out system described above and the copyright management system of the group management system investigated by the inventors of the present invention have a problem that it is impossible to mutually link a plurality of users (a user group within the range of personal use) such as intimate friends or families or, even if such link is possible, it is necessary to carry out a very complicated procedure. For example, with the copyright management system of the group management system, where a content reproduction apparatus (PD) owned by a different user is connected to a content processing apparatus (PC) of a certain user, only "A PD of another person has been connected" is displayed on the display screen of the PC, but both users cannot be linked as friends or the like.

Further, where a technique of linking a plurality of users simply using only a user ID inputted by each user as a key, there is no assurance that those users are really users within the range of private use, but there is the possibility that they may be quite strangers to each other. Thus, there is the possibility that the copyright management may not be implemented precisely.

Therefore, the present invention has been made in view of the problems described above, and it is an object of the present invention to provide a content processing apparatus, a server apparatus, a communication method and a storage medium having a computer program stored therein which are novel and improved in that, while copyright management functions precisely, a plurality of users who utilize a content within the range of personal use can be linked readily to each other thereby to improve the degree of freedom in content utilization.

Technical Solution

In order to solve the subject described above, according to a first aspect of the present invention, there is provided a content processing apparatus connectable to a content reproduction apparatus which can at least reproduce content data and capable of communicating with a server apparatus which manages the content reproduction apparatus and the content processing apparatus and recording and/or reproducing content data. This content processing apparatus includes a storage section configured to store a source ID list which is a list of source IDs for permitting reproduction from among source IDs representative of providing sources of content data and to which, when the content processing apparatus is registered in a unit of a user into the server apparatus, a group ID which is applied in a unit of a user is added as a source ID for permitting the reproduction; a content reproduction section configured to control reproduction of content data of a reproduction object based on whether or not the source ID added to the content data of the reproduction object is included in the source ID list; a registration decision section configured to decide, when the content processing apparatus itself and the content reproduction apparatus are connected to each other, whether or not the content reproduction apparatus holds a group ID which is applied in a unit of a user through registration of the content reproduction apparatus in a unit of a user into the server apparatus; an ID decision section configured to decide, where it is decided by the registration decision section that the content reproduction apparatus holds a group ID, whether or not the group ID held by the content reproduction apparatus and the group ID in the source ID list coincide with each other; an ID transfer section configured to transfer, where it is decided by the ID decision section that the group ID held by the content reproduction apparatus and the group ID in the source ID list do not coincide with each other, a device ID acquired from the content reproduction apparatus and corresponding to the content reproduction apparatus and a terminal ID stored in the content processing apparatus and corresponding to the content processing apparatus to the server apparatus; and a link result reception section configured to receive user link completion information representing that association of first user identification information corresponding to the transferred terminal ID and second user identification information corresponding to the transferred device ID is completed from the server apparatus.

The content processing apparatus may further include a registration requesting section configured to transfer, where it is decided by the registration decision section that the content reproduction apparatus do not hold the group ID, the device ID acquired from the content reproduction apparatus and corresponding to the content reproduction apparatus and the terminal ID of the content processing apparatus itself to the server apparatus to carry out registration request of the content reproduction apparatus; and a list management section configured to add, when a registration completion notification is received from the server apparatus in response to the registration request, the group ID in the source ID list held by the content processing apparatus to a source ID list held by the content reproduction apparatus.

Or, the content processing apparatus may further include a content transfer section configured to transfer, where it is decided by the ID decision section that the group ID held by the content reproduction apparatus and the group ID in the source ID list coincide with each other, one, two or more content data stored in the content processing apparatus to the content reproduction apparatus.

Or, the content processing apparatus may further include a list management section configured to add, when the user link completion information is received by the link result reception section, a group ID in a source ID list held by the content reproduction apparatus to the source ID list held by the content processing apparatus and add the group ID in the source ID list held by the content processing apparatus to the source ID list held by the content reproduction apparatus.

Or, the content processing apparatus may further include a related user content acquisition section configured to send a content distribution request for requesting for distribution of content data held by related users to the server apparatus and receive content data corresponding to one, two or more pieces of content identification information corresponding to one, two or more pieces of the second user identification information associated with the first identification information corresponding to the content processing apparatus from the server apparatus in response to the content distribution request.

Or, the content processing apparatus may further include a distributable content information acquisition section configured to send a distributable content accessing request for requesting for a table of distributable content data to the server apparatus and receive one, two or more pieces of content identification information corresponding to one, two or more pieces of the second user identification information associated with the first user identification information corresponding to the content processing apparatus from the server apparatus in response to the distributable content accessing request; and a display control section configured to cause a display section to display the content identification information received by the distributable content information acquisition section; the related user content acquisition section requesting for distribution of content data corresponding to content identification information selected by a user from within the content identification information displayed on the display section.

Or, the content processing apparatus may further include a reproduction history sending section configured to send a reproduction history of content data by the content reproduction section or a reproduction history of content data by the content reproduction apparatus connected to the content processing apparatus to the server apparatus; a reproduction history acquisition section configured to send a reproduction history accessing request for requesting for accessing to reproduction histories relating to related users and receive the reproduction history corresponding to one, two or more pieces of the second user identification information associated with the first user identification information corresponding to the content processing apparatus from the server apparatus in response to the reproduction history accessing request; and a display control section configured to cause a display section to display the reproduction history received by the reproduction history acquisition section.

Or, the content processing apparatus may further include a related user information acquisition section configured to send a related user accessing request for requesting for accessing to the second user identification information associated with the first user identification information corresponding to the content processing apparatus to the server apparatus and receive one, two or more pieces of the second user identification information coordinated with the first user identification information corresponding to the content processing apparatus from the server apparatus in response to the reproduction history accessing request; and a display control section configured to cause a display section to display the second user identification information received by the related user information acquisition section.

Further, in order to solve the subject described above, according to another aspect of the present invention, there is provided a server apparatus capable of communicating with a content processing apparatus which can record and/or reproduce content data and configured to manage the content processing apparatus and a content reproduction apparatus which can be connected to the content processing apparatus and can reproduce content data. This server apparatus includes a group registration section configured to record a terminal ID corresponding to the content processing apparatus or a device ID corresponding to the content reproduction apparatus in an associated relationship with user identification information corresponding to a user who owns the content processing apparatus or the content reproduction apparatus into a group registration database to group-register the content processing apparatus or the content reproduction apparatus in a unit of a user; an ID reception section configured to receive the device ID corresponding to the content reproduction apparatus connected to the content processing apparatus and the terminal ID corresponding to the content processing apparatus from the content processing apparatus; a user search section configured to search for first user identification information associated with the device ID received by the ID reception section and second user identification information associated with the terminal ID received by the ID reception section from the group registration database; a user link section configured to record the first user identification information and the second user identification information searched out by the user search section in an associated relationship with each other into the group registration database; and a link result sending section configured to send user link completion information representing that the association between the first and second user identification information by the user link section is completed to the content processing apparatus.

The server apparatus may be configured such that, when the device ID corresponding to the content reproduction apparatus and the terminal ID corresponding to the content processing apparatus are received from the content processing apparatus, the group registration section records the device ID in an associated relationship with the first user identification information associated with the terminal ID into the group management database thereby to group-register the content reproduction apparatus in an associated relationship with a user corresponding to the first user identification information and transmits a registration completion notification to the content processing apparatus.

Or, the server apparatus may further include a content distribution section configured to distribute one, two or more content data to the content processing apparatus and record content identification information corresponding to the distributed content data in an associated relationship with the user identification information into the content information database; and a related user content distribution section configured to search, when a content distribution request is received from the content processing apparatus, for one, two or more pieces of the second user identification information associated with the first user identification information corresponding to the content processing apparatus from the group registration database, read out one, two or more pieces of the content identification information corresponding to the searched out second user identification information from the distribution content information database and distribute content data corresponding to the content identification information to the content processing apparatus.

Or, the server apparatus may further include a distributable content information providing section configured to search, when a distributable content accessing request is received from the content processing apparatus, for one, two or more pieces of the second user identification information associated with the first user identification corresponding to the content processing apparatus from the group registration database, read out one, two or more pieces of content identification information corresponding to the searched out second user identification information from the distribution content database and send the read out content identification information to the content processing apparatus.

Or, the server apparatus may further include a reproduction history management section configured to receive a reproduction history of content data by the content reproduction apparatus or a reproduction history of content data by the content reproduction apparatus connected to the content processing apparatus from the content processing apparatus and record the received reproduction history in an associated relationship with the user identification information corresponding to the content processing apparatus into a reproduction history database; and a reproduction history providing section configured to search, when a reproduction history accessing request is received from the content processing apparatus, for one, two or more pieces of the second user identification information associated with the first user identification information corresponding to the content processing apparatus from the group registration database, read out the reproduction history corresponding to the searched out second user identification information from the reproduction history database and send the read out reproduction history to the content processing apparatus.

Or, the server apparatus may further include a related user information providing section configured to search, when a related user accessing request is received from the content processing apparatus, for one, two or more pieces of the second user identification information associated with the first user identification information corresponding to the content processing apparatus from the group registration database and send the searched out second user identification information to the content processing apparatus.

Further, in order to solve the subject described hereinabove, according to a further aspect of the present invention, there is provided a communication method for a content processing apparatus connectable to a content reproduction apparatus which can at least reproduce content data and capable of communicating with a server apparatus which manages the content reproduction apparatus and the content processing apparatus and recording and/or reproducing content data. This communication method includes a content reproduction step of controlling reproduction of content data of a reproduction object based on whether or not a source ID list which is a list of source IDs for permitting reproduction from among source IDs representative of providing sources of content data and to which, when the content processing apparatus is registered in a unit of a user into the server apparatus, a group ID which is applied in a unit of a user is added as a source ID for permitting the reproduction includes the source ID added to the content data of the reproduction object; a registration decision step of deciding, when the content processing apparatus itself and the content reproduction apparatus are connected to each other, whether or not the content reproduction apparatus holds a group ID which is applied in a unit of a user through registration of the content reproduction apparatus in a unit of a user into the server apparatus; an ID decision step of deciding, where it is decided by the registration decision step that the content reproduction apparatus holds a group ID, whether or not the group ID held by the content reproduction apparatus and the group ID in the source ID list coincide with each other; an ID transfer step of transferring, where it is decided by the ID decision step that the group ID held by the content reproduction apparatus and the group ID in the source ID list do not coincide with each other, a device ID acquired from the content reproduction apparatus and corresponding to the content reproduction apparatus and a terminal ID stored in the content processing apparatus and corresponding to the content processing apparatus to the server apparatus; and a link result reception step of receiving user link completion information representing that association of first user identification information corresponding to the transferred terminal ID and second user identification information corresponding to the transferred device ID is completed from the server apparatus.

The communication method may further include a registration requesting step of transferring, where it is decided by the registration decision step that the content reproduction apparatus do not hold the group ID, the device ID acquired from the content reproduction apparatus and corresponding to the content reproduction apparatus and the terminal ID of the content processing apparatus itself to the server apparatus to carry out registration request of the content reproduction apparatus; and an ID addition step of adding, when a registration completion notification is received from the server apparatus in response to the registration request, the group ID in the source ID list held by the content processing apparatus to a source ID list held by the content reproduction apparatus.

Or, the communication method may further include a content transfer step of transferring, where it is decided by the ID decision step that the group ID held by the content reproduction apparatus and the group ID in the source ID list coincide with each other, one, two or more content data stored in the content processing apparatus to the content reproduction apparatus.

Or, the communication method may further include an ID addition step of adding, when the user link completion information is received by the link result reception step, a group ID in a source ID list held by the content reproduction apparatus to the source ID list held by the content processing apparatus and adding the group ID in the source ID list held by the content processing apparatus to the source ID list held by the content reproduction apparatus.

Or, the communication method may further include a content distribution requesting step of sending a content distribution request for requesting for distribution of content data held by related users to the server apparatus; and a related user content acquisition step of receiving content data corresponding to one, two or more pieces of content identification information corresponding to one, two or more pieces of the second user identification information associated with the first identification information corresponding to the content processing apparatus from the server apparatus in response to the content distribution request.

Or, the communication method may further include a distributable content accessing requesting step of sending a distributable content accessing request for requesting for a table of distributable content data to the server apparatus; a distributable content information acquisition step of receiving one, two or more pieces of content identification information corresponding to one, two or more pieces of the second user identification information associated with the first user identification information corresponding to the content processing apparatus from the server apparatus in response to the distributable content accessing request; and a display step of causing a display section to display the content identification information received by the distributable content information acquisition step; the related user content acquisition step including requesting for distribution of content data corresponding to content identification information selected by a user from within the content identification information displayed on the display section.

Or, the communication method may further include a reproduction history sending step of sending a reproduction history of content data by the content reproduction apparatus or a reproduction history of content data by the content reproduction apparatus connected to the content processing apparatus to the server apparatus; a reproduction history accessing requesting step of sending a reproduction history accessing request for requesting for accessing to reproduction histories relating to related users; a reproduction history acquisition step of receiving the reproduction history corresponding to one, two or more pieces of the second user identification information associated with the first user identification information corresponding to the content processing apparatus from the server apparatus in response to the reproduction history accessing request; and a display step of causing a display section to display the reproduction history received by the reproduction history acquisition step.

Or, the communication method may further include a related user accessing requesting step of sending a related user accessing request for requesting for accessing to the second user identification information associated with the first user identification information corresponding to the content processing apparatus to the server apparatus; a related user information acquisition step of receiving one, two or more pieces of the second user identification information coordinated with the first user identification information corresponding to the content processing apparatus from the server apparatus in response to the reproduction history accessing request; and a display step of causing a display section to display the second user identification information received by the related user information acquisition step.

Further, in order to solve the subject described hereinabove, according to a still further aspect of the present invention, there is provided a communication method for a server apparatus capable of communicating with a content processing apparatus which can record and/or reproduce content data and configured to manage the content processing apparatus and a content reproduction apparatus which can be connected to the content processing apparatus and can reproduce content data. This communication method includes a group registration step of recording a terminal ID corresponding to the content processing apparatus or a device ID corresponding to the content reproduction apparatus in an associated relationship with user identification information corresponding to a user who owns the content processing apparatus or the content reproduction apparatus into a group registration database to group-register the content processing apparatus or the content reproduction apparatus in a unit of a user; an ID reception step of receiving the device ID corresponding to the content reproduction apparatus connected to the content processing apparatus and the terminal ID corresponding to the content processing apparatus from the content processing apparatus; a user search step of searching for first user identification information associated with the device ID received by the ID reception step and second user identification information associated with the terminal ID received by the ID reception step from the group registration database; a user link step of recording the first user identification information and the second user identification information searched out by the user search step in an associated relationship with each other into the group registration database; and a link result sending step of send user link completion information representing that the association between the first and second user identification information by the user link step is completed to the content processing apparatus.

The group recording step may include a step of receiving the device ID corresponding to the content reproduction apparatus and the terminal ID corresponding to the content processing apparatus from the content processing apparatus; and a step of recording the device ID in an associated relationship with the first user identification information associated with the terminal ID into the group management database thereby to group-register the content reproduction apparatus in an associated relationship with a user corresponding to the first user identification information and transmitting a registration completion notification to the content processing apparatus.

Or, the communication method may further include a content distribution step of distributing one, two or more content data to the content processing apparatus and recording content identification information corresponding to the distributed content data in an associated relationship with the user identification information into the content information database; a content distribution request reception step of receiving a content distribution request from the content processing apparatus; and a related user content distribution step of searching for one, two or more pieces of the second user identification information associated with the first user identification information corresponding to the content processing apparatus of the distribution request source from the group registration database, reading out one, two or more pieces of the content identification information corresponding to the searched out second user identification information from the distribution content information database and distributing content data corresponding to the content identification information to the content processing apparatus.

Or, the communication method may further include a distributable content accessing request reception step of receiving a distributable content accessing request from the content processing apparatus; and a distributable content information providing step of searching for one, two or more pieces of the second user identification information associated with the first user identification corresponding to the content processing apparatus of the accessing request source from the group registration database, reading out one, two or more pieces of content identification information corresponding to the searched out second user identification information from the distribution content database and sending the read out content identification information to the content processing apparatus.

Or, the communication method may further include a reproduction history management step of receiving a reproduction history of content data by the content reproduction apparatus or a reproduction history of content data by the content reproduction apparatus connected to the content processing apparatus from the content processing apparatus and recording the received reproduction history in an associated relationship with the user identification information corresponding to the content processing apparatus into a reproduction history database; a reproduction history accessing request reception step of receiving a reproduction history accessing request from the content processing apparatus; and a reproduction history providing step of searching for one, two or more pieces of the second user identification information associated with the first user identification information corresponding to the content processing apparatus of the accessing request source from the group registration database, reading out the reproduction history corresponding to the searched out second user identification information from the reproduction history database and sending the read out reproduction history to the content processing apparatus.

Or, the communication method may further include a related user accessing request reception step of receiving a related user accessing request from the content processing apparatus; and a related user information providing step of searching for one, two or more pieces of the second user identification information associated with the first user identification information corresponding to the content processing apparatus from the group registration database and sending the searched out second user identification information to the content processing apparatus.

Further, in order to solve the subject described hereinabove, according to a further aspect of the present invention, there is provided a storage medium in which a computer program is stored, the computer program causing a content processing apparatus, which is connectable to a content reproduction apparatus which can at least reproduce content data and capable of communicating with a server apparatus which manages the content reproduction apparatus and the content processing apparatus and recording and/or reproducing content data, to execute: a content reproduction process of controlling reproduction of content data of a reproduction object based on whether or not a source ID list which is a list of source IDs for permitting reproduction from among source IDs representative of providing sources of content data and to which, when the content processing apparatus is registered in a unit of a user into the server apparatus, a group ID which is applied in a unit of a user is added as a source ID for permitting the reproduction includes the source ID added to the content data of the reproduction object; a registration decision process of deciding, when the content processing apparatus itself and the content reproduction apparatus are connected to each other, whether or not the content reproduction apparatus holds a group ID which is applied in a unit of a user through registration of the content reproduction apparatus in a unit of a user into the server apparatus; an ID decision process of deciding, where it is decided by the registration decision process that the content reproduction apparatus holds a group ID, whether or not the group ID held by the content reproduction apparatus and the group ID in the source ID list coincide with each other; an ID transfer process of transferring, where it is decided by the ID decision process that the group ID held by the content reproduction apparatus and the group ID in the source ID list do not coincide with each other, a device ID acquired from the content reproduction apparatus and corresponding to the content reproduction apparatus and a terminal ID stored in the content processing apparatus and corresponding to the content processing apparatus to the server apparatus; and a link result reception process of receiving user link completion information representing that association of first user identification information corresponding to the transferred terminal ID and second user identification information corresponding to the transferred device ID is completed from the server apparatus.

Further, in order to solve the subject described above, according to a yet further aspect of the present invention, there is provided a storage medium in which a computer program is stored, the computer program causing a server apparatus, which is capable of communicating with a content processing apparatus which can record and/or reproduce content data and is configured to manage the content processing apparatus and a content reproduction apparatus which can be connected to the content processing apparatus and can reproduce content data, to execute: a group registration process of recording a terminal ID corresponding to the content processing apparatus or a device ID corresponding to the content reproduction apparatus in an associated relationship with user identification information corresponding to a user who owns the content processing apparatus or the content reproduction apparatus into a group registration database to group-register the content processing apparatus or the content reproduction apparatus in a unit of a user; an ID reception process of receiving the device ID corresponding to the content reproduction apparatus connected to the content processing apparatus and the terminal ID corresponding to the content processing apparatus from the content processing apparatus; a user search process of searching for first user identification information associated with the device ID received by the ID reception process and second user identification information associated with the terminal ID received by the ID reception process from the group registration database; a user link process of recording the first user identification information and the second user identification information searched out by the user search process in an associated relationship with each other into the group registration database; and a link result sending process of send user link completion information representing that the association between the first and second user identification information by the user link process is completed to the content processing apparatus.

By such a configuration as described above, a user who owns a content processing apparatus and a different user who owns a content reproduction apparatus are linked to each other under the condition that the content processing apparatus and the content reproduction apparatus can be physically connected to each other at short distances. By this, the users can be linked to each other by a simple operation of connecting the content processing apparatus and the PD 20 to each other, and copyright management can be executed precisely while users of an object of the user link are restricted to persons who have a relationship that a content processing apparatus and a content reproduction apparatus of them can be physically connected to each other, for example, to such acquaintances as intimate friends or families.

Advantageous Effects

As described above, since, while copyright management functions precisely, a plurality of users who utilize a content within the range of personal use can be linked readily to each other, the degree of freedom in content utilization can be improved.

BRIEF DESCRIPTION OF DRAWINGS

FIG. 12 is an explanatory view illustrating a data structure of a group registration database according to the embodiment;

BEST MODES FOR CARRYING OUT THE INVENTION

Figure 1:
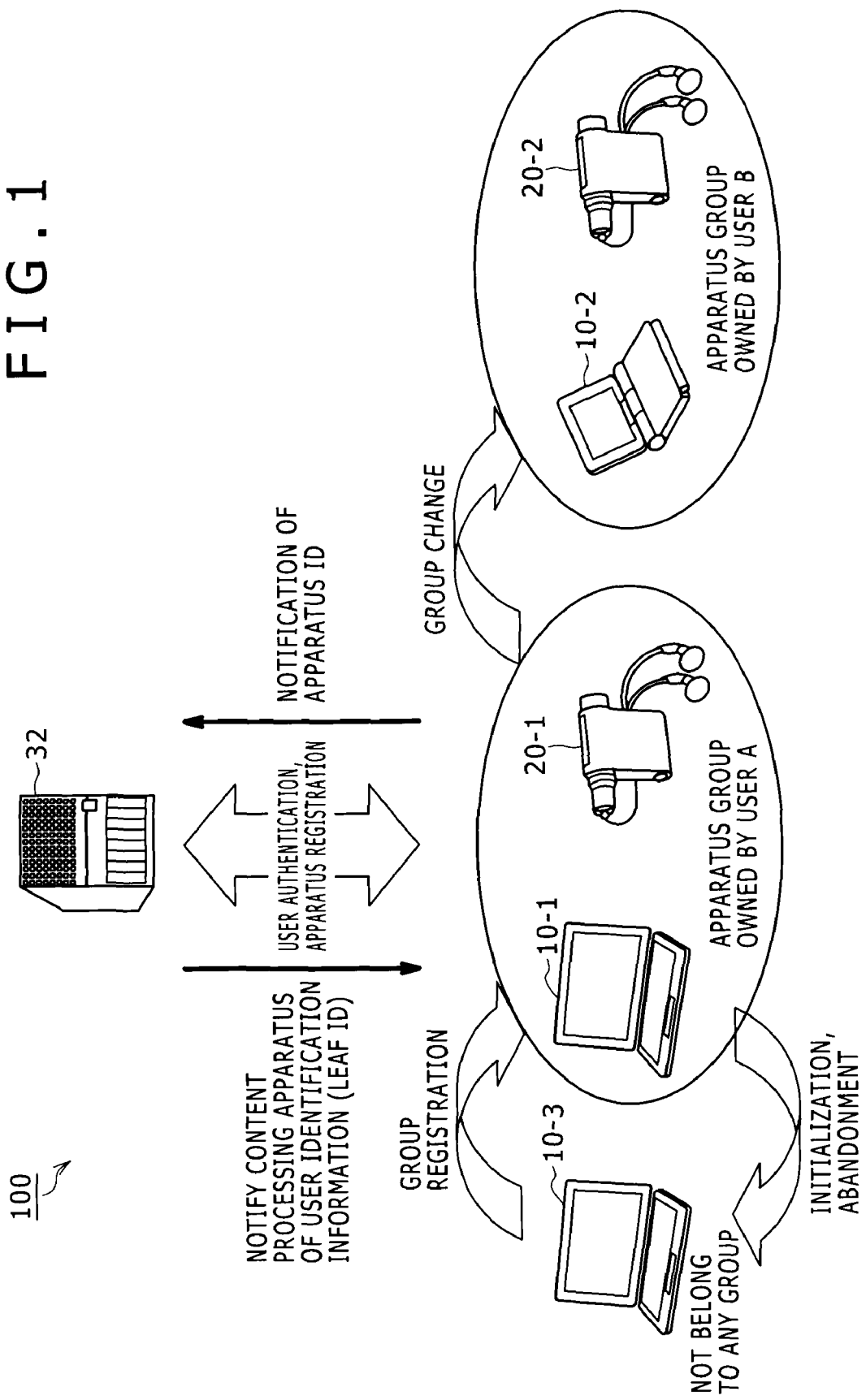
FIG. 1 is an explanatory view illustrating an outline of group registration of a copyright management system according to a first embodiment of the present invention.

In the following, preferred embodiments of the present invention are described in detail with reference to the accompanying drawings. It is to be noted that, in the present specification and the drawings, components having substantially same functional configuration are denoted by same reference characters and overlapping description of them is omitted herein.

First Embodiment

In the following, a copyright management system of a group management system according to a first embodiment of the present invention and components of the copyright management system are described.

<1. Outline of Copyright Management of the Group Management System>

First, an outline of the copyright management system of the group management system according to the embodiment is described.

The copyright management system of the group management system is configured so as to manage utilization of content data (hereinafter referred to as "content") between a plurality of apparatus (a content processing apparatus such as a PC and a content reproduction apparatus such as a PD or the like). In particular, the present copyright management system restricts utilization of a content between apparatus owned by different users in order to prevent illegal utilization of a content such as mass distribution of a content or the like through the Internet or the like with certainty.

Meanwhile, the present copyright management system allows a plurality of apparatus owned by the same user to share and utilize a content freely to some degree.

In this manner, the copyright management system according to the present embodiment adopts a copyright management system which permits, while carrying out copyright management, sharing of a content within private utilization so that the convenience and the degree of freedom in content sharing between a plurality of apparatus owned by the same user may be raised.

In the copyright management system which relies upon the "check-in check-out system" conforming to the SDMI described hereinabove, the number of copies (number of times of check-in and check-out) of a content is restricted in a "content unit" based on a license, which is right information which prescribes the authority of utilization of the content, to restrict illegal utilization of the content. Since, in such a system as just described, a copyright management process must be carried out every time a content is copied (check-in and check-out) between a plurality of apparatus, the system is disadvantageous in that it is complicated in system configuration, reduced in processing speed and is low in degree of freedom in content utilization within a range of private use and hence lacks in convenience. Further, in such a conventional copyright management system of the check-in check-out system as just described, a user must utilize the system while normally being conscious of the copy source or the number of times of copying of a content. Further, "copy prevention of a content on an apparatus owned by a different person" which is an original object of the copyright management system has not been implemented as yet.

On the other hand, the copyright management system of the group management system carries out such copyright management that the unit of management of content utilization is a "providing source (source; source) unit of a content" (particularly a "unit of a user by whom a content is owned first" or a "unit of an apparatus by which a content is produced") and reproduction of a content by each apparatus is permitted/inhibited in response to the providing source of the content.

More particularly, in the copyright management system of the group management system, a plurality of apparatus owned by each user are group-registered in a unit of a user into a group management server, and reproduction of a content is controlled based on a source ID representative of the providing source of the content and a source ID list by each of the group-registered apparatus. Consequently, between the apparatus registered in the apparatus group of the same user, a content of the same providing source can be copied and reproduced freely.

Further, contents in the present embodiment may be arbitrary contents such as, for example, sound (Audio) contents of music, a lecture, a radio program and so forth, image (Video) contents formed from still pictures or moving pictures which form a movie, a television program, a video program, a photograph, a picture, a chart and so forth, electronic books (E-book), games and software. In the following, while description is given taking, as an example of a content, a music content, particularly a music content distributed from a distribution server or a music content ripped from a music CD, the present invention is not limited to the example. Further, a content according to the present embodiment may be, for example, a copyright management object content, that is, a content whose copyright is managed in accordance with a copyright management system such as a chick-in check-out system or a group management system or may be a content which is not under copyright management.

Here, an outline of group registration in such a copyright management system of the group management system as described above is described with reference to FIG. 1. It is to be noted that FIG. 1 is an explanatory view illustrating an outline of group registration of the copyright management system according to the present embodiment.

As shown in FIG. 1, content processing apparatus (PC) 10-1 and 10-2 and content reproduction apparatus (PD) 20-1 and 20-2 are grouped, for example, into an apparatus group owned by a user A (content processing apparatus 10-1 and content reproduction apparatus 20-1) and another apparatus group owned by another user B (content processing apparatus 10 and content reproduction apparatus 20-2). Such grouping of the apparatus is carried out by group-registering the content processing apparatus 10 and the content reproduction apparatus 20 in a unit of a user into a group management server 32.

This group registration is described particularly taking the content processing apparatus (PC) 10-1 owned by the user A as an example. First, the user A uses the content processing apparatus 10-1 owned by the user A itself to access the group management server 32 to perform a user authentication process and sends a device ID (for example, a terminal ID) of the content processing apparatus 10-1 to the group management server 32. Then, the group management server 32 stores the device ID of the content processing apparatus 10-1 in an associated relationship with the user A and group-registers the content processing apparatus 10-1 into the apparatus group of the user A. Further, the group management server 32 sends user identification information representative of the user A (for example, a leaf ID hereinafter described) to the content processing apparatus 10-1, and the content processing apparatus 10-1 stores the received user identification information into storage means of the content processing apparatus 10-1 itself. Similarly, also the other content processing apparatus 10 is group-registered into an apparatus group of the user B. Further, the group registration of the content reproduction apparatus (PD) 20 is performed through the content processing apparatus (PC) 10.

In such group registration as described above, one apparatus (content processing apparatus 10 or content reproduction apparatus 20) can be registered only into an apparatus group of a single user but cannot be registered into an apparatus group of a different user simultaneously. Accordingly, if the owner of a content processing apparatus 10 is changed from the user A to the user B, then it is necessary to change the group registration of the content processing apparatus 10, that is, to carry out cancellation of the registration from the apparatus group of the user A and re-registration into the apparatus group of the user B.

Further, for example, if the user A newly purchases a content processing apparatus 10-3, then since the content processing apparatus 10-3 is in a state wherein it belongs to no group, it can be group-registered into the apparatus group of the user A in a similar manner as described above. On the other hand, it is possible to cancel the group registration of the content processing apparatus 10-1, which is already registered in the apparatus group of the user A, to place the content processing apparatus 10-1 into a non-group belonging state.

In this manner, in the copyright management system 100 of the group management system, each apparatus is group-registered in a unit of a user who owns the apparatus in the group management server 32. As a result, between apparatus registered in an apparatus group of the same user, a content can be shared freely. Meanwhile, between apparatus registered in apparatus groups of different users, a content cannot be shared.

Here, an outline of copyright management of the group management system is described with reference to FIG. 2. It is to be noted that FIG. 2 is a block diagram showing principal components of the copyright management system according to the present embodiment.

Figure 2:
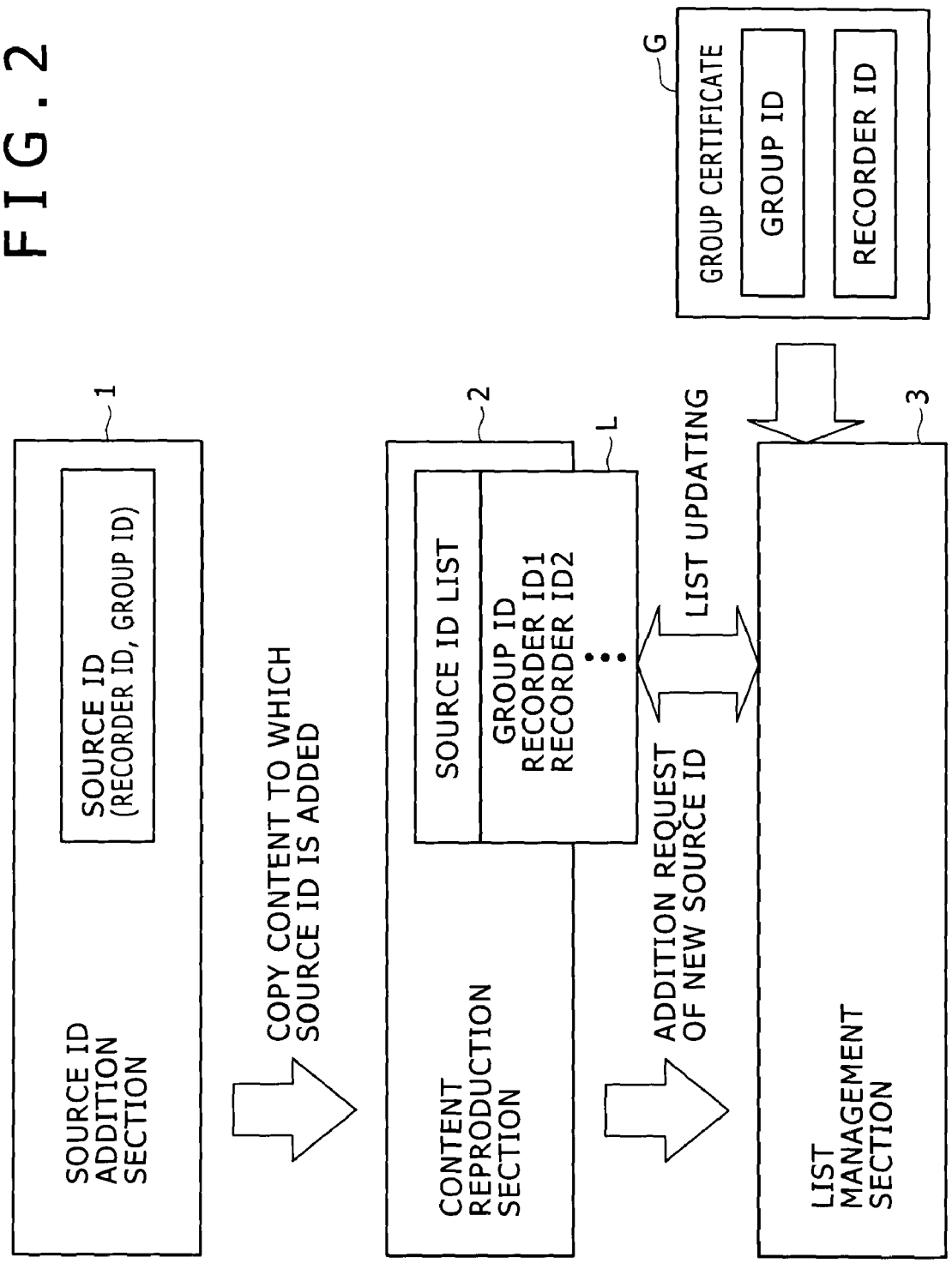
FIG. 2 is a block diagram showing principal components of the copyright management system according to the embodiment.

As shown in FIG. 2, the copyright management system according to the present embodiment includes a source ID addition section 1, a content reproduction section 2 and a list management section 3 as principal components thereof.

The source ID addition section 1 is provided, for example, in each content processing apparatus 10 or the like and has a function of adding, to a content, a source ID representative of a providing source of the content. It is to be noted that "adding a source ID to a content" signifies to associate the source ID with the content and includes a process of adding data of a source ID in a file (content file) including content data, a process of associating the content file and a file which includes data of the source ID with each other, and so forth.

Meanwhile, the "providing source (source) of a content" signifies a source of a content shared in the copyright management system 100 on the personal user level. In particular, the providing source of a content is, for example, (1) a user who utilizes a content distribution service to acquire (purchase or the like) a content, (2) a content processing apparatus 10 which produces a content by ripping, recording or the like, and so forth. The source ID is an identifier applied uniquely to each of such content providing sources. By applying a source ID to a content, the providing source of the content circulated in the system can be specified.

In the present embodiment, a recorder ID and a group ID are used as such a source ID as described above. The recorder ID is a source ID where a content processing apparatus 10 is a providing source of a content, and the group ID is a source ID where a user is a providing source of a content.

The recorder ID is an identifier applied uniquely in a unit of a content processing apparatus 10 having a function of ripping (ripping) a content. This recorder ID is produced by the content processing apparatus 10 based on the device ID or the like of a content processing apparatus 10 having the ripping function and is retained safely in the content processing apparatus 10. The content processing apparatus 10 applies a recorder ID of the content processing apparatus 10 itself to a ripped content ripped from a removable storage medium such as a music CD. Accordingly, from such a recorder ID as just described, the content processing apparatus 10 of the source of production of the ripped content (that is, the providing source of the content) can be specified.

Meanwhile, the group ID is an identifier applied uniquely in a unit of a user who owns content processing apparatus 10 and/or content reproduction apparatus 20. In particular, the group ID is applied in a unit of a user account of a content sharing service provided by the copyright management system. From such a group as just described, an apparatus group to which the content processing apparatus 10 or content reproduction apparatus 20 belongs and an owner of them can be identified.

In the present embodiment, this group ID is produced based on a leaf ID (leaf ID), for example, upon group registration of a content processing apparatus 10 or upon reception of a distribution content, for example, by the content processing apparatus 10. The leaf ID is an identifier applied in a unit of a user and is produced by the group management server 32, for example, upon user registration into the group management server 32. Such a leaf ID as just described is formed as an example of user identification information and is conveyed from the group management server 32 to the content processing apparatus 10 upon group registration of each apparatus or upon content distribution.

Each content processing apparatus 10 produces a group ID based on a leaf ID or a service ID conveyed from the group management server 32. This service ID is an ID unique in a unit of a content distribution service or a ripping content sharing service implemented by the copyright management system 100. Here, the content distribution service is a service of distributing a content from a content distribution server to the content processing apparatus 10. Meanwhile, the ripping content sharing service is a service of making it possible to share a ripped content among a plurality of content processing apparatus 10 and content reproduction apparatus 20 owned by the same user.

For example, where the content distribution service and the ripping content sharing service are not managed separately from each other and a service ID common to both services is used, a service ID and a leaf ID are coupled in the following manner to produce one group ID:

"group ID"="service ID"+"leaf ID"

Meanwhile, where the content distribution service and the ripping content sharing service are managed separately from each other, a content distribution service ID unique in a unit of a content distribution service and a ripping content sharing service ID unique in a unit of a ripping content sharing service are produced. Therefore, the service ID and the leaf ID of the services are coupled in the following manner to produce two different group IDs corresponding to the individual services:

"first group ID"="content distribution service ID"+ "leaf ID"

"second group ID"="ripping content sharing service ID"+ "leaf ID"

The first group ID is applied to a distribution content distributed from a content distribution server in order to identify a user who purchases the distribution content. Meanwhile, the second group ID is used as a criterion for decision of whether or not addition of a recorder ID should be permitted when it is intended to add the recorder ID to a source ID list hereinafter described in order to share a ripped content among the content processing apparatus 10 and content reproduction apparatus 20.

Although, in the present embodiment, for example, the latter technique wherein the first group ID and the second group ID are produced is adopted, in the following description, the first group ID and the second group ID are represented as group ID for the convenience of description.

Such a group ID as just described is added to a distribution content distributed from a content distribution server, for example, by a content processing apparatus 10. By applying the group ID to the distribution content in this manner, it becomes possible to identify a user who purchases the distribution content (that is, a providing source of the content).

A content to which a source ID (recorder ID and group ID) is added by the content addition section 1 which a content processing apparatus 10 has as described above can be copied freely among the content processing apparatus 10 and content reproduction apparatus 20. In particular, in the copyright management system of the group management system, such a restriction process of the number of times of copying as in a conventional copyright management system of the check-in check-out system is not carried out upon copying of a content to which a source ID is added (that is, a content of a copyright management object).

The content reproduction section 2 is formed from a reproduction machine, reproduction software or the like for a content and is provided in a content processing apparatus 10 or a content reproduction apparatus 20. The content reproduction section 2 has a source ID list L to which a source ID of a content whose reproduction is permitted by the content reproduction section is added. The source ID list L is provided for each content reproduction section 2, and if the content reproduction section 2 is different, then also the source ID included in the source ID list L thereof is different.

The content reproduction section 2 checks, when a content to which the source ID is applied is to be reproduced, the source ID list L to enable/disable reproduction of the content. In particular, if the source ID added to the content is included in the source ID list L, then the content reproduction section 2 can reproduce the content, but if the source ID added to the content is not included in the source ID list L, then the content reproduction section 2 cannot reproduce the content. In this manner, the content reproduction section 2 controls reproduction of a content in a unit of a source ID, that is, in a unit of a content providing source.

Further, the content reproduction section 2 can request, for example, the list management section 3 to add a new source ID to the source ID list L which the content reproduction section 2 has. In particular, in order for the content reproduction section 2 to reproduce a content to which a new source ID which is not included in the source ID list L which the content reproduction section 2 has is applied, it is necessary for the content reproduction section 2 to add the new source ID to the source ID list L. To this end, the content reproduction section 2 requests the list management section 3, which permits updating of the source ID list L, to permit addition of the new source ID.

The list management section 3 is provided, for example, in a content processing apparatus 10 and updates the source ID list L retained by the content reproduction section 2. Here, the updating of the source ID list L is addition or deletion of a source ID to or from the source ID list L. The list management section 3 can enable/disable reproduction of a content to which a source ID is added by the content reproduction section 2 by adding/deleting the source ID to/from the source ID list L.

Such a list management section 3 as described above acquires a group certificate (Group Certificate) G which is sharing information by which a group ID and a recorder ID are associated with each other and updates the source ID list L based on the group certificate G. In particular, the list management section 3 adds a group ID included in the group certificate G to the source ID list L if the group ID included in the group certificate G is same as the group ID included in the source ID list L. Consequently, the recorder ID of the content processing apparatus 10 registered in an apparatus group of the same user can be added to the source ID list L to allow reproduction of a ripped content ripped by the content processing apparatus 10.

As described above, in the copyright management system 100 according to the present embodiment, reproduction of a content by the content processing apparatus 10 and the content reproduction apparatus 20 is controlled by the source ID addition section 1, content reproduction section 2 and list management section 3 to manage the copyright of a content to be copied between the content processing apparatus 10. An outline of the copyright management system of the group management system is described as above.

<2. System Configuration>

Now, a general configuration of the copyright management system 100 according to the present embodiment is described. It is to be noted that FIG. 3 is a block diagram schematically showing a general configuration of the copyright management system 100 according to the present embodiment.

Figure 3:
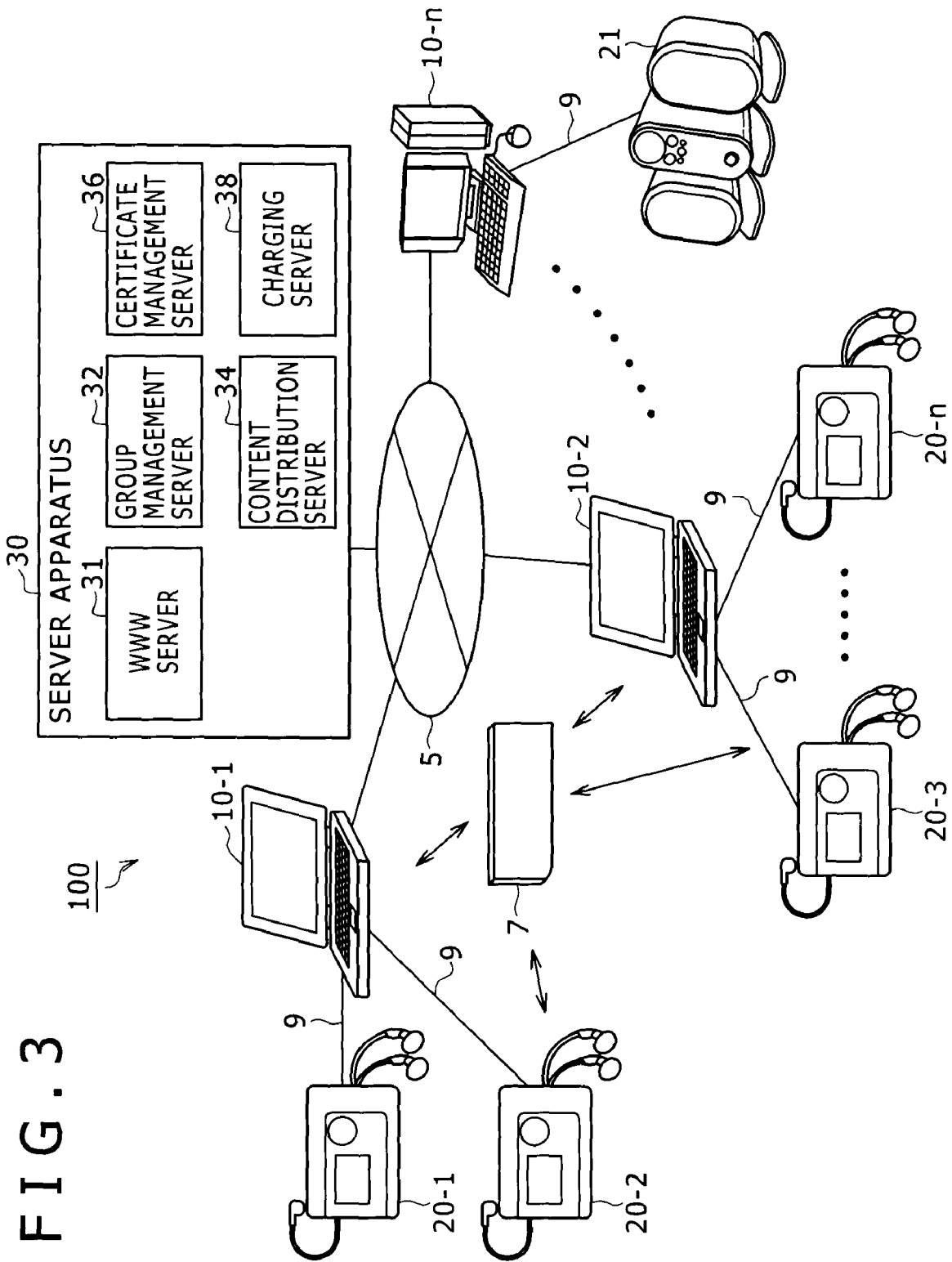
FIG. 3 is a block diagram schematically showing a general configuration of the copyright management system according to the embodiment.

As shown in FIG. 3, the copyright management system 100 according to the present embodiment includes a plurality of content processing apparatus 10-21, 2, . . . , n (which may each be hereinafter referred to generally as "content processing apparatus 10" or "PC 10") each formed, for example, from an information processing apparatus (PC), a plurality of content reproduction apparatus 20-1, 2, . . . , n (which may each be hereinafter referred to generally as "content reproduction apparatus 20" or "PD 20") each formed from a portable reproduction apparatus (PD), a content reproduction apparatus 21 formed from a reproduction apparatus of the installed type, a server apparatus 30, a network 5 and a local line 9 which connect the apparatus mentioned to each other, and a removable storage medium 7. Further, the server apparatus 30 includes a WWW (World wide Web) server 31, a group management server 32, a content distribution server 34, a certificate management server 36, a charging server 38 and so forth.

Each content processing apparatus 10 is an apparatus which can record and reproduce a content. More particularly, the content processing apparatus 10 is formed from an information processing apparatus such as a computer apparatus (irrespective of whether it is of the notebook type or the desk top type) such as, for example, a personal computer (PC) or the like. However, the content processing apparatus 10 is not limited to such an apparatus as just mentioned, but may be formed, for example, from a PDA (Personal Digital Assistant), a home game machine, an information home appliance or the like only if it is an apparatus which has a communication function through the network 5.

The content processing apparatus 10 can be connected for communication with the server apparatus 30, for example, through the network 5. This content processing apparatus 10 can install, for example, software for a content distribution service or software for a ripping content sharing service. By this, the content processing apparatus 10 can acquire a content (hereinafter referred to as "distribution content") distributed from the server apparatus 30 and record the distribution content into recording means such as a storage apparatus or a removable storage medium 7.

Further, the content processing apparatus 10 can newly produce a content, for example, by self recording (self sound recording, self image recording or the like), ripping or the like and record the content into the storage apparatus or the removable storage medium 7. It is to be noted that the self recording signifies recording of an image/sound or the like picked up/collected by an image pickup apparatus/sound collection apparatus retained by the content processing apparatus 10 itself as digital data of the image/sound. Meanwhile, the ripping signifies extracting content data (sound data, image data or the like) of the digital form recorded on a recording medium such as a music CD, a video DVD or a software CD-ROM, converting the content data into data of a file format which can be processed by a computer and recording the data of the file format into the storage apparatus or the storage medium 7.

The content processing apparatus 10 can compression code the distribution content and the ripped content in accordance with a predetermined compression coding method such as, for example, the ATRAC3 (Advanced Transform Acoustic Coding) method or the MP3 (MPEG Audio Layer-3) method and encrypt and record the compression coded distribution content or ripped content in accordance with an encryption method such as the DES (Data Encryption Standard).

Further, the content processing apparatus 10 can send and receive the distribution content or ripped content to and from another content processing apparatus 10 or a content reproduction apparatus 20 through the network 5 or the local line 9 or can communicate the distribution content or ripped content with another content processing apparatus 10 or a content reproduction apparatus 20 through a storage medium 7. By this, a content can be provided/acquired between or among a plurality of content processing apparatus 10 and/or content reproduction apparatus 20 so that it is shared.

Further, the content processing apparatus 10 is group-registered in the group management server 32 connected through the network 5. Further, the content processing apparatus 10 has components corresponding, for example, to such a source ID addition section 1, a content reproduction section 2 and a list management section 3 as described hereinabove and is configured so as to be ready for the copyright management system of the group management system described hereinabove.

The content reproduction apparatus 20 is formed, for example, from a portable device (PD) which is a content reproduction apparatus of the portable type. More particularly, the content reproduction apparatus 20 is formed from a portable audio player or the like which includes a hard disk drive (HDD) having a storage capacity of, for example, several tens GB. However, the content reproduction apparatus 20 is not limited to such an example as just described, but may be any of various portable apparatus such as a portable video/audio player, a PDA, a portable telephone set or a PHS. Further, the storage medium in the content reproduction apparatus 20 or the removable storage medium 7 loadable into the content reproduction apparatus 20 is not limited to a HDD, but may be any randomly accessible storage medium such as an optical disk, a magneto-optical disk, a flash memory, a FeRAM and a magnetic memory. It is to be noted that the content reproduction apparatus 20 may be a machine only for content reproduction.

The content reproduction apparatus 20 can be locally connected to a content processing apparatus 10, for example, through the local line 9, and can communicate various data with the content processing apparatus 10. The local line 9 is formed from a wire cable such as, for example, a USB (Universal Serial Bus) cable or a SCCI (Small Computer System Interface) cable. It is to be noted that the content processing apparatus 10 and the content reproduction apparatus 20 may be configured for data communication by radio communication.

Such a content reproduction apparatus 20 as described above can reproduce a content transferred thereto from a content processing apparatus 10 through the local line 9 or a content provided by a storage medium 7.

Further, the content reproduction apparatus 20 is group-registered into the group management server 32 through a content processing apparatus 10. The content reproduction apparatus 20 includes, for example, a configuration corresponding to the content reproduction section 2 described hereinabove, and is configured so as to be ready for the copyright management system of the group management system described hereinabove.

Meanwhile, the reproduction apparatus 21 of the installation type is a content reproduction apparatus of the installation type. This installation type reproduction apparatus 21 has a function substantially same as that of the content reproduction apparatus 20 which is a portable reproduction apparatus described hereinabove. In the following description, an example principally of a portable reproduction apparatus as the content reproduction apparatus is described in detail while the description is applicable also to the content reproduction apparatus 21.

The server apparatus 30 is formed from a computer apparatus or the like which includes a server function. This server apparatus 30 includes, for example, a WWW server 31, a group management server 32, a content distribution server 34, a certificate management server 36 and an charging server 38.

The WWW server 31 establishes communication with a content processing apparatus 10 connected thereto through a network and carries out a user registration process, a user authentication process and so forth. When user authentication is completed, the WWW server 31 connects the content processing apparatus 10 to the group management server 32 or the content distribution server 34.

The group management server 32 group-registers a content processing apparatus 10 and a content reproduction apparatus 20 in a unit of a user in response to a user registration request from a content processing apparatus 10 retained by a user having a user registration.

The content distribution server 34 is a server for providing a content distribution service and distributes a content to a content processing apparatus 10 owned by a user through the network 5 in response to a distribution request from the content processing apparatus 10. The content distribution server 34 is, for example, an EMD server or the like which provides an electronic music distribution (EMD: Electronic Music Distribution) service. The content distribution server 34 compression codes a music content of a distribution object in accordance with a compression coding method such as, for example, the ATRAC3 method or the MP3 method and then encrypts the compression coded music content in accordance with an encryption method such as the DES, and then distributes the encrypted music content to the content processing apparatus 10. Further, the content distribution server 34 encrypts a content key for decrypting the encrypted distribution content together with the distribution content to the content processing apparatus 10.

The certificate management server 36 acquires and manages a group certificate G issued from each content processing apparatus 10 and distributes the acquired group certificate G to those content processing apparatus 10 which belong to an apparatus group of the same user. Consequently, it is possible to add the recorder ID of another content processing apparatus 10 belonging to the apparatus group of the same user to the content processing apparatus 10 so that the ripped content can be shared.

The charging server 38 performs a charging process for a user who purchases a content in response to distribution of the content by the content distribution server 34.

The WWW server 31, group management server 32, content distribution server 34, certificate management server 36 and charging server 38 may be partly or entirely configured as a unitary member of hardware or may be formed from individual server apparatus separate from each other.

The network 5 is a communication circuit network for connecting the content processing apparatus 10 and the server apparatus 30 for bidirectional communication. This network 5 is formed from a public network such as, for example, the Internet, a telephone circuit network or a satellite communication network or a dedicated circuit network such as a WAN, a LAN, an IP-VPN or the like, and may be any of wire and wireless networks.

Furthermore, the network 5 includes a private network. The private network is a network which connects a plurality of content processing apparatus 10, which share a content within the range of private use, to each other from a point of view of copyright management. As a particular example of such a private network as just mentioned, for example, a network which interconnects a plurality of content processing apparatus 10 and is used by the same user, a network which interconnects a plurality of content processing apparatus 10 which are used in the same home, a LAN which interconnects a plurality of content processing apparatus 10 which are used within a limited group (company, friends or the like) of a small scale and so forth are available.

The removable storage medium 7 is a removable medium which can store various data such as a content, a group certificate G, a program and so forth and is any of various optical disks 3 such as, for example, a DVD-R, a DVD-RW, a DVD-RAM, a CD-R, a CD-RW and a magneto-optical disk, magnetic disks such as a flexible disk and a hard disk, various semiconductor memories and so froth. It is to be noted that this removable storage medium 7 may be, for example, a storage medium with a copyright management function for restricting copying, reproduction and so forth of a content using an encryption key or the like.

This removable storage medium 7 functions as a providing/acquiring medium of a content between the content processing apparatus 10. For example, by loading a removable storage medium 7, on which a content is written by the content processing apparatus 10-1, into the content processing apparatus 10-2 to read out the content, the content can be provided from the content processing apparatus 10-1 to the content processing apparatus 10-2. Further, the content processing apparatus 10-1 can provide/acquire a content to/from a content reproduction apparatus 20, which cannot be connected to the network 5, through the removable storage medium 7. Further, the removable storage medium 7 functions also as a providing/acquiring medium of a group certificate G between the content processing apparatus 10. Furthermore, the removable storage medium 7 can be inserted into a content sales terminal (not shown) provided at a front of a shop or the like, store a content purchased in response to a user operation and provide the content to a content processing apparatus 10.

<3. Content Processing Apparatus (PC)>

Now, a configuration of the content processing apparatus (PC) 10 according to the present embodiment is described in detail.

First, a hardware configuration of the content processing apparatus 10 according to the present embodiment is described with reference to FIG. 4. It is to be noted that FIG. 4 is a block diagram schematically showing an example of the hardware configuration of the content processing apparatus 10 according to the present embodiment.

Figure 4:
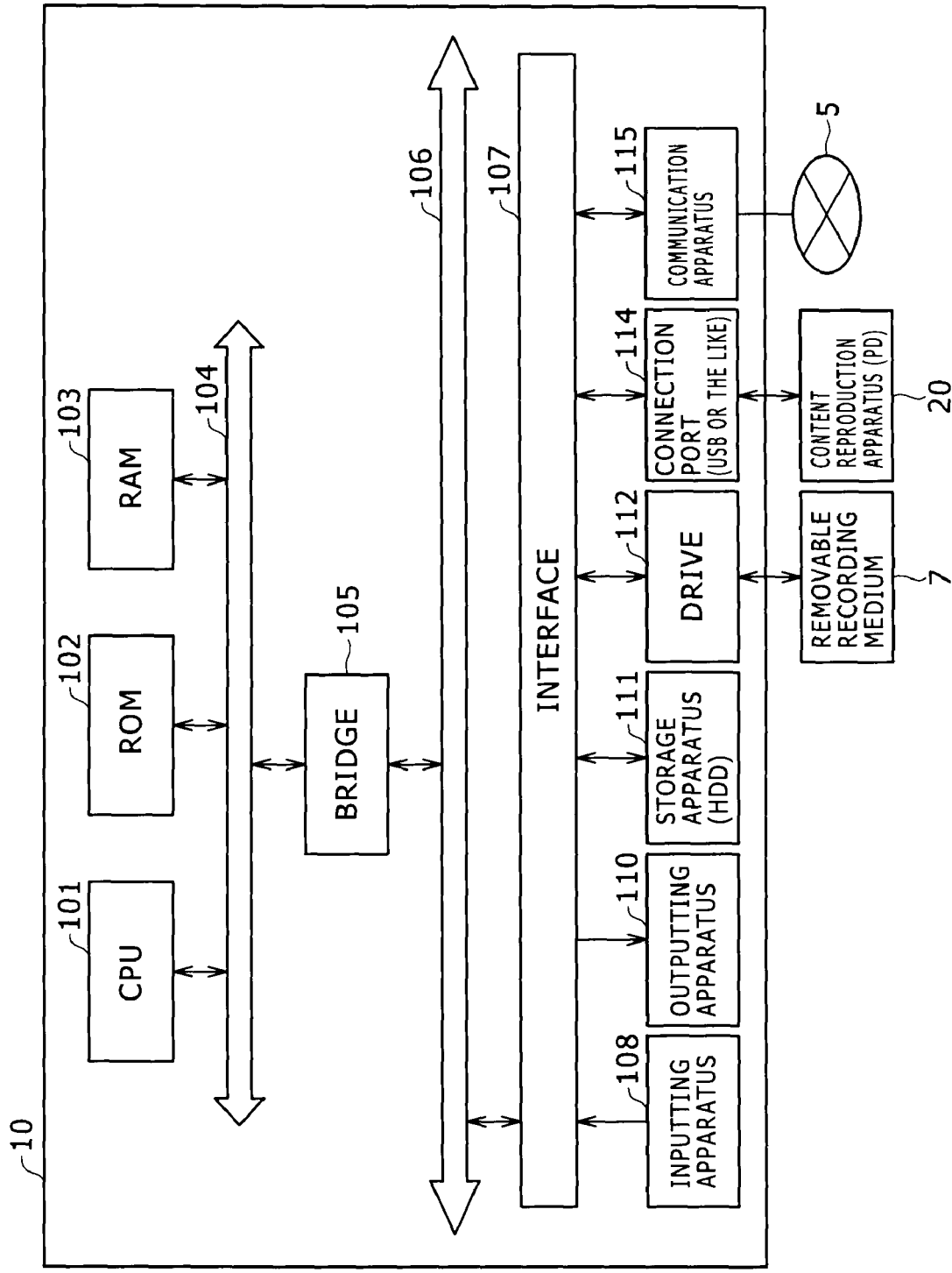
FIG. 4 is a block diagram schematically showing a hardware configuration of a content processing apparatus according to the embodiment.

As shown in FIG. 4, the content processing apparatus 10 includes, for example, a CPU (Central Processing Unit) 101, a ROM (Read Only Memory) 102, a RAM (Random Access Memory) 103, a host bus 104, a bridge 105, an external bus 106, an interface 107, an inputting apparatus 108, an outputting apparatus 110, a storage apparatus (HDD) 111, a drive 112, a connection port 114, and a communication apparatus 115.

The CPU 101 functions as a mathematical processing apparatus and a control apparatus and operates in accordance with various programs to control components in the content processing apparatus 10. The ROM 102 stores programs, mathematical operation parameters and so forth to be used by the CPU 101. The RAM 103 primarily stores a program to be used in execution of the CPU 101, parameters which vary suitably in the execution and so forth. The components mentioned are connected to each other by the host bus 104 formed from a CPU bus or the like.

The host bus 104 is connected to an external bus 106 such as a PCI (Peripheral Component Interconnect/Interface) bus through the bridge 105.

The inputting apparatus 108 is formed from operation means such as, for example, a mouse, a keyboard, a touch panel, buttons, switches and so forth, an input control circuit for generating and outputting an input signal to the CPU 101, and so forth. A user of the content processing apparatus 10 can operate the inputting apparatus 108 to input various data to the content processing apparatus 10 or instruct the content processing apparatus 10 of a processing operation.

The outputting apparatus 110 is formed from a display apparatus such as, for example, a CRT (Cathode Ray Tube) display apparatus, a liquid crystal display (LCD) apparatus, lamps and so forth, a sound outputting apparatus such as a speaker and so forth. The outputting apparatus 110 outputs, for example, a reproduced content. In particular, the display apparatus displays various kinds of information such as reproduced image data in the form of a text or an image. Meanwhile, the sound outputting apparatus develops sound of reproduced sound data and so forth.

Figure 5:
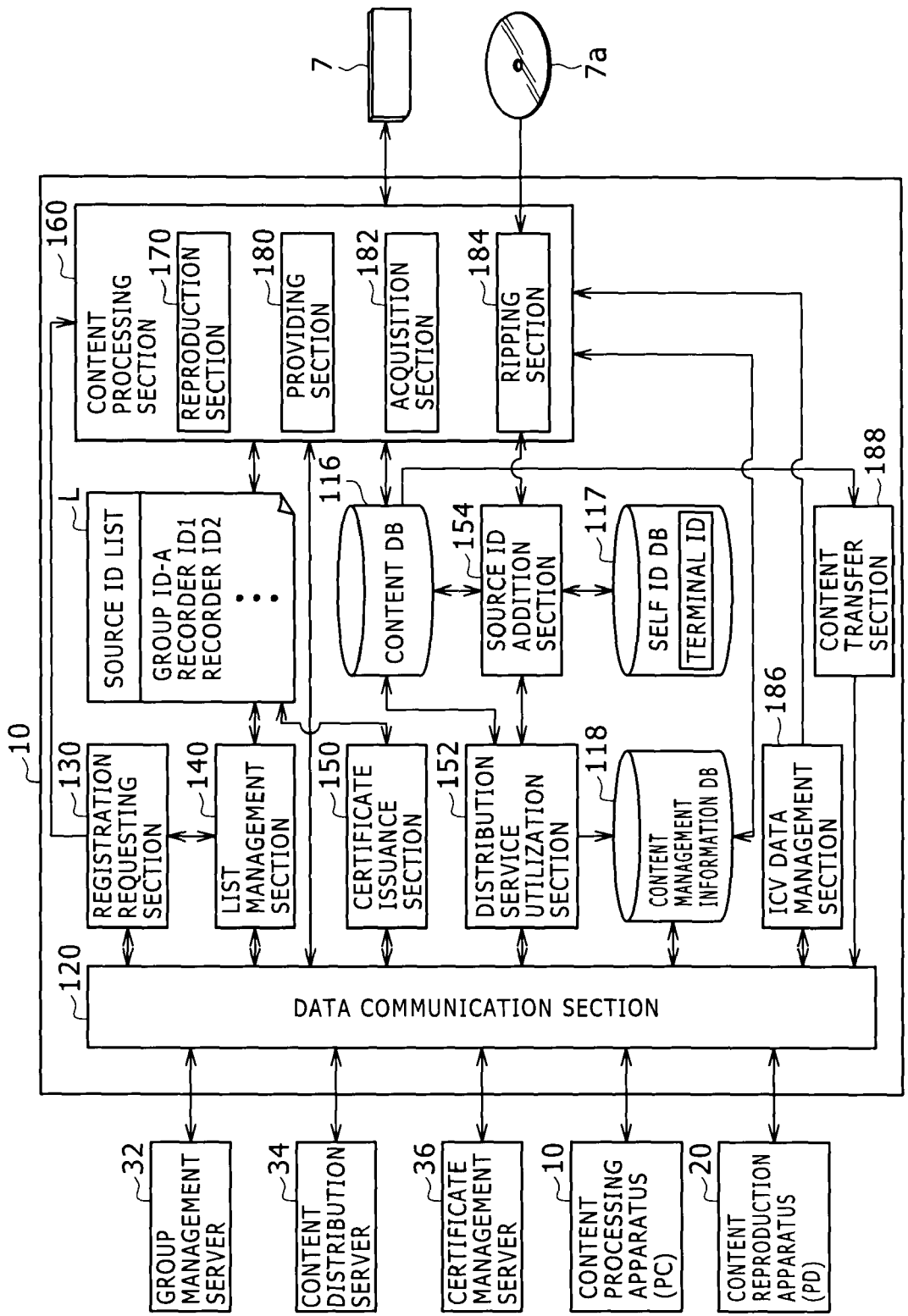
FIG. 5 is a block diagram schematically showing functions of the content processing apparatus according to the embodiment.

The storage apparatus 111 is an apparatus for data storage configured as an example of a storage section of the content processing apparatus 10 according to the present embodiment and is formed, for example, from a HDD (Hard Disk Drive). The storage apparatus 111 drives a hard disk to store programs to be executed by the CPU 101 and various data. Further, a source ID list L, a content database 116, a self ID database 117, a content management information database 118 and so forth hereinafter described with reference to FIG. 5 are stored in the storage apparatus 111.

The drive 112 is a storage medium reader/writer and is built in or externally provided for the content processing apparatus 10. The drive 112 records/reproduces various data such as a content, a group certificate G or a grogram on/from a removable storage medium 7 such as a magnetic disk, an optical disk, a magneto-optical disk, or a semiconductor memory loaded in the content processing apparatus 10.

In particular, the drive 112 reads out data recorded on the removable storage medium 7 and supplies the data to the RAM 103 through the interface 107, external bus 106, bridge 105 and host bus 104. The CPU 101 stores such data into the ROM 102, storage apparatus 111 or the like as occasion demands. Meanwhile, the drive 112 receives data stored in the ROM 102, storage apparatus 111 or the like, newly produced data or data acquired from an external apparatus from the CPU 101 and writes the received data into the removable storage medium 7.

The connection port 114 is a port for connecting an external peripheral apparatus such as, for example, a content reproduction apparatus 20 and has connection terminals of the USB, the IEEE1394 or the like. The connection port 114 is connected to the CPU 101 or the like through the interface 107, and the external bus 106, bridge 105, host bus 104 and so forth. By such a connection port 114 as just described, the content processing apparatus 10 can communicate various data with the content reproduction apparatus 20 through the local line 9.

The communication apparatus 115 is a communication interface formed from a communication device or the like for connecting, for example, to the network 5. This communication apparatus 115 sends and receives various data such as a content, a source ID list L, a group certificate G or a control signal through the network 5 to and from an external apparatus such as another content processing apparatus 10 or the server apparatus 30.

Now, principal functions of the content processing apparatus 10 according to the present embodiment are described with reference to FIG. 5. It is to be noted that FIG. 5 is a block diagram schematically showing functions of the content processing apparatus 10 according to the present embodiment.

As shown in FIG. 5, the content processing apparatus 10 includes, for example, a data communication section 120, a registration requesting section 130, a list management section 140, a certificate issuance section 150, a distribution service utilization section 152, a source ID addition section 154, a content processing section 160, an ICV data management section 186, a content transfer section 188, a content database 116, a self ID database 117 and a content management information database 118.

The data communication section 120 sends/receives various data between the content processing apparatus 10 and an external apparatus. For example, the data communication section 120 utilizes the communication apparatus 115 to send and receive data between the content processing apparatus 10 and another content processing apparatus 10 or the server apparatus 30 through the network 5. Further, the data communication section 120 utilizes the connection port 114 to send and receive data between the content processing apparatus 10 and a content reproduction apparatus 20 through the local line 9.

The registration requesting section 130 carries out a user registration process and a group registration process of a content processing apparatus 10 or a content reproduction apparatus 20 into the group management server 32. In this group registration process, the registration requesting section 130 sends group registration request information (for example, a group registration request notification, a user ID, a password, a terminal ID, a recorder ID and so forth) to the group management server 32. Here, the terminal ID is an ID for unique identification of a content processing apparatus 10 formed from a PC or the like. The terminal ID and the recorder ID are produced uniquely based, for example, on a random number generated uniquely, the device ID of each content processing apparatus 10 or the like by each content processing apparatus 10.

Further, the registration requesting section 130 receives service data (a leaf ID, a service common key and so forth) conveyed from the group management server 32 in response to group registration of the content processing apparatus 10. Further, the registration requesting section 130 outputs, for example, a received leaf ID to the list management section 140 and outputs a received service common key to the content processing section 160. This service common key (secret key) is a key necessary to decrypt encrypted content data and is stored in safe so that it may not be falsified.

Further, the registration requesting section 130 carries out a group registration cancellation request process of the content processing apparatus 10 to the group management server 32. Also in this instance, the registration requesting section 130 sends group registration cancellation request information (for example, a group registration cancellation request notification, a user ID, a password, a terminal ID and so forth) to the group management server 32. If registration cancellation is carried out, then the registration requesting section 130 notifies the list management section 140 of this.

Further, the registration requesting section 130 can also group-register a content reproduction apparatus 20 connected to the content processing apparatus 10 into the group management server 32. Details of such a group registration process and a registration cancellation process of a content processing apparatus 10 and a content reproduction apparatus 20 by the registration requesting section 130 as described above are hereinafter described.

The list management section 140 is a component corresponding to the list management section 3 shown in FIG. 2. This list management section 140 has, for example, a function of updating a source ID list L retained by the content processing apparatus 10.

For example, upon group registration described above, the list management section 140 adds a service ID to a leaf ID received from the registration requesting section 130, converts the leaf ID to which the service ID is added into a group ID and adds the group ID to the source ID list L. Further, when the list management section 140 acquires a group certificate G delivered from the group management server 32 or another content processing apparatus 10, if the group ID included in the group certificate G and a group ID included in the source ID list L coincide with each other, then the list management section 140 adds the recorder ID included in the group certificate G to the source ID list L. It is to be noted that, where such a source ID as a group ID or a recorder ID has validity term information set therein, the list management section 140 describes also the validity term information of a source ID into the source ID list L upon addition of the source ID to the source ID list L.

Further, the list management section 140 deletes, upon group registration cancellation, all of source IDs in the source ID list L. Furthermore, the list management section 140 can also update the source ID list L of a content reproduction apparatus 20 connected to the content processing apparatus 10. It is to be noted that details of such a list updating process by the list management section 140 as just mentioned are hereinafter described.

It is to be noted that the source ID list L is stored in safety in a recording medium such as the storage apparatus 111 or the ROM 102 of the content processing apparatus 10. In order to prevent the user from illegally falsifying the source ID list L, it is stored encrypted with application of a digital signature, for example.

In the present embodiment, a group ID produced based on a source ID upon group registration is stored in the content processing apparatus 10 in such a manner that it is included in the source ID list L as described above. This is because it is intended to utilize a group ID as a source ID for making it possible to reproduce a distribution content to which the group ID is applied as a source ID to carry out reproduction control of the distribution content based on the group ID. It is to be noted that, where the group ID is utilized, for example, not as a source ID but only as a source ID (second group ID described hereinabove) for a reference of addition of a recorder ID to the source ID list L in a ripping content sharing service, the group ID need not necessarily be stored in the source ID list L. In this instance, the group ID may be stored, for example, in another storage area of the storage apparatus 111, for example, in the self ID database 117 or may be stored in the ROM 102 or the like.

The certificate issuance section 150 has a function of issuing a group certificate G for proving, for example, an apparatus group to which the content processing apparatus 10 itself belongs. In particular, the certificate issuance section 150 issues, for example, in a state wherein the content processing apparatus 10 is group-registered and retains a group ID-A, a group certificate G which associates a recorder ID1 corresponding to the content processing apparatus 10 and the group ID-A. By such a group certificate G as just described, it can be proved that the content processing apparatus 10 corresponding to the recorder ID1 belongs to the apparatus group possessed by the user and specified by the group ID-A. Further, in the group certificate G, a digital signature for falsification detection, for example, a MAC (Message Authentication Code), is added. By this, falsification of the group certificate G can be prevented.

In order to issue such a group certificate G as described above, the certificate issuance section 150 reads out the recorder ID and the group ID corresponding to the content processing apparatus 10 itself from the storage apparatus 111 and carries out an encryption process of the recorder ID and the group ID thus read out with the digital signature applied thereto to produce and issue a group certificate G.

The certificate issuance section 150 can issue the group ID, for example, at an arbitrary timing after the group registration of the content processing apparatus 10 is completed. For example, the certificate issuance section 150 may issue a group certificate G corresponding to the content processing apparatus 10 itself in response to an input of the user through the content processing apparatus 10 or in response to a certificate request from another content processing apparatus 10. Further, the certificate issuance section 150 may issue and send a group certificate G to the certificate management server 36 after the group registration of the content processing apparatus 10.

Further, the certificate issuance section 150 may add validity term information to a group certificate G to be issued. By this, the content processing apparatus 10 which acquires the group certificate G can thereafter add the recorder ID included in the group certificate G to the source ID list L only within the term of validity represented by the validity term information included in the group certificate G.

Further, the certificate issuance section 150 may arbitrarily set a route along which the group certificate G issued in such a manner as described above is to be distributed to another content processing apparatus 10, and may distribute to another content processing apparatus 10, for example, through the certificate management server 36. By this, the certificate management server 36 can thereafter manage the group certificate G of the individual content processing apparatus 10 in a centralized manner to distribute the group certificate G to the other content processing apparatus 10 which belong to the same apparatus group.

Also the distribution method of the group certificate G can be set arbitrarily. For example, the group certificate G may be sent directly through the network 5 or the local line 9 or the group certificate G may be appended to and sent together with an electronic mail, or else the group certificate G may be pasted to a homepage. Or, a storage medium 7 on which the group certificate G is recorded may be provided to the content processing apparatus 10. Further, the group certificate G may be distributed through a storage medium 7 on which it is recorded together with a content. By this, for example, a recorder ID added to the ripped content and a group ID of the content processing apparatus 10 by which the content is ripped can be distributed simultaneously together with the content. Therefore, any content processing apparatus 10 which belongs to the same apparatus group can immediately reproduce the ripped content.

The group certificate G distributed in this manner is utilized for sharing registration, that is, for addition of the recorder ID to the source ID list L, by the other content processing apparatus 10. By this, any other content processing apparatus 10 to which the group certificate G is distributed from a content processing apparatus 10 belonging to the same apparatus group can acquire the recorder ID of an apparatus which has the same group ID to the source ID list L.

In this manner, by issuing and distributing a group certificate G by which a group ID and a recorder ID are associated with each other, even if different content processing apparatus 10 which belong to the same apparatus group are not connected directly to each other, the recorder IDs of them can be shared by them.

It is to be noted that a certificate management section (not shown) for storing and managing a group certificate G issued by the certificate issuance section 150 and a group certificate G acquired from another content processing apparatus 10 or the certificate management server 36 into and in the certificate database (not shown) described hereinabove. By this, the certificate management section can thereafter read out any group certificate G acquired in the past from such a certificate database as described above and distribute the group certificate G to another content processing apparatus 10 and so forth.

The distribution service utilization section 152 cooperates with the content distribution server 34 to carry out a process relating to a content distribution service.

In particular, the distribution service utilization section 152 sends and receives various kinds of information such as, for example, user authentication information (user ID, password and so forth), charging information and content distribution request information necessary to utilize the content distribution service to and from the content distribution server 34 or supports inputting and outputting of such information.

Further, the distribution service utilization section 152 receives a distribution content and a license for the distribution content sent from the content distribution server 34 through the network 5 and the communication apparatus 115. In particular, if the user of the content processing apparatus 10 utilizes the content distribution service to purchase a content, then the distribution service utilization section 152 downloads a file of the distribution content and a file of the license which defines utilization conditions of the distribution content from the content distribution server 34, for example, in different files. In the case of a content which is subject to copyright management of the group management system, the license of the distribution content describes a group ID allocated to the user by the group registration described hereinabove.

The distribution service utilization section 152 works data of the distribution content and data of the license received in this manner to produce, for example, a content file wherein the content and the license are formed as the same file.

At this time, as regards a distribution content of the group management system, a group ID is added to the content data of the distribution content by the source ID addition section 154. The source ID addition section 154 is a component corresponding to the source ID addition section 1. This source ID addition section 154 adds a group ID to a distribution content. In particular, the source ID addition section 154 executes a process of converting a leaf ID described in the license corresponding to the distribution content into a group ID. This conversion process from a leaf ID into a source ID is carried out, for example, by adding the service ID of the content distribution service to the leaf ID similarly as described hereinabove. By this, the group ID representative of the user by whom the distribution content is purchased and the service is associated with the distribution content.

In this manner, the distribution service utilization section 152 and the source ID addition section 154 produce a content file which couples a file of a distributed content and a file of license.

Figure 6:
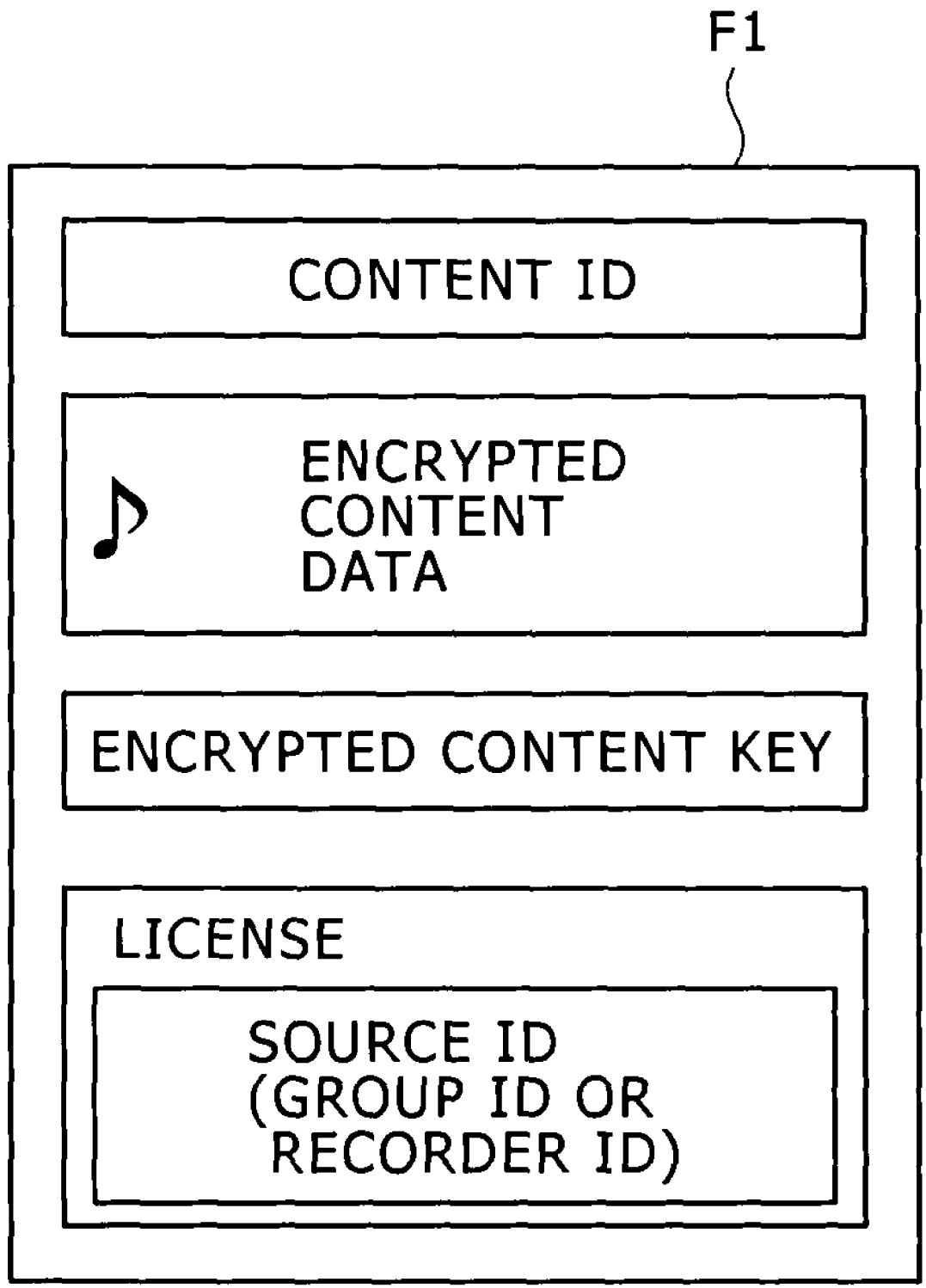
FIG. 6 is an explanatory view schematically illustrating a configuration of a content of a group management system according to the embodiment.

In particular, as shown in FIG. 6, a content file F1 of the group management system includes, for example, a content ID, content data encrypted with a content key, a content key encrypted with a system common key which can be handled only by the copyright management system 100 and a source ID such as a group ID, and a license wherein a source ID such as a group ID is described.

The license in such a content file F1 as described above is in an encrypted state so that falsification thereof can be detected. By this, the source ID can be associated in safety with the content. Further, the content processing apparatus 10 retain common secret information so that they can carry out decryption of a content key in an encrypted form and a falsification check of a license. Therefore, even if a content is shared in the copyright management system 100, falsification of a source ID added to a content can be prevented suitably.

The distribution service utilization section 152 records the content file produced in this manner, for example, into the content database 116 in the storage apparatus 111. It is to be noted that, in the present embodiment, while a content and a corresponding license are managed in the same file and stored in the content database 116 as described hereinabove, the management is not limited to the example just described. For example, a content and a license may be managed in different files. In this instance, the file of the content may be stored into the content database 116 while the file of the license is stored into the license database such that the content and the license are associated with each other through a content ID or the like included in both files.

Further, the distribution service utilization section 152 receives attribute information of a distribution content from the content distribution server 34 upon distribution of the content. This attribute information of the distribution content includes, for example, the tune name of the distribution content, the artist (singer) name, the album name, a genre, reproduction time, a content ID, distribution date and time, a data size, a data format, a type of the copyright management system and so forth. The distribution service utilization section 152 records such attribute information of a distribution content, a recorded place (for example, an address in the content database 116) of the distribution content and so forth as content management information into the content management information database 118.

Such a distribution service utilization section 152 as described above is configured by installing software for the content distribution service corresponding to the content distribution service to be utilized into the content processing apparatus 10. It is to be noted that a plurality of such distribution service utilization sections 152 are provided individually for a plurality of content distribution services which the user utilizes.

Further, the source ID addition section 154 adds the group ID of the content processing apparatus 10 itself to a content (ripped content) ripped from a music CD 7a or the like by a ripping section 184 hereinafter described. In particular, the source ID addition section 154 reads out the recorder ID of the content processing apparatus 10 stored in the self ID database 117, produces a license which includes the recorder ID, and associates such a license as just described with content data of the ripped content. In particular, the source ID addition section 154 produces such a content file F1 as shown in FIG. 6 which includes a content ID, content data of the ripped content in an encrypted form, a content key in an encrypted form and a license in which the recorder ID is described. The source ID addition section 154 records the ripped content to which the recorder ID is added in such a manner as described above into the content database 116.

It is to be noted that this addition timing of a recorder ID preferably is, for example, a point of time of completion of ripping of a content. By adding a recorder ID to a ripped content immediately in this manner, the recorder ID can be added with certainty before the ripped content which requires copyright management is circulated in the copyright management system 100. It is to be noted that the addition timing of a recorder ID is not limited to such an example as just described but may be, for example, a point of time when the ripped content is reproduced for the first time or a point of time when the ripped content is copied into another content processing apparatus 10.

The self ID database 117 has placed therein various IDs corresponding to the content processing apparatus 10 itself such as, for example, the terminal ID and the recorder ID corresponding to the content processing apparatus 10.

The terminal ID (Terminal ID) is an apparatus ID applied uniquely in a unit of a content processing apparatus 10 such as a PC. Meanwhile, the recorder ID is an identifier applied uniquely in a unit of a content processing apparatus 10 which has a ripping function. Such terminal IDs and recorder IDs as just mentioned are produced by the content processing apparatus 10 so that they may individually be unique to the individual content processing apparatus 10. Those IDs are encrypted and stored in safety in the self ID database 117 in order to prevent illegal falsification.

The content processing section 160 carries out various processes for a content. This content processing section 160 is configured by installing, for example, an application program for utilizing a content (for example, reproduction, transfer or the like), a DRM module for managing utilization of the content with regard to the copyright and so forth into the content processing apparatus 10. The content processing section 160 includes, for example, a content reproduction section 170, a content providing section 180, a content acquisition section 182 and a ripping section 184.

The content reproduction section 170 is a component corresponding to the content reproduction section 2 shown in FIG. 2. The content reproduction section 170 is formed, for example, from a reproduction apparatus having a content reproduction function, content reproduction software installed in the content processing apparatus 10 or the like and can reproduce various types of contents. A content reproduced by the content reproduction section 170 is outputted from the outputting apparatus 110.

Further, the content reproduction section 170 is ready, for example, for a content of the group management system and can execute reproduction control of the group management system. In particular, the content reproduction section 170 controls reproduction of a content of a reproduction object depending upon whether or not the source ID added to the content of the reproduction object is included in the source ID list L. Details of such a content reproduction section 170 as just described are hereinafter described.

It is to be noted that two or more content reproduction apparatus 170 may be provided in one content processing apparatus 10. For example, two or more pieces of content reproduction software may be installed into one content processing apparatus 10 or both of a piece of content reproduction software and a reproduction apparatus may be used to construct two or more content reproduction apparatus 170 corresponding to individual content distribution services or individual copyright management methods in one content processing apparatus 10.

The content providing section 180 provides (transfers or the like) a content to another content processing apparatus 10 or a content reproduction apparatus 20. Meanwhile, the content acquisition section 182 acquires a content from another content processing apparatus 10 or a content reproduction apparatus 20. The content providing section 180 and the content acquisition section 182 may execute providing/acquiring processes of a content by a sending and reception process, for example, through the network 5 or the local line 9 or else execute such providing/acquiring processes through a storage medium 7.

It is to be noted that, upon such reproduction, provision or acquisition of a content as just mentioned, the content processing section 160 may control the process described above based on content management information in the content management information database 118 or may display such content management information on the outputting apparatus 110.

The ripping section 184 rips a content recorded on a recording medium 7a such as a CD or a DVD on which music contents or image contents are recorded. In particular, the ripping section 184 controls the drive 112, for example, in response to a user input to extract music/image data or the like from the recording medium 7a and converts the format of such music/video data into a format (for example, the ATRAC3 format or the like) which can be processed by the content processing apparatus 10 to produce a content. To the content ripped in this manner, the recorder ID of the content processing apparatus 10 is added by the source ID addition section 154.

It is to be noted that a self recording section (not shown) for newly producing a content by self sound/image recording may be provided in addition to this ripping section 184. This self recording section may collect sound or pick up an image of an image pickup object around the content processing apparatus 10 to produce sound data or image data and carry out a predetermined data process for such data to newly produce a content. Or, the self recording section may convert image/sound data of a television program or a radio program received through the communication apparatus 115 or the like into data of a recordable format to produce a new content. By adding the recorder ID to the content produced by this self recording section, the content can thereafter be made an object of copyright management by the group management system.

The ICV data management section 186 manages ICV (Integrity Check value) data of the content processing apparatus 10 and ICV data of a content reproduction apparatus 20 connected to the content processing apparatus 10. The ICV data is a data for checking, when a process of a content is to be carried out, the validity of the process.

In the copyright management process of the group management system, the ICV data includes a MAC value (hash value with a key) of the source ID list L. Therefore, the ICV data management section 186 detects, based on such ICV data, whether nor not the source ID list L is valid, that is, whether or not the source ID list L is falsified illegally. If it is detected as a result of the detection that the source ID list L is valid, then the ICV data management section 186 permits the process of the content processing section 160, but if it is decided that the source ID list L is not valid, then the ICV data management section 186 does not permit the process of the content processing section 160.

Further, the ICV data management section 186 can manage not only ICV data relating to the content processing apparatus 10 but also ICV data of any content reproduction apparatus 20 connected to the content processing apparatus 10 similarly.

The content transfer section 188 controls transfer of a content between the content processing apparatus (PC) 10 and a content reproduction apparatus (PD) 20. This content transfer section 188 controls so that a content stored in the content database 116 of the content processing apparatus 10 is transferred to the content reproduction apparatus 20 or a content stored in the content reproduction apparatus 20 is transferred to the content processing apparatus 10 in response to a transfer request, for example, based on a user input.

Further, the content transfer section 188 can carry out not only transfer control of a content of a copyright management object (a content to which a source ID is added) but also transfer control of a content which is not an object of copyright management (for example, a raw content to which the source ID is not added). For example, if a transfer request from the content processing apparatus 10 to a content reproduction apparatus 20 or a transfer request from a content reproduction apparatus 20 to the content processing apparatus 10 regarding a content which is not under copyright management is inputted, then the content transfer section 188 compares the group ID in the source ID list of the content processing apparatus 10 and the group ID in the source ID list of the content reproduction apparatus 20 with each other. The content transfer section 188 permits the transfer if a result of the comparison reveals that the two group IDs coincide with each other, but if the two group IDs do not coincide with each other, then the content transfer section 188 does not permit the transfer. By this, the utilization (unrestricted copying between apparatus) not only of a content which is under copyright management by the group management system but also of a content which is not under copyright protection can be restricted.

The components of the content processing apparatus 10 are described above. The data communication section 120, registration requesting section 130, list management section 140, certificate issuance section 150, distribution service utilization section 152, source ID addition section 154, content processing section 160, ICV data management section 186, content transfer section 188 and so forth described above may be configured, for example, as hardware having the functions described above or may be configured by installing a program for implementing the functions described above into the content processing apparatus 10.

Now, the content reproduction section 170 according to the present embodiment is described in detail with reference to FIG. 7. It is to be noted that FIG. 7 is a block diagram schematically showing functions of the content reproduction section 170 according to the present embodiment.

Figure 7:
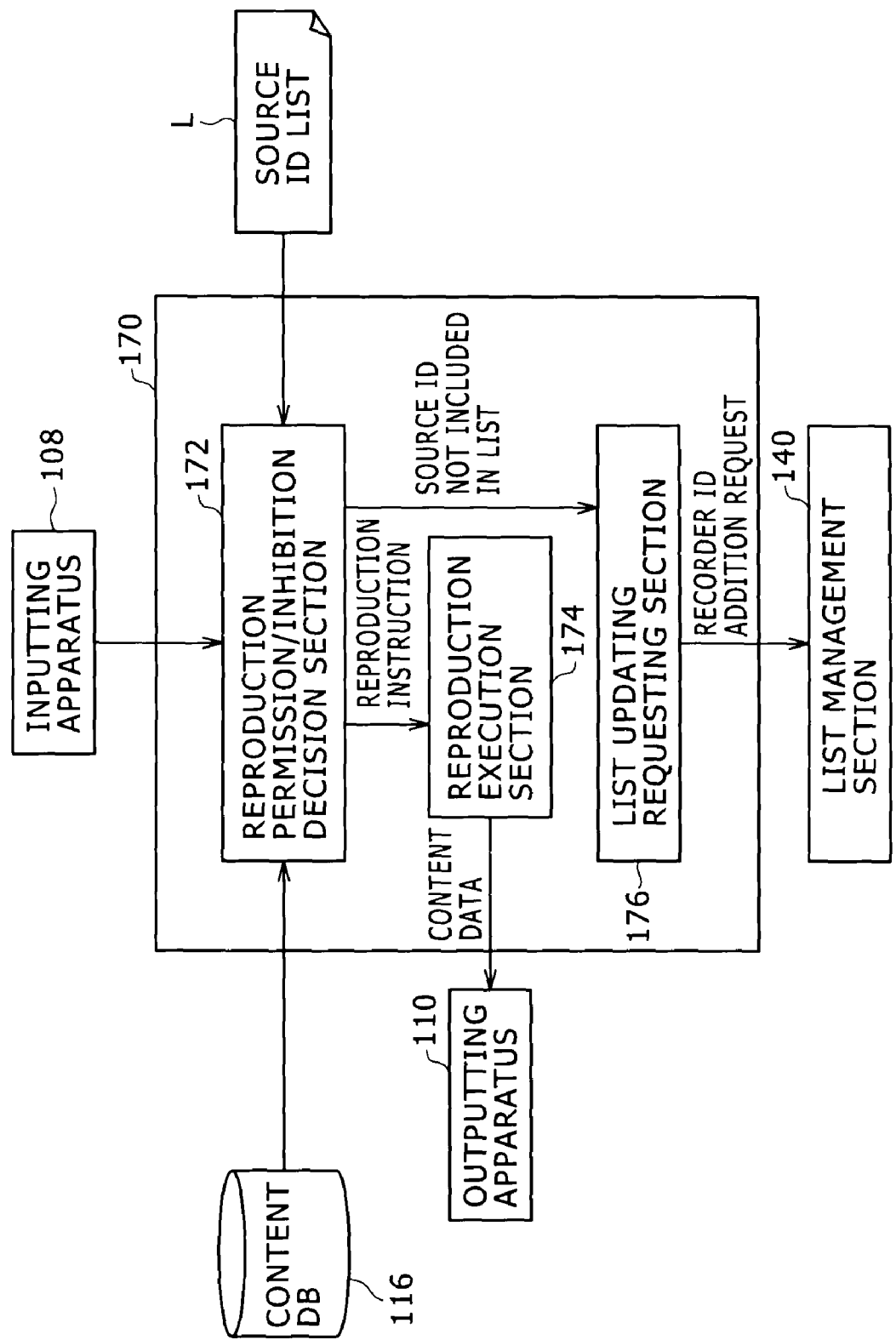
FIG. 7 is a block diagram schematically showing functions of a content reproduction apparatus according to the embodiment.

As shown in FIG. 7, the content reproduction section 170 includes, for example, a reproduction permission/inhibition decision section 172, a reproduction execution section 174 and a list updating requesting section 176.

The reproduction permission/inhibition decision section 172 controls reproduction of a content whose reproduction is requested. When the reproduction permission/inhibition decision section 172 carries out reproduction control of the group management system, it decides based on the source ID (recorder ID or group ID) added to the content whose reproduction is requested and the source ID list L whether or not reproduction of the content may be permitted.

In particular, the reproduction permission/inhibition decision section 172 first reads out, for example, when a reproduction request of a content designated by the user is accepted from the inputting apparatus 108, the content whose reproduction is requested, from the content database 116 and decides whether or not a source ID is added to the content, that is, whether or not a source ID is described in the license in the content file. If a source ID is not added to the content, then the reproduction permission/inhibition decision section 172 decides that the content requires no copyright management and permits reproduction of the content, and outputs a reproduction instruction signal of the content to the reproduction execution section 174. On the other hand, if a source ID (recorder ID or group ID) is added to the content, then the reproduction permission/inhibition decision section 172 decides that the content requires copyright management and then carries out the following process.

First, the reproduction permission/inhibition decision section 172 reads out (extracts) the source ID from the license in the content file and reads out and interprets the source ID list L. Then, the reproduction permission/inhibition decision section 172 compares the source ID read out from the content and the source IDs included in the source ID list L to decide whether or not the source ID read out from the content is included in the source ID list L. If a result of the comparison reveals that the source ID read out from the content is included in the source ID list L, then the reproduction permission/inhibition decision section 172 checks the term of validity of the source ID. Then, if the term of validity does not expire as yet, then the reproduction permission/inhibition decision section 172 permits reproduction of the content and outputs a reproduction instruction signal of the content to the reproduction execution section 174. On the other hand, if the source ID read out from the content is not included in the source ID list L or if the term of validity of the source ID expires already, then the reproduction permission/inhibition decision section 172 inhibits reproduction of the content and does not output a reproduction instruction signal. Therefore, the reproduction execution section 174 cannot reproduce the content. It is to be noted that, in this instance, an error notification representing that the reproduction condition is not satisfied may be displayed.

In this manner, the reproduction permission/inhibition decision section 172 according to the present embodiment carries out reproduction restriction of fully inhibiting reproduction of a content to which a source ID which is not included in the source ID list L is added. However, the reproduction restriction of a content is not limited to this example, but, for example, the reproduction permission/inhibition decision section 172 may carry out such reproduction restriction that reproduction of the content is permitted only with regard to part of the content in time or in the substance, that reproduction is performed while the picture quality, sound quality and so forth thereof is lowered or that reproduction is performed only a first predetermined number of times (for example, once) whereas later reproduction is inhibited.

Further, for example, where the source ID added to the content as described is not included in the source ID list L, the reproduction permission/inhibition decision section 172 outputs the source ID to the list updating requesting section 176.

The reproduction execution section 174 reproduces the designated content in response to a reproduction instruction signal of the reproduction permission/inhibition decision section 172. In particular, the reproduction execution section 174 first decrypts an encrypted content key using a service common key and then decrypts an encrypted content using the decrypted content key. Further, the reproduction execution section 174 decodes and reproduces the decrypted content and outputs the reproduced content from the outputting apparatus 110.

The list updating requesting section 176 issues a request to add the recorder ID to the source ID list L to the list management section 140. This addition requesting process is carried out, for example, by outputting an ID addition requesting signal representative of the recorder ID of the addition object to the list management section 140.

In particular, if, for example, a source ID which is not included in the source ID list L is inputted from the reproduction permission/inhibition decision section 172, then the list updating requesting section 176 decides whether or not the source ID is a recorder ID or a group ID. If a result of the decision reveals that the source ID is a recorder ID, then the list updating requesting section 176 issues a request to the list management section 140 to add the recorder ID to the source ID list L. The list updating requesting section 176 may automatically execute the addition requesting process or may execute the addition request process after it confirms from the user whether or not the user wants addition of the recorder ID. On the other hand, if a result of the decision reveals that the source ID is a group ID, then the list updating requesting section 176 does not perform the addition requesting process. This is because the content processing apparatus 10 can be registered only in a single apparatus group of a user.

Now, the list management section 140 according to the present embodiment is described in detail with reference to FIG. 8. It is to be noted that FIG. 8 is a block diagram schematically showing a configuration of the list management section 140 according to the present embodiment.

Figure 8:
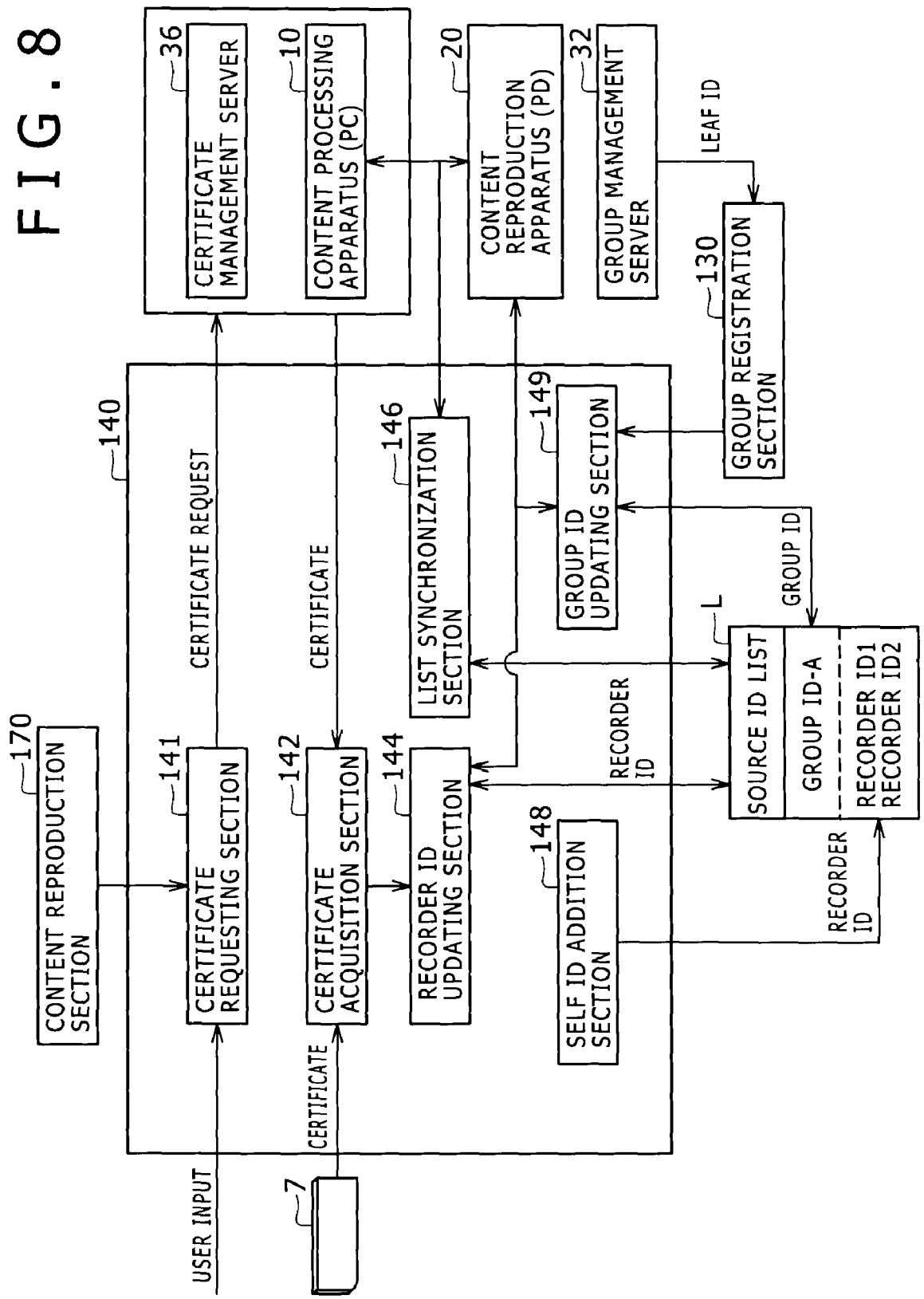
FIG. 8 is a block diagram schematically showing a configuration of a list management section according to the embodiment.

As shown in FIG. 8, the list management section 140 includes, for example, a certificate requesting section 141, a certificate acquisition section 142, a recorder ID updating section 144, a list synchronization section 146, a self ID addition section 148 and a group ID updating section 149.

The certificate requesting section 141 sends a certificate requesting signal in response to a user input or automatically to a different content processing apparatus 10 belonging to the same apparatus group or the certificate management server 36 to request for a group certificate G issued by the different content processing apparatus 10. For example, the certificate requesting section 141 may notify a particular content processing apparatus 10 or the certificate management server 36 of the recorder ID whose addition is requested from the content reproduction section 170 to request for a group certificate G including the recorder ID. Further, the certificate requesting section 141 may send the group ID which the content processing apparatus 10 itself has to the different content processing apparatus 10 or the certificate management server 36 to request for one, two or more group certificates G including the recorder ID associated with the group ID (that is, the recorder ID of the different content processing apparatus 10 belonging to the same apparatus group).

The certificate acquisition section 142 acquires a group certificate G from the different content processing apparatus 10 or the certificate management server 36. In particular, the certificate acquisition section 142 can receive and acquire a group certificate G from an external content processing apparatus 10 or the certificate management server 36 through the network 5 and the communication apparatus 115. The certificate acquisition section 142 can utilize the drive 112 to read out the group certificate G recorded in the storage medium 7 and provided from the different content processing apparatus 10. The certificate acquisition section 142 outputs the group certificate G acquired in this manner to the recorder ID updating section 144.

The recorder ID updating section 144 adds the recorder ID to the source ID list L based on the group certificate G inputted from the certificate acquisition section 142. In particular, the recorder ID updating section 144 first reads out the group ID included in the group certificate G and reads out the group IDs in the source ID list L. Then, the recorder ID updating section 144 decides whether or not both group IDs coincide with each other. If a result of the decision proves that the two group IDs coincide with each other, then the recorder ID updating section 144 reads out the recorder ID corresponding to the different content processing apparatus 10 and included in the group certificate G and adds the read out recorder ID to the source ID list L. Meanwhile, if both source IDs do not coincide with each other, then the recorder ID updating section 144 does not add the recorder ID included in the group certificate G to the source ID list L.

Consequently, the recorder ID updating section 144 can add only the recorder ID corresponding to the content processing apparatus 10 and registered in the same apparatus group to the source ID list L. It is to be noted that the recorder ID updating section 144 may provide an upper limit to the number of recorder IDs which can be added to the source ID list L or the like to restrict addition of a recorder ID.

The list synchronization section 146 has a function of synchronizing a plurality of source ID lists L with each other. Here, synchronization of source ID lists L signifies merging (merge) of a plurality of different source ID lists L, and the source ID list L after synchronized contains all of the recorder IDs included in the plurality of original source ID lists L without any overlap.

The synchronization process of the source ID lists L can be executed only between content processing apparatus 10 which have the same group ID. In particular, the list synchronization section 146 acquires the source ID list L possessed by a different content processing apparatus 10 or a content reproduction apparatus 20. Then, only where the group ID included in the acquired source ID list L and the group ID included in the source ID list L of the content processing apparatus 10 itself coincide with each other, the list synchronization section 146 synchronizes the source ID lists L of the two content processing apparatus 10.

By such a synchronizing process as just described, recorder IDs included in source ID lists L included in a plurality of apparatus registered in the same apparatus group can be made same as each other. Therefore, it is possible to share and mutually reproduce ripped contents between the different content processing apparatus 10.

It is to be noted that the present synchronization process may be carried out periodically or automatically at an arbitrary timing, for example, between different content processing apparatus 10 in a private network by the list synchronization section 146 or may be carried out cooperatively with a designated particular content processing apparatus 10 in response to an instruction of a user. Further, such a synchronization process as described above can be executed not only between content processing apparatus 10 connected to each other by a private network or between content processing apparatus 10 connected to each other by the local line 9 but also between content processing apparatus 10 connected remotely by the network 5.

The self ID addition section 148 adds the recorder ID corresponding to the content processing apparatus 10 itself, for example, unconditionally to the source ID list L. In particular, the self ID addition section 148 reads out the recorder ID corresponding to the content processing apparatus 10 itself form the self ID database 117 and writes the recorder ID into the source ID list L. Consequently, the content processing apparatus 10 can thereafter reproduce a ripped content ripped by the content processing apparatus 10 itself irrespective of presence or absence of the group registration. It is to be noted that the group ID may be produced based on a random number or the like by this self ID addition section and recorded into the self ID database 117.

If, for example, upon group registration of the content processing apparatus 10, a group ID is inputted from the registration requesting section 130, then the group ID updating section 149 adds the group ID into the source ID list L. Consequently, the content processing apparatus 10 can thereafter reproduce a distribution contents to which the group ID is added.

On the other hand, if a group registration cancellation notification is inputted from the registration requesting section 130, then the group ID updating section 149 deletes all source IDs (recorder ID and group ID) included in the source ID list L. However, only the recorder ID corresponding to the content processing apparatus 10 itself is not deleted from the source ID list L. Consequently, the content processing apparatus 10 can thereafter reproduce only ripped content produced by the content processing apparatus 10 itself and contents which are not under copyright management.

It is to be noted that the recorder ID updating section 144 and the group ID updating section 149 can update the source ID list L received from a content reproduction apparatus 20 and sends back the updated source ID list L.

The list management section 140 according to the present embodiment is described above. In this manner, the list management section 140 adds a group ID obtained by group registration to the source ID list L and adds the recorder ID of a different content processing apparatus 10 which belongs to the same apparatus group to the source ID list L with reference to whether or not the group IDs are same as each other. Consequently, between a plurality of content processing apparatus 10 registered in the same apparatus group, a copied distribution content and a ripped content can be reproduced freely. Meanwhile, between content processing apparatus 10 which are registered in different apparatus groups or which are not registered as yet, it is possible to restrict reproduction of a copied content to prevent illegal utilization of the content.

It is to be noted that only one representative list management section 140 is provided in a certain content processing apparatus 10 from among a plurality of content processing apparatus 10 and content reproduction apparatus 20 within a private network such that the list management section 140 may collectively update the source ID lists L of the content processing apparatus 10 and the content reproduction apparatus 20. In this instance, preferably the list management section 140 is provided, for example, in a connection server apparatus or the like in a private network.

<4. Content Processing Apparatus (PD)>

Now, a configuration of the content reproduction apparatus (PD) 20 according to the present embodiment is described in detail.

First, a hardware configuration of the content reproduction apparatus 20 according to the present embodiment is described with reference to FIG. 9. It is to be noted that FIG. 9 is a block diagram schematically showing an example of the hardware configuration of the content reproduction apparatus 20 according to the present embodiment.

Figure 9:
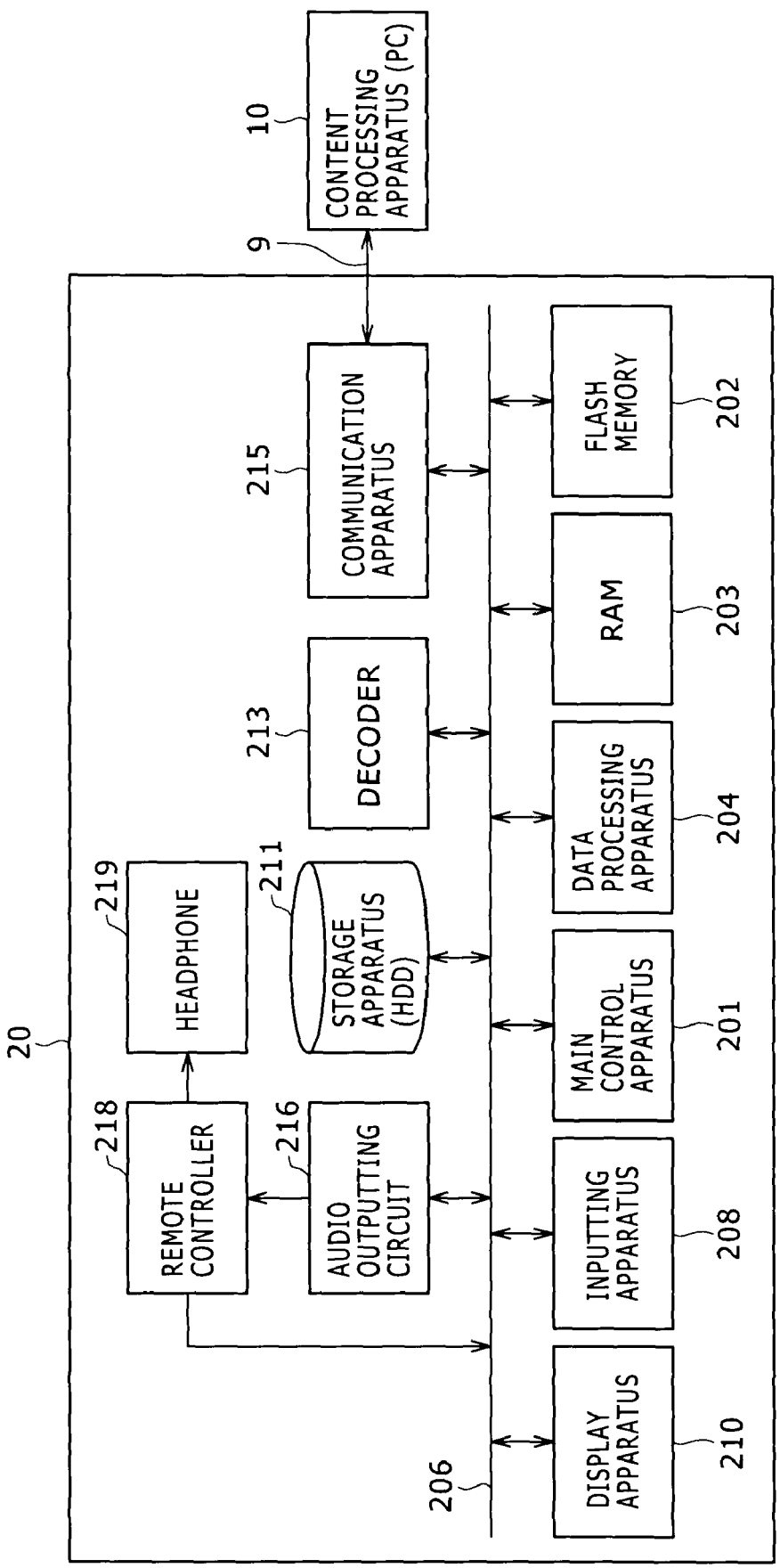
FIG. 9 is a block diagram schematically showing an example of a hardware configuration of the content reproduction apparatus according to the embodiment.

Referring to FIG. 9, the content reproduction apparatus 20 includes, for example, a main control apparatus 201, a flash memory 202, a RAM 203, a data processing apparatus 204, a bus 206, an inputting apparatus 208, a display apparatus 210, a storage apparatus (HDD) 211, a decoder 213, a communication apparatus 215, a audio outputting circuit 216, a remote controller 218 and a headphone 219.

The main control apparatus 201 functions as a control apparatus and controls the components of the content reproduction apparatus 20. The flash memory 202 stores, for example, a program which defines operation of the main control apparatus 201, and various data. Further, the RAM 203 is formed, for example, from an SDRAM (Synchronous DRAM) and temporarily stores various data relating to processing of the main control apparatus 201.

The data processing apparatus 204 is formed from a system LSI and so forth and processes data transferred within the content reproduction apparatus 20. The bus 206 is a data line which interconnects the main control apparatus 201, flash memory 202, RAM 203, data processing apparatus 204, inputting apparatus 208, display apparatus 210, storage apparatus (HDD) 211, decoder 213, communication apparatus 215, audio outputting circuit 216 and so forth.

The inputting apparatus 208 and the remote controller 218 include operation means such as, for example, a touch panel, button keys, levers and dials, an input control circuit which produces an input signal in response to an operation of the operation means by a user and outputs the input signal to the main control apparatus 201, and so forth. The user of the content reproduction apparatus 20 can operate the inputting apparatus 208 or the remote controller 218 hereinafter described to input various data to the content reproduction apparatus 20 or issue an instruction for a processing operation.

The display apparatus 210 is formed, for example, from an LCD panel, an LCD control circuit and so forth.

This display apparatus 210 displays various types of information in the form of a text or an image in accordance with control of the main control apparatus 201. For example, the display apparatus 210 can display title information of a content retained in the content reproduction apparatus 20 such that it can be discriminated whether or not reproduction of the content can be permitted as hereinafter described.

The storage apparatus 211 is an apparatus for data storage formed as an example of a storage medium of the content reproduction apparatus 20 according to the present embodiment. This storage apparatus 211 is formed from a hard disk drive (HDD) having a storage capacity of, for example, several tens GB and stores a compressed content, a program of the main control apparatus 201 and various data such as processing data. It is to be noted that it is possible to use, as the storage medium of the content reproduction apparatus 20, a semiconductor memory built in the content reproduction apparatus 20, the removable storage medium 7 incorporated in the content reproduction apparatus 20 or the like without providing the storage apparatus 211.

The decoder 213 carries out a decryption process of encrypted content data, a decoding process, a surround process, a conversion process into PCM data and so forth.

The communication apparatus 215 is formed from a USB controller, USB terminals and so forth and sends and receives various data such as a content, a source ID list L, ICV data, content management information and a control signal to and from a content processing apparatus 10 connected through the local line 9 such as a USB cable.

The audio outputting circuit 216 amplifies analog sound data decoded by the decoder 213 and DA converted by the CPU and outputs the amplified analog sound data to the remote controller 218. This analog sound data is outputted from the remote controller 218 to the headphone 219 and outputted from the speaker built in the headphone 219.

Here, a principal data flow of the content reproduction apparatus 20 of such a configuration as described above is described.

First, a data flow when the content reproduction apparatus (PD) 20 receives a content from the content processing apparatus (PC) 10 is described. If the content reproduction apparatus 20 and a content processing apparatus 10 are connected to each other by the local line 9 such as a USB cable, then the content processing apparatus 10 recognizes the content reproduction apparatus 20 as a removable HDD. If, in this state, the content processing apparatus 10 sends content data and control information such as ICV data to the content reproduction apparatus 20, then the communication apparatus 215 receives the sent data. Then, the received content data is stored directly into the storage apparatus 211 by the communication apparatus 215. Meanwhile, the control information received by the communication apparatus 215 is inputted through the data processing apparatus 204 to the main control apparatus 201 so that it is stored into a predetermined storage area.

Now, a data flow when the content reproduction apparatus (PD) 20 reproduces a content is described. First, a reproduction request for a content is inputted to the main control apparatus 201. If reproduction of the content is permitted by the main control apparatus 201, then the data processing apparatus 204 reads out content data of a reproduction object from the storage apparatus 211 and transfers the content data to the RAM 203, while it simultaneously transfers the content data transferred to the RAM 203 to the decoder 213. Then, the decoder 203 carries out a decryption process, a decoding process, a surround process, a conversion process into PCM data and so forth of encrypted content data and transfers resulting data to the main control apparatus 201. Then, the main control apparatus 201 carries out volume adjustment of the inputted PCM data by means of a DA converter (not shown), carries out the resulting PCM data into analog sound data and transfers the analog sound data to the amplifier of the audio outputting circuit 216. The audio outputting circuit 216 outputs the analog sound data from the headphone 219 through the remote controller 218.

Now, principal functions of the content reproduction apparatus 20 according to the present embodiment are described with reference to FIG. 10. It is to be noted that FIG. 10 is a block diagram schematically showing functions of the content reproduction apparatus 20 according to the present embodiment.

Figure 10:
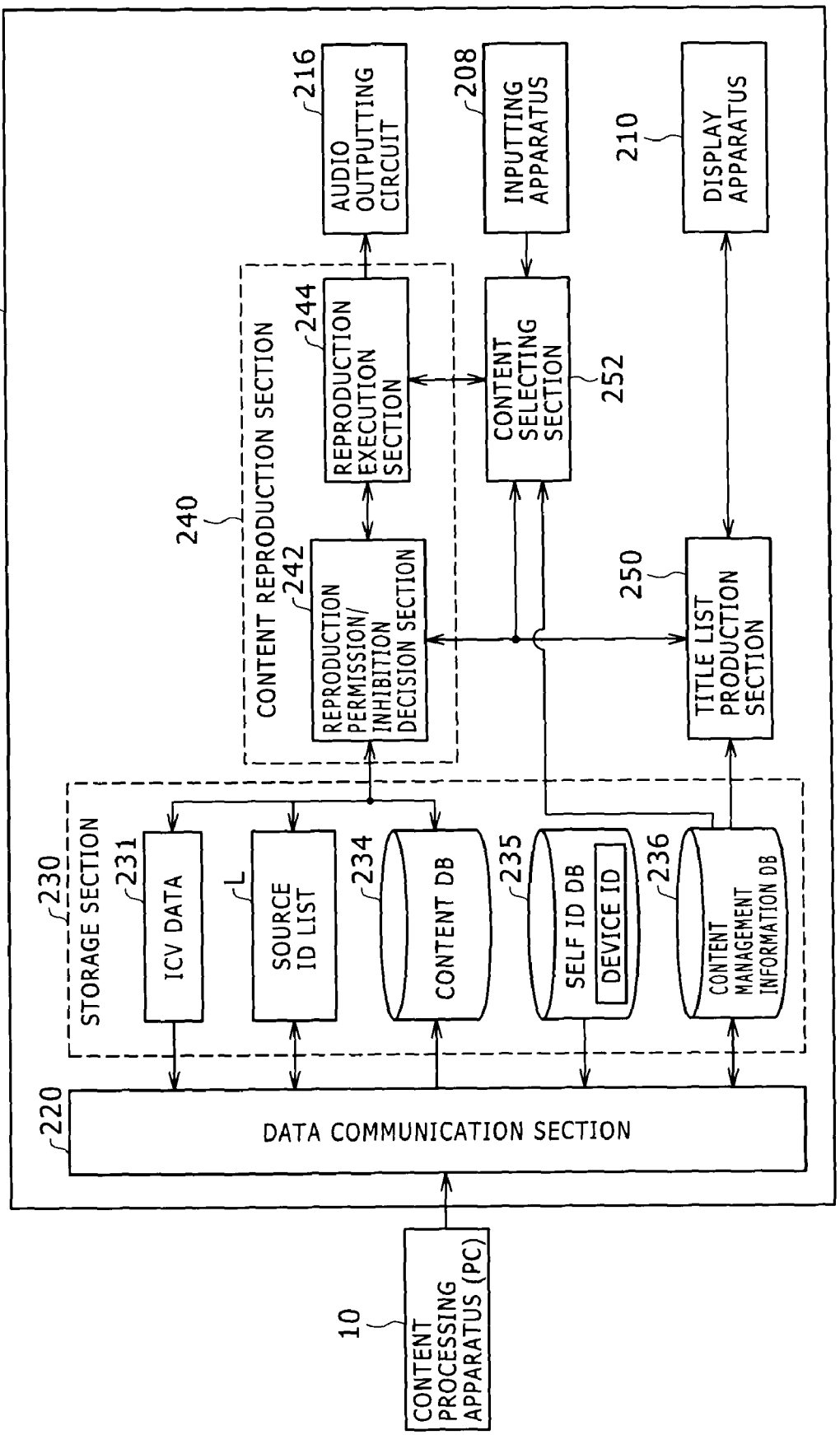
FIG. 10 is a block diagram schematically showing functions of the content reproduction apparatus according to the embodiment.

As shown in FIG. 10, the content processing apparatus 10 includes, for example, a data communication section 220, a storage section 230, a content reproduction section 240 including a reproduction permission/inhibition decision section 242 and a reproduction execution section 244, a title list production section 250 and a content selection section 252.

The data communication section 220 utilizes the communication apparatus 215 to send and receive data to and from a content processing apparatus 10 through the local line 9.

The storage section 230 is formed, for example, from the storage apparatus 211, the flash memory 202 described hereinabove or the like and stores various data in the content processing apparatus 10. The storage section 230 stores, for example, ICV data 231, a source ID list L, a content database 234, a self ID database 235 and a content management database 236.

The ICV data 231 is produced by the ICV data management section 186 of the content processing apparatus 10 and transferred to the content reproduction apparatus 20, and is used to check the validity of a content reproduction process by the content reproduction apparatus 20. The ICV data 231 includes, for example, a MAC value of the source ID list L.

Meanwhile, the source ID list L in the storage section 230 is substantially same as the source ID list L of the content processing apparatus 10 described hereinabove. When the content reproduction apparatus 20 is group-registered, a group ID is added thereto, and also the group ID of each content processing apparatus 10 belonging to the same apparatus group is added. In the present embodiment, the source ID list L is updated by the list management section 140 of the content processing apparatus 10. However, a list management section may be provided in the content reproduction apparatus 20 such that the content reproduction apparatus 20 may update the source ID list L of the content reproduction apparatus 20 itself.

Meanwhile, the content database 234 stores a content transferred from the content processing apparatus 10. In particular, for example, a content to which a license including such a source ID as illustrated in FIG. 6 is added or a content which is not under copyright management is recorded in the content database 234.

In the self ID database 235, for example, various IDs such as a device ID corresponding to the content reproduction apparatus 20 are stored. This device ID is an identifier (apparatus ID) applied uniquely in a unit of a content reproduction apparatus 20 and is used upon group registration of the content reproduction apparatus 20. This group ID is applied, for example, upon shipment of the content reproduction apparatus 20 from a factory and is stored in safety in the self ID database 235.

In the content management information database 236, attribute information relating to contents stored in the content database 234 (for example, a content ID, a tune name of the content, an artist name, an album name and so forth), recording place information (for example, an address in the content database 234) and so forth are recorded similarly to the content management information database 118 of the content processing apparatus 10 described hereinabove.

The content reproduction section 240 is a component corresponding to the content reproduction section 2 shown in FIG. 2. This content reproduction section 240 is formed, for example, from a reproduction apparatus having a content reproduction function, content reproduction software installed in the content reproduction apparatus 20 or the like, and can reproduce various kinds of contents. A content reproduced by this content reproduction section 240 is outputted from the audio outputting circuit 216.

Meanwhile, the content reproduction section 170 is ready for a content, for example, of the group management system and can execute reproduction control of the group management system. In particular, the content reproduction section 240 controls reproduction of a content of a reproduction object based on whether or not the source ID added to the content of the reproduction object is included in the source ID list L. Such a content reproduction section 170 as just described includes a reproduction permission/inhibition decision section 242 and a reproduction execution section 244.

The reproduction permission/inhibition decision section 242 decides whether or not reproduction of a content of a reproduction object can be permitted in accordance with a reproduction control system of the group management system. In particular, the reproduction permission/inhibition decision section 242 decides based on the source ID added to the content of the reproduction object and the source ID list L whether or not reproduction of the content may be permitted. It is to be noted that, where a term of validity is set to the source ID in the source ID list L, reproduction of the content is permitted if the source ID is within the term of validity. It is to be noted that the reproduction permission/inhibition decision section 242 has functions substantially similar to those of the reproduction permission/inhibition decision section 172 of the content processing apparatus 10 described hereinabove, and therefore, detailed description thereof is omitted.

The reproduction execution section 244 reproduces a content decided to be reproducible by the reproduction permission/inhibition decision section 242 and does audio output ciruit. It is to be noted the reproduction execution section 244 has substantially same functions as those of the reproduction execution section 174 of the content processing apparatus 10 described hereinabove, and hence, detailed description thereof is omitted.

The title list production section 250 reads out attribute information of all or some of contents stored in the content database 234 from the content management information database 236 and produces a title list which is a list of the attribute information of the contents. This title list is a list, for example, of tune names of music contents and includes an artist name, an album name, reproduction and so forth of music contents as incidental information. Further, the title list production section 250 causes the produced title list to be displayed on the display apparatus 210. Consequently, the user can access the title list to select a content whose reproduction is desired and operate the inputting apparatus 208 to designate title information of the content to issue a reproduction request.

The content selection section 252 selects a content of a reproduction object based on a user input to the inputting apparatus 208 and outputs a result of the selection to the reproduction permission/inhibition decision section 242. In particular, the content selection section 252 reads out the content ID and the storage place of the content corresponding to text information of the content whose reproduction is requested by the user from the content management information database 236 and outputs the information to the reproduction permission/inhibition decision section 242. As a result, the reproduction permission/inhibition decision section 242 carries out a reproduction permission/inhibition decision regarding the selected content of the reproduction object, and only a reproducible one of the contents is reproduced by the reproduction execution section 244.

The functional configuration of the content reproduction apparatus 20 according to the present embodiment is described above. The content reproduction apparatus 20 is ready for such copyright management of the group management system that reproduction of a content is controlled based on the source ID added to the content and the source ID list L. Therefore, since the user can download the content from a content processing apparatus 10 owned by the user into a content reproduction apparatus 20 and reproduce the content freely, the copyright management of the group management system is higher in degree of freedom in content utilization by a user and is more user-friendly than that of the conventional check-in checkout system.

It is to be noted that the data communication section 220, content reproduction section 240, reproduction permission/inhibition decision section 242, reproduction execution section 244, title list production section 250, content selection section 252 and so forth described above may be formed, for example, as hardware having the functions described hereinabove or may be formed by installing a program for causing a computer to implement the functions described above into the content reproduction apparatus 20.

Further, in the embodiment described above, where no source ID is added to a content, the reproduction permission/inhibition decision section 242 of the content reproduction apparatus 20 decides that the content does not require copyright management and permits reproduction of the content, and outputs a reproduction instruction signal of the content to the reproduction execution section 244. In particular, the content reproduction apparatus 20 is configured such that it can freely reproduce a content which is not under copyright protection such as a content to which no ID is added. Utilization restriction of such a content which is not under copyright protection as just described can be implemented by the group management system described above. A technique therefor is described below.

First, if a request to transfer a content which is stored in the content database 116 but is not under copyright protection to a content reproduction apparatus 20 is accepted, then the content transfer section 188 of the content processing apparatus 10 described hereinabove acquires the source ID list L in a content reproduction apparatus 20 connected by the local line 9 (step 1).

Then, the content transfer section 188 compares the group ID in the acquired source ID list L of the content reproduction apparatus 20 with the group ID in the source ID list L included in the content processing apparatus 10 itself (step 2).

If a result of the comparison indicates that the two group IDs described above coincide with each other, then the content transfer section 188 permits transfer of the content whose transfer request is accepted and which is not under copyright protection from the content processing apparatus 10 to the content reproduction apparatus 20. However, if the two group IDs do not coincide with each other, then the content transfer section 188 inhibits such transfer (step 3).

Further, although transfer of a content which is not under copyright protection from a content reproduction apparatus 20 to a content processing apparatus 10 is basically inhibited, also it is possible to use a configuration that transfer of part of such content is permitted by the group management system described above. A technique therefor is described below.

First, if a request to transfer a content which is stored in a content reproduction apparatus 20 connected by the local line 9 and is not under copyright protection to a content processing apparatus 10 is accepted from the content reproduction apparatus 20, then the content transfer section 188 of the content processing apparatus 10 acquires the source ID list L in the content reproduction apparatus 20 (step 1).

Then, the content transfer section 188 compares the group ID in the acquired source ID list L of the content reproduction apparatus 20 and the group ID in the source ID list L included in the content processing apparatus 10 itself with each other (step 2).

If a result of the comparison reveals that the two group IDs described above coincide with each other, then the content transfer section 188 permits transfer of the content, whose transfer request is received and which is not under copyright protection, from the content reproduction apparatus 20 to the content processing apparatus 10, but, if the two group IDs do not coincide with each other, then the content transfer section 188 inhibits the transfer (step 3).

In this manner, in the copyright management system of the group management system according to the present embodiment, by controlling transfer between a content processing apparatus 10 and a content reproduction apparatus 20, also copy transfer of a content which is not under copyright protection can be restricted to achieve utilization restriction.

<5. Server Apparatus>

Now, a configuration of the server apparatus 30 according to the present embodiment is described in detail with reference to FIG. 11. It is to be noted that FIG. 11 is a block diagram schematically showing functions of the server apparatus 30 according to the present embodiment.

Figure 11:
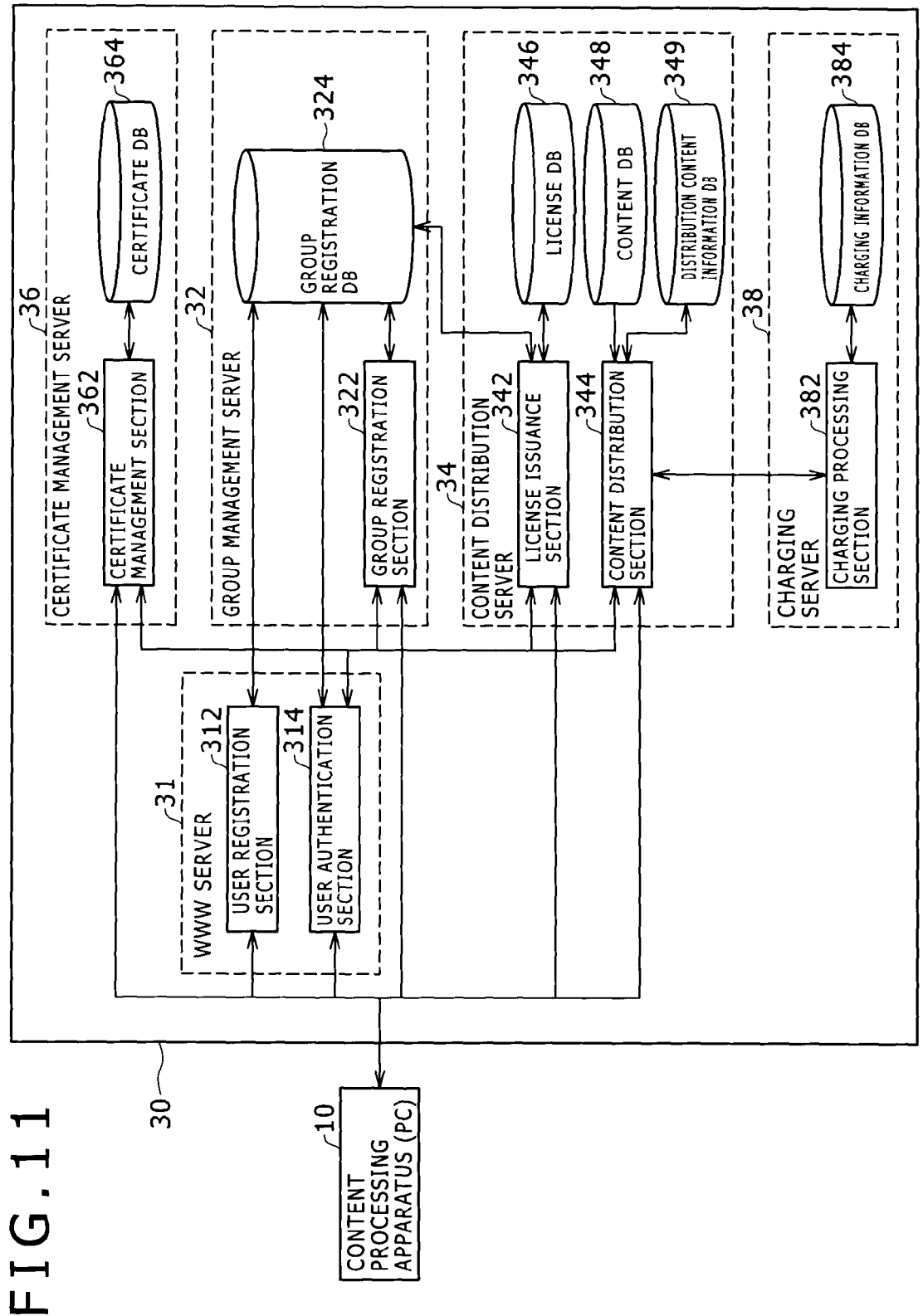
FIG. 11 is a block diagram schematically showing functions of a server according to the embodiment.

As shown in FIG. 11, the server apparatus 30 includes, for example, a WWW server 31, a group management server 32, a content distribution server 34, a certificate management server 36 and a charging server 38.

Of the components, the WWW server 31, group management server 32 and certificate management server 36 form a content sharing service execution server and execute a content sharing service for group-registering a plurality of content processing apparatus 10 and content reproduction apparatus 20 owned by the same user so that a content is shared among the plural group-registered apparatus. Meanwhile, the WWW server 31, content distribution server 34 and charging server 38 form a distribution service execution server and carry out a content distribution service of distributing a content, for example, for a charge for the user of the content processing apparatus 10.

In the following, a functional configuration of the servers 31, 32, 34, 36 and 38 is described individually. It is to be noted that the hardware configuration of the servers 31, 32, 34, 36 and 38 according the present embodiment are similar to the hardware configuration of the content processing apparatus (PC) 10 described hereinabove with reference to FIG. 4, and therefore, description of the same is omitted.

First, the WWW server 31 is described. The WWW server 31 accepts a request from a content processing apparatus 10 which accesses the WWW server 31 through the network 5, and controls communication between the content processing apparatus 10 and the server apparatus 30. The WWW server 31 includes a user registration section 312 and a user authentication section 314.

The user registration section 312 carries out a registration process of a new user who desires utilization of the content sharing service and/or content distribution service, a registration changing process, a registration cancellation process, management of user account information (user ID, credit number, password and so forth) and so forth. To a service-registered user, a leaf ID unique in a unit of a user is applied. Various user account information and a leaf ID determined by such a registration process by the user registration section 312 as described above are stored into a group registration database 324. However, the management of the user account information and leaf ID is not limited to this example, but a user registration database may be provided in the WWW server 31 such that the user account information and leaf ID are managed in the user registration database.

The user authentication section 314 carries out a user authentication process of authenticating a user who owns a content processing apparatus 10, which is owned, for example, by a user registered in the content sharing service and/or the content distribution service in such a manner as described above and which is a source of a connection request (registration request, registration cancellation request, content distribution request, certificate request, user account information changing request or the like), in response to the connection request. This user authentication process is carried out, for example, based on user account information or the like inputted by the user and the user account information of the group registration database 324. The authenticated user is acknowledged, for example, to log in the group management server 32, content distribution server 34, certificate management server 36 or the like.

Now, the group management server 32 is described. The group management server 32 group-registers a plurality of content processing apparatus 10 and content reproduction apparatus 20 owned by the same user. This group management server 32 includes a group registration section 322 and a group registration database 324.

The group registration database 324 is stored in a storage medium such as, for example, a storage apparatus (not shown) such as a HDD provided in the group management server 32. In the group registration database 324, as shown in FIG. 12, for example, user account information (user ID 3241 and credit card number 3242) of a user who enjoys the content sharing service and the content distribution service, a leaf ID 3243 corresponding to each user, an apparatus ID 3244 of the group-registered content processing apparatus 10 or content reproduction apparatus 20, a recorder ID 3245 of apparatus having a ripping function from among the group-registered content processing apparatus 10 and a related user ID 3246 which is a user ID of a different user linked to a certain user are stored in an associated relationship with each other.

To one user ID (user account) 3241, for example, one leaf ID 3243 is allocated. Further, with the leaf ID 3243 of each user, the apparatus ID 3244 (terminal ID or device ID) of one, two or more ones of the content processing apparatus 10 and content reproduction apparatus 20 which are registered in the apparatus group of the user indicated by the leaf ID are associated. Here, as the apparatus ID 3244 of the content processing apparatus (PC) 10, the terminal ID described hereinabove is registered, and as the apparatus ID 3244 of the content reproduction apparatus (PD) 20, the device ID described above is registered. Further, with the terminal ID, the recorder ID of those content processing apparatus 10 which have the ripping function is associated.

Further, in the group registration database 324, the related user ID 3246 is registered in order to mutually link a plurality of users who utilize a content within the range of a personal use. In particular, in the user identification information (first user identification information, for example, a user ID) for specifying each user, an associated user ID which is user identification information (second user identification information, for example, a user ID) of a user registered in an associated relationship with the user is registered.

For example, in the example of FIG. 12, a user ID-B and a user ID-C are registered as the related user ID 3246 in an associated relationship in the record of the user ID-A of the user A, and the two users of the user B and the user C are user-linked to the user A. Further, in the record of the user ID-B of the user B, the user ID-A is registered in an associated relationship as the related user ID 3246, and only the one user of the user A is user-linked to the user B. By associating the user IDs with each other in this manner, the function (user link function) of registering a plurality of users in an associated relationship with each other is a characteristic function according to the present embodiment, and details of the same are hereinafter described.

The group registration section 322 group-registers a content processing apparatus 10 or a content reproduction apparatus 20 of a registration request source into an apparatus group owned by a user authenticated by the user authentication section 314. The group registration process is carried out, for example, when group registration request information (for example, a registration request notification, a terminal ID or a device ID, a recorder ID and so forth) is received from the registration requesting section 130 of the content processing apparatus 10 after the user authentication process described above is performed. When an apparatus is to be group-registered, the apparatus ID (terminal ID or device ID, recorder ID and so forth) of the content processing apparatus 10 or the content reproduction apparatus 20 of the registration request source described hereinabove is written into a site corresponding to the authenticated user in the column of the apparatus ID 3244 of the group registration database 324. Consequently, the apparatus ID of the group-registered apparatus and the leaf ID (apparatus group) applied to the authenticated user are associated with each other.

Further, the group registration section 322 inhibits registration of the same content processing apparatus 10 into a different apparatus group. To this end, the group registration section 322 searches the group registration database 324, and if the apparatus ID of the content processing apparatus 10 of the registration request source is already stored in the group registration database 324, then the group registration section 322 refuses the registration of the content processing apparatus 10 or the content reproduction apparatus 20 so that the apparatus ID may not written into the group registration database 324 newly. By this, one content processing apparatus 10 or content reproduction apparatus 20 is permitted to belong to only one apparatus group.

Further, also it is possible for the group registration section 322 to set an upper limit number to those content processing apparatus 10 or content reproduction apparatus 20 which can be registered in the same apparatus group, particularly an upper limit number of those content processing apparatus 10 which can be associated with a leaf ID of the same user. For example, the group registration section 322 may set the upper limit number of content processing apparatus (PC) 10 which can be registered in the same apparatus group, for example, to a predetermined number (for example, three) so that only a predetermined upper limit number of (for example, three) terminal IDs are associated with a certain leaf ID. In this instance, if a number of registration requests higher than the upper limit number are received from a content processing apparatus (PC) 10 which has a terminal ID as the apparatus ID, then the group registration section 322 rejects the registration of them. By this, since the number of content processing apparatus (PC) 10 which can be registered in the same apparatus group can be restricted, for example, to three, the number of content processing apparatus (PC) 10 which can receive a distribution content within the same apparatus group can be restricted.

As another example of the upper limit number, for example, an upper limit number (for example, 10) of recorder IDs which can be associated with the same group ID may be set, for example, by the group registration section 322. In this instance, if a number of registration requests exceeding the upper limit number are received from content processing apparatus (PC) 10 having a recorder ID, then the group registration section 322 rejects such registration. By this, since the number of content processing apparatus 10 having a ripping function which can be registered into the same apparatus group can be restricted, the number of content processing apparatus 10 which can become a providing source of a shareable ripped content within the same apparatus can be restricted.

Further, where a content processing apparatus 10 is registered into a predetermined apparatus group in such a manner as described above, the group registration section 322 notifies the group-registered content processing apparatus 10 of service data. This service data includes, for example, a leaf ID corresponding to the authenticated user (registered apparatus group) and a service common key for utilizing a content. By this, the group-registered content processing apparatus 10 can receive a leaf ID, convert the leaf ID into a group ID and add the group ID to the source ID list L of the content processing apparatus 10 itself.

It is to be noted that, not in place of issuance of a notification of a leaf ID from the group registration section 322 of the group management server 32 to the content processing apparatus 10 in this manner, the group registration section 322 may produce a group ID based on a leaf ID or the like in advance and notify the content processing apparatus 10 of the produced group ID. In this instance, the content processing apparatus 10 by itself may not produce a group ID but can add the group ID received from the group management server 32 as it is to the source ID list L.

Further, the group registration section 322 cancels the registration of a content processing apparatus 10 of a registration cancellation request source from an apparatus group owned by the authenticated user. This group registration cancellation process is carried out, for example, when, after the user authentication process is carried out, group registration cancellation request information (for example, a group registration cancellation request notification, a terminal ID or a device ID, a recorder ID and so forth) is received from the registration requesting section 130 of the content processing apparatus 10. In order to cancel the group registration of the apparatus, the apparatus ID (terminal ID, device ID) of the content processing apparatus 10 or the content reproduction apparatus 20 of the registration cancellation request source is deleted from the column of the apparatus ID 3244 of the group registration database 324 described hereinabove. It is to be noted, however, that the recorder ID is not deleted even if the registration of the pertaining content processing apparatus (PC) 10 is canceled. By this, if a number of content processing apparatus 10, which have a ripping function, equal to the predetermined upper limit number (for example, 10) are group-registered once, then even if the registration of any of the content processing apparatus 10 is canceled, a new content processing apparatus 10 cannot be registered additionally. Accordingly, the number of registered content processing apparatus 10 which can produce a shareable ripped content can be suppressed to severely carry out copyright management of ripping contents.

Now, the certificate management server 36 is described. The certificate management server 36 collects and manages group certificates G individually issued by the content processing apparatus 10 and distributes a group certificate G to another content processing apparatus 10 belonging to an apparatus group of the same user. The certificate management server 36 includes a certificate management section 362 and a certificate database 364.

The certificate database 364 is stored in a storage apparatus (not shown) such as a HDD provided in the certificate management server 36. This certificate database 364 retains group certificates G issued by the individual content processing apparatus 10 in an associated relationship with users (leaf IDs) of the content processing apparatus 10.

The certificate management section 362 acquires a group certificate G issued by each content processing apparatus 10 through the network 5 and stores the acquired group certificate G in an associated relationship with its user into the certificate database 364. Further, the certificate management section 362 reads out a group certificate G of one, two or more content processing apparatus 10 belonging to the apparatus group of a certain user from the certificate database 364 and distributes the group certificate G to another content processing apparatus 10 belonging to the same apparatus group or the like.

For example, when a content processing apparatus 10 is group-registered by the group management server 32 described above, the certificate management section 362 acquires a group certificate G wherein the recorder ID of the content processing apparatus 10 and the group ID are associated with each other from the registered content processing apparatus 10 and stores the group certificate G into the certificate database 364. Further, if a different content processing apparatus 10 is registered newly into the same apparatus group, then the certificate management section 362 distributes the group certificates G of the content processing apparatus 10 registered already in the same apparatus group to the newly registered content processing apparatus 10. By this, the newly registered content processing apparatus 10 can share a ripped content by acquiring the recorder IDs of the content processing apparatus 10 registered already and adding the acquired recorder IDs to the source ID list L.

Further, when a distribution request for a certificate is received from a content processing apparatus 10 registered already, when the content processing apparatus 10 accesses the server apparatus 30 or in a like case, the certificate management section 362 may distribute the group certificates G of the other content processing apparatus 10 belonging to the same apparatus group to the content processing apparatus 10.

Further, if the registration of a content processing apparatus 10 is canceled, then the certificate management section 362 deletes the group certificate G of the content processing apparatus 10 whose registration is canceled from the certificate database 364.

In this manner, the certificate management section 362 of the certificate management server 36 carries out integrated management of group certificates G issued from individual content processing apparatus 10 and distribute the group certificates G to the other content processing apparatus 10 belonging to the same apparatus group. By this, each content processing apparatus 10 can acquire the group certificates G of the other content processing apparatus 10 without directly connecting the content processing apparatus 10 to each other. Further, by carrying out integrated management of the group certificates G by means of the certificate management server 36, each content processing apparatus 10 can always acquire the latest group certificates G. For example, each content processing apparatus 10 can acquire the group certificates G of all content processing apparatus 10 belonging to the apparatus group of the same user and add the recorder IDs of the content processing apparatus 10 to the source ID list L.

Now, the content distribution server 34 is described. The content distribution server 34 distributes a content, for example, for a charge to a content processing apparatus 10 of a user group-registered in the content distribution service. The content distribution server 34 is configured such that it can distribute both of a content ready for the copyright management scheme of the group management system described hereinabove and a content ready for the copyright management scheme of the check-in check-out system described hereinabove.

This content distribution server 34 includes, for example, a license issuance section 342, a content distribution section 344, a license database 346, a content database 348 and a distribution content information database 349.

The license database 346, content database 348 and distribution content information database 349 are stored in a recording medium such as, for example, a storage apparatus (not shown) such as a HDD provided in the content distribution server 34. The license database 346 is a database which stores a license issued upon content distribution. The content database 348 is a database which stores a plurality of contents which are a distribution object of the content distribution service. The distribution content information database 349 is a database which stores content identification information of contents distributed to the content processing apparatus 10 separately for individual users who own the content processing apparatus 10 of distribution destinations.

The content distribution section 344 allows, for example, an authenticated user to access a list of distributable contents and select a distribution content desired to be distributed. Further, the content distribution section 344 distributes the selected distribution content to the content processing apparatus 10 used by the user through the network 5. It is to be noted that this distribution process is executed, for example, under the condition of such a charging process as hereinafter described.

Further, the content distribution section 344 sends also information (a content ID, title information (a tune name, an artist name, an album name, reproduction time and so forth))

relating to the distribution content stored, for example, in the content database 348 or the like together with the distribution content.

Further, the content distribution section 344 records identification information (for example, a content ID, a tune name and so forth) of the distributed content and user identification information (for example, a user ID) of the user who owns the content processing apparatus 10 of the distribution destination in an associated relationship with each other into the distribution content information database 349. By this, it can be managed to which user the content has been distributed.

The license issuance section 342 issues a license (right information; Usage Right) of a content to be distributed by the content distribution section 344. Where copyright management of the group management system is to be carried out, the license issuance section 342 issues a license including a leaf ID corresponding to the user who purchases the distribution content in an associated relationship with the distribution content. Thereupon, the license issuance section 342 may acquire the leaf ID corresponding to the user from the group registration database 324 or from the user authentication section 314.

After the license issuance section 342 issues a license in this manner, the content distribution server 34 sends a file of the distribution content and a file of the license including the leaf ID corresponding to the user who purchases the distribution content in an associated relationship with each other to the content processing apparatus 10. As a result, the content processing apparatus 10 receiving the distribution content and the license converts the leaf ID into a group ID and adds the group ID to the distribution contents, and then causes the group ID to function as the source ID for the distribution content to execute copyright management of the group management system. The license issuance section 342 stores the issued license into the license database 346 and manages the license.

As described above, upon content distribution to a content processing apparatus 10, the content distribution server 34 sends a distribution content and a license therefor as one set.

It is to be noted that, while, in the foregoing description, the content distribution server 34 sends a distribution content and a license in separate files, it may otherwise send both of them in the same file. Further, while, in the foregoing description, upon content distribution of the group management system, the content distribution server 34 notifies a content processing apparatus 10 of a leaf ID and the content processing apparatus 10 produces a group ID based on the received leaf ID, the production of a group ID is not limited to this. For example, the content distribution server 34 may produce a group ID in advance based on the leaf ID and notify a content processing apparatus 10 of the produced group ID.

Now, the charging server is described. The charging server 38 carries out a charging process in response to distribution of a content by the content distribution server 34 described hereinabove. The charging server 38 includes, for example, a charging processing section 382 and a charging information database 384.

The charging information database 384 is a database formed from charging information for individual users and is stored in a storage apparatus (not shown) such as a HDD included in the charging server 38.

The charging processing section 382 carries out a charging process of claiming, for example, a user to which a content is distributed for payment of an amount of money corresponding to the distributed content. Charging information such as the claimed amount of money, settling method, settlement date and so forth produced in the charging process is stored, for example, into the charging information database 384.

<6. Content Settlement Method>

Figure 13:
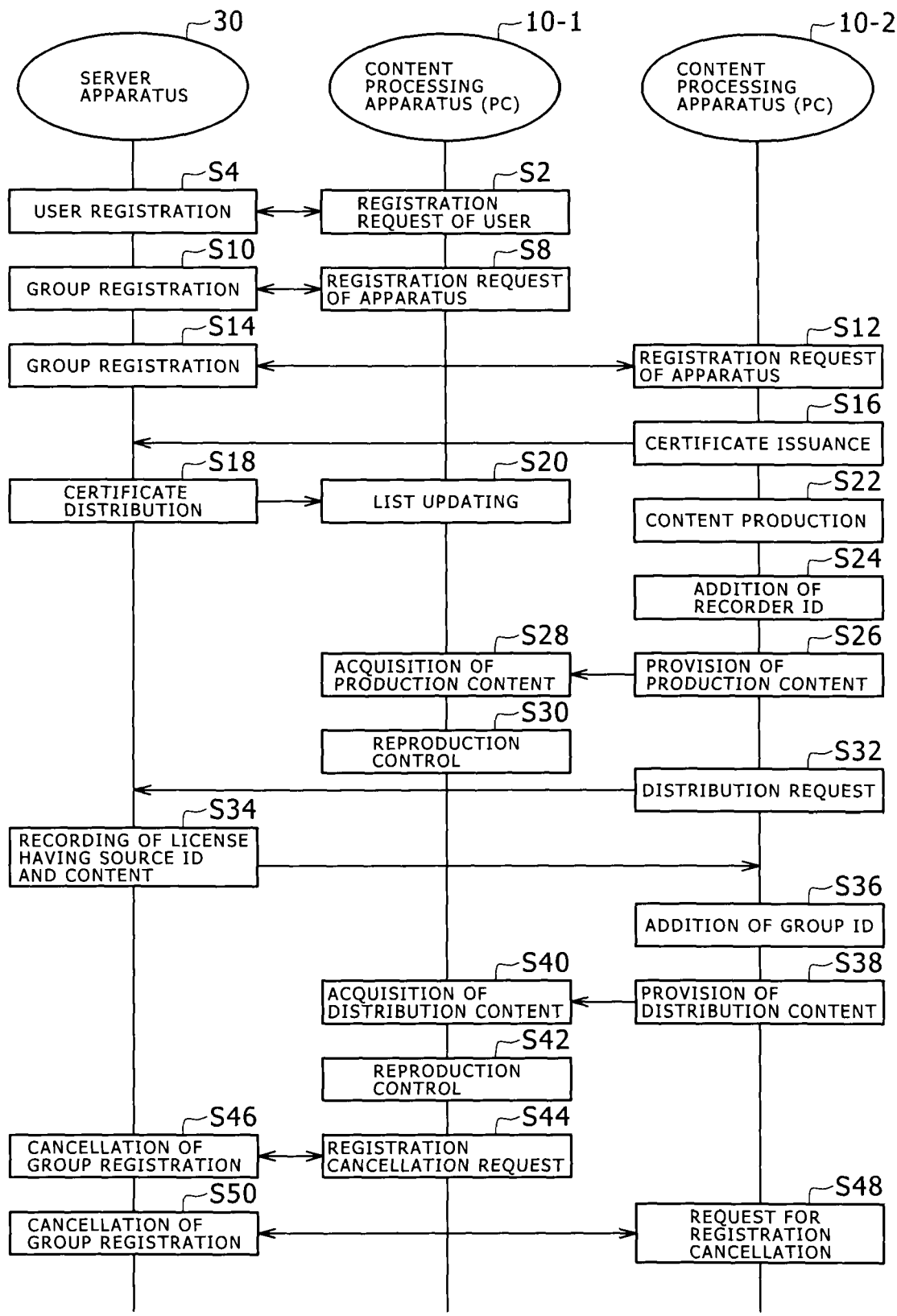
FIG. 13 is a timing chart illustrating a basic flow of a content sharing method according to the embodiment.

Now, a basic flow of the content sharing method which utilizes such a copyright management system 100 as described hereinabove is described with reference to FIG. 13. FIG. 13 is a flow chart illustrating a basic flow of the content sharing method according to the present embodiment.

As shown in FIG. 13, a new user would first use some content processing apparatus (PC) 10-1 owned thereby to issue a user registration request for the content sharing service which utilizes a copyright management scheme of the group management system to the WWW server 31 of the server apparatus 30 (S2). Consequently, the WWW server 31 carries out a user authentication process for the user, applies a new leaf ID to the user and user-registers the user (S4). It is to be noted that the user registration for the content sharing service may serve also as user registration for the content distribution service. Or, the user registration process may be carried out by the group management server 32 in place of the WWW server 31.

Then, the user would use the content processing apparatus (PC) 10-1 and 10-2 owned by the user itself to issue a registration request for the individual apparatus to the server apparatus 30 (S8, S12). Consequently, the group management server 32 group-registers the content processing apparatus 10-1 and 10-2 into an apparatus group of the user in accordance with the registration requests of the apparatus and notifies the content processing apparatus 10-1 and 10-2 of a leaf ID corresponding to the user (S10, S14). The content processing apparatus 10-1 and 10-2 convert the received leaf ID into a group ID and add the group ID individually to the source ID lists L of the content processing apparatus 10-1 and 10-2 themselves. It is to be noted that such apparatus group registration of the two content processing apparatus 10 need not be carried out simultaneously but may be carried out individually at arbitrary timings.

Then, the content processing apparatus 10-2 issues a group certificate G wherein a group ID and a recorder ID corresponding to the content processing apparatus 10-2 itself are associated with each other and sends the group certificate G to the certificate management server 36 of the server apparatus 30. Further, the certificate management server 36 distributes the group certificate G of the content processing apparatus 10-2 to the content processing apparatus 10-1 (S18). It is to be noted that such distribution of the group certificate G may be carried out directly from the content processing apparatus 10-2 to the content processing apparatus 10-1 without the intervention of the certificate management server 36. Similarly, the group certificate G of the content processing apparatus 10-1 may be distributed to the content processing apparatus 10-2.

After the content processing apparatus 10-1 acquires the group certificate G distributed in such a manner as described above, it carries out an updating process of the source ID list L owned thereby (S20). In this list updating process, where the content processing apparatus 10-1 and 10-2 are registered in the same apparatus group in the group registration described above, since they have the same group ID, the content processing apparatus 10-1 can add the recorder ID of the content processing apparatus 10-2 included in the group certificate G to the source ID list L. Meanwhile, where the content processing apparatus 10-1 and 10-2 are registered in different apparatus groups, since the two apparatus have different group IDs, the content processing apparatus 10-1 cannot add the recorder ID included in the group certificate G to the source ID list L of the content processing apparatus 10-1 itself.

In the following description, a case wherein, in such a state as described above, a content provided from the content processing apparatus 10-2 is acquired by the content processing apparatus 10-1 and shared is described.

First, a case wherein a production content such as a ripped content is shared is described. The content processing apparatus 10-2 produces a content by ripping, self recording or the like (S22) and adds the recorder ID corresponding to the content processing apparatus 10-2 to such a production content as just described (S24). Then, the content processing apparatus 10-2 provides the production content to which the recorder ID is added to the content processing apparatus 10-1 through the network 5 or local line 9, a storage medium 7 or the like (S26).

Thereafter, the content processing apparatus 10-1 acquires the production content (S28) and executes a reproduction control process for the production content, for example, in response to a reproduction request of the user (S30). In this instance, if the recorder ID added to the production content is included in the source ID list L of the content processing apparatus 10-1, then the content processing apparatus 10-1 can reproduce the production content. On the other hand, if the recorder ID is not included in the source ID list L, the content processing apparatus 10-1 cannot reproduce the production content.

Now, a case wherein distribution content data is shared is described. First, the content processing apparatus 10-2 issues a distribution request for a content to the group management server 32 (S32). Consequently, the group management server 32 distributes a license including the leaf ID corresponding to the content processing apparatus 10-2 to the content processing apparatus 10-2 (S34). Then, the content processing apparatus 10-2 converts the leaf ID in the received license into a group ID and adds the group ID to the distribution content (S36). Then, the content processing apparatus 10-2 provides the distribution content having the group ID added thereto to the content processing apparatus 10-1 in a similar manner as described above (S38), and the content processing apparatus 10-1 acquires the distribution content (S40). Then, the content processing apparatus 10-1 executes a reproduction control process for the distribution content, for example, in response to a reproduction request of the user (S42). In this instance, where the group ID added to the distribution content is included in the source ID list L of the content processing apparatus 10-1, the content processing apparatus 10-1 can reproduce the distribution content, but where the group ID is not included in the source ID list L, the content processing apparatus 10-1 cannot reproduce the distribution content.

Further, if the content processing apparatus 10-1 and 10-2 individually issue a registration cancellation request (S44, S48), then the group management server 32 cancels the group registrations of the content processing apparatus 10-1 and 10-2 in response to the registration cancellation requests (S46, S50).

In such a content sharing method which uses the copyright management system 100 as described above, if a plurality of content processing apparatus 10 owned by the same user are registered into the same apparatus group, then a production content and a distribution content can be shared comparatively freely between the content processing apparatus 10.

<7. Group Registration/Registration Cancellation Process>

Now, a process of carrying out group registration/registration cancellation of a content processing apparatus (PC) 10 or a content reproduction apparatus (PD) 20 into/from the group management server 32 is described in detail. It is to be noted that, in the following processing flow, it is assumed that user registration for the content sharing service into the group management server 32 is completed already and a leaf ID is applied to a user who owns a content processing apparatus 10.

Figure 14:
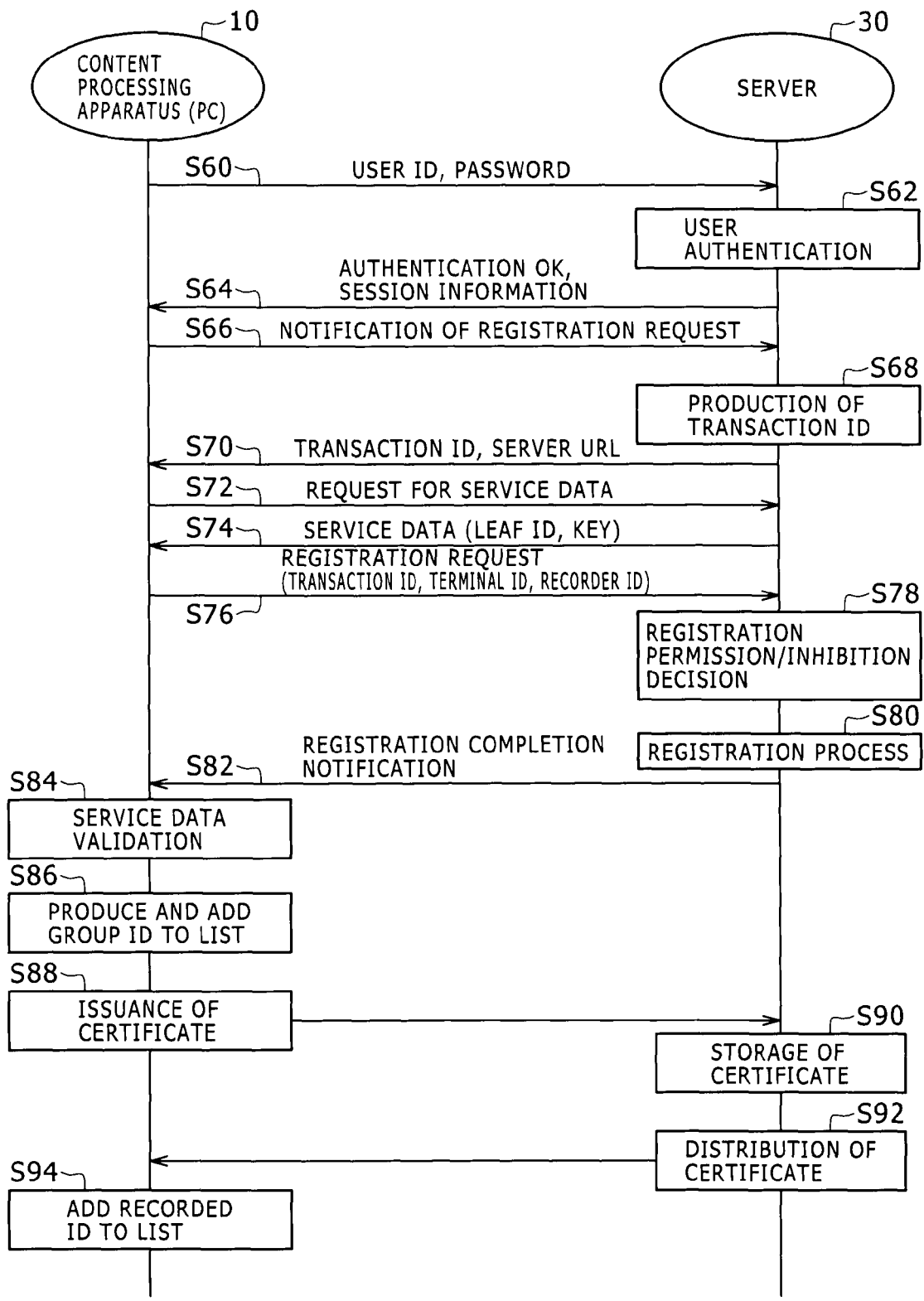
FIG. 14 is a timing chart illustrating a group registration process of a content processing apparatus (PC) according to the embodiment.

First, a process (group registration process) of apparatus-registering the content processing apparatus 10 according to the present embodiment into the group management server 32 is described with reference to FIG. 14. FIG. 14 is a timing chart illustrating a group registration process of the content processing apparatus 10 according to the present embodiment.

As illustrated in FIG. 14, first at steps S60 to S70, a communication connection between the content processing apparatus 10 of the registration request source and the server apparatus 30 through the network 5 is established in safety, and user authentication is carried out. The processes at steps S60 to S70 are carried out between a browser of the content processing apparatus 10 and the WWW server 31 of the server apparatus 30.

In particular, the content processing apparatus 10 first sends a user ID and a password to the WWW server 31 in response to a user input (S60). Consequently, the WWW server 31 compares the received user ID and password with a user ID and a password registered in the group registration database 324 to carry out a user authentication process (S62). If a result of this indicates that the user authentication results in failure, then the WWW server 31 ends the registration process without permitting log-in. On the other hand, if the user authentication results in success, then the WWW server 31 permits log-in and sends a notification representing that the user authentication results in success and session information for carrying out safe communication to the content processing apparatus 10 (S64). Thereafter, the content processing apparatus 10 sends a registration request notification to the content processing apparatus 10 (S64). Then, the content processing apparatus 10 sends a registration request notification to the WWW server 31 (S66). From the registration request notification, the WWW server 31 recognizes that the content processing apparatus 10 has accessed the WWW server 31 for the registration request. Then, the WWW server 31 produces a transaction ID (S68) and sends the produced transaction ID and a URL (Uniform Resource Locator) which is an example of address information of the group management server 32 to the content processing apparatus 10 (S70). By this, the content processing apparatus 10 can thereafter access the group management server 32 based on the received URL.

At steps S72 to S86, processing for actually registering the content processing apparatus 10 into the group management server 32 is carried out. The processing at steps S72 to S86 is carried out between the copyright management section of the content processing apparatus 10 and the group management server 32 of the server apparatus 30.

In particular, the content processing apparatus 10 first requests the group management server 32 for service data (S72). Consequently, the group management server 32 returns the service data to the content processing apparatus 10 (S74). The service data includes a leaf ID corresponding to the authenticated user, and the service common key described above. Then, the content processing apparatus 10 sends the transaction ID received at S70 described above and the terminal ID and the recorder ID corresponding to the content processing apparatus 10 itself to the group management server 32 to request the group management server 32 for registration (S76). The terminal ID and the recorder ID are produced by the content processing apparatus 10. It is to be noted that the information transferred at steps S74 and S76 can be sent and received in safety because falsification thereof from the outside is prevented by the session information.

Then, the group management server 32 decides whether registration of the content processing apparatus 10 is permitted or inhibited (S78). This registration permission/inhibition decision is carried out, for example, based on an upper limit number of content processing apparatus 10 which can be registered into the same apparatus group (for example, an upper limit number of terminal IDs (for example, three), an upper limit number of recorder IDs (for example, 10)). More particularly, if, for example, three content processing apparatus 10 having different terminal IDs from each other are registered already in the apparatus group of the authenticated user, then the group management server 32 inhibits registration of a new content processing apparatus 10. On the other hand, if, for example, 10 content processing apparatus 10 having different recorder IDs have been registered in the apparatus group of the user (it does not matter whether or not they are in a currently registered state), the group management server 32 inhibits registration of a new content processing apparatus 10.

If it is decided as such a result of the registration permission/inhibition decision as at step S78 that the registration is not permitted, then the group management server 32 sends an error notification that the registration is inhibited to the content processing apparatus 10. On the other hand, if it is decided as a result of the registration permission/inhibition decision at step S78 that the registration is permitted, then the group management server 32 carries out a registration process of the content processing apparatus 10 of the registration request source (S80). In particular, the group management server 32 writes and registers the terminal ID and the recorder ID received from the content processing apparatus 10 of the registration request source into a record of the authenticated user in the group registration database 324. Further, the group management server 32 sends a registration completion notification to the registered content processing apparatus 10 (S82).

Then, when the content processing apparatus 10 receives the registration completion notification, it validates the service data received at step S74 described hereinabove (s84). Further, the content processing apparatus 10 produces a group ID (both of the first group ID and the second group ID) based on the leaf ID in the validated service data and additionally stores the group ID into the source ID list of the content processing apparatus 10 itself (S86). Consequently, the content processing apparatus 10 is permitted to reproduce a distribution content to which the group ID is added and add a recorder ID of the group certificate G including the group ID into the source ID list L of the content processing apparatus 10 itself.

After such a registration process of the content processing apparatus 10 as described above, such a certificate issuance and distribution process as described below may be carried out. In particular, the content processing apparatus 10 issues a group certificate G including the group ID and the recorder ID corresponding to the content processing apparatus 10 itself and sends the group certificate G to the certificate management server 36 (S88). Thus, the certificate management server 36 stores the received group certificate G into the certificate database 364 (S90). Consequently, when a different content processing apparatus 10 is registered into the same apparatus group, the group certificate G is distributed so that the recorder ID can be shared.

Furthermore, where the same apparatus group includes one, two or more different content processing apparatus 10 registered already, the group certificates G of the different content processing apparatus 10 registered already are distributed to the content processing apparatus 10 registered as described above (S92). Consequently, the registered content processing apparatus 10 reads out the recorder ID in the received group certificates G and adds the recorder ID to the source ID list L of the content processing apparatus 10 itself (S94). As a result, the content processing apparatus 10 is thereafter permitted to reproduce a ripped content ripped by the different content processing apparatus 10 which belong to the same apparatus group.

Figure 15:
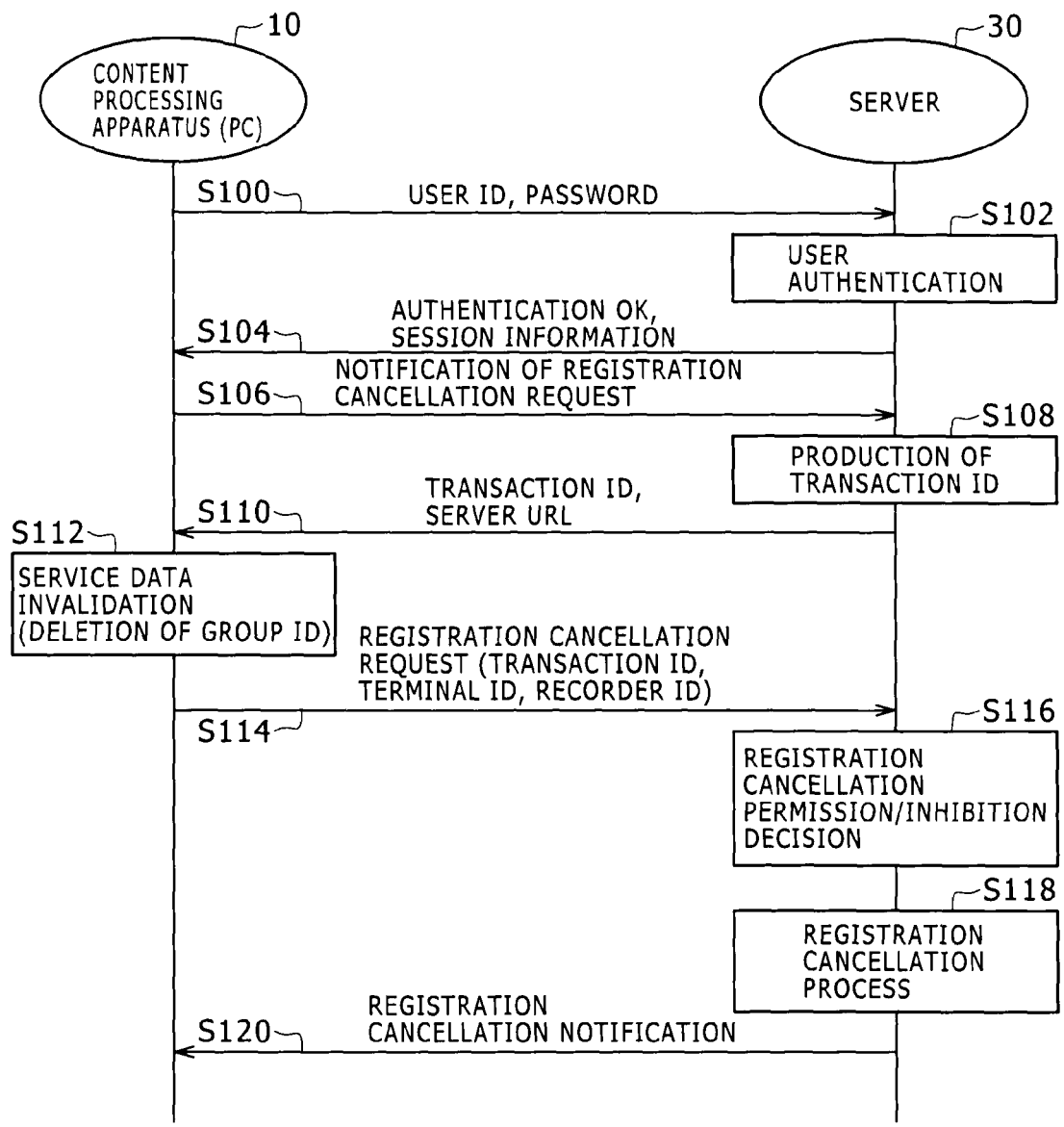
FIG. 15 is a timing chart illustrating a group registration cancellation process of the content processing apparatus (PC) according to the embodiment.

Now, a process (group registration cancellation process) of canceling a registration of a content processing apparatus 10 according to the present embodiment from an apparatus group registered already is described. FIG. 15 is a timing chart illustrating the group registration cancellation process of the content processing apparatus 10 according to the present embodiment.

As shown in FIG. 15, first at steps S100 to S110, a communication connection through the network 5 is established in safety between a content processing apparatus 10 of a registration cancellation request source and the server apparatus 30, and user authentication is carried out. The processing at steps S100 to S110 is carried out between the browser of the content processing apparatus 10 and the WWW server 31 of the server apparatus 30. It is to be noted that the processing at steps S100 to S110 is substantially same as that at steps S60 to S70 of the group registration process of the content processing apparatus 10 described hereinabove with reference to FIG. 14 except that a registration cancellation request notification is sent from the content processing apparatus 10 to the WWW server 31 at step S106. Therefore, detailed description of the processing is omitted.

At next steps S112 to S120, processing for actually canceling the registration of the content processing apparatus 10 is carried out. The processing at steps S112 to S120 is carried out between the copyright management section of the content processing apparatus 10 and the group management server 32 of the server apparatus 30.

Particularly, the content processing apparatus 10 first invalidates service data acquired from the group management server 32 upon group registration described above and retained in the content processing apparatus 10 (step S112). In particular, the content processing apparatus 10 deletes group IDs and recorder IDs included in the source ID list L of the content processing apparatus 10 itself. Consequently, the content processing apparatus 10 is disabled from reproduction of a content to which any of those source IDs is added.

Then, the content processing apparatus 10 sends the transaction ID received at step S110 described hereinabove and the terminal ID and the recorder ID corresponding to the content processing apparatus 10 itself to the group management server 32 and requests the group management server 32 to carry out registration cancellation (S114). It is to be noted that the information sent at this 114 can be sent in safety because falsification thereof from the outside is prevented by the session information.

Then, when the registration cancellation request is received, the group management server 32 decides whether cancellation of the registration of the content processing apparatus 10 is permitted or inhibited (S116). For example, where the content processing apparatus 10 of the registration cancellation request source is not registered as yet or where the registration cancellation request is an illegal registration cancellation request or in a like case, the group management server 32 does not permit the registration cancellation.

If it is decided as such a result of the registration permission/inhibition decision as at step S116 that the registration cancellation is not permitted, then the group management server 32 sends an error notification that the registration cancellation is inhibited to the content processing apparatus 10.

On the other hand, if it is decided as the registration permission/inhibition decision at step S116 that the registration cancellation is permitted, then the group management server 32 carries out a registration cancellation process of the content processing apparatus 10 of the registration cancellation request source (S118). In particular, the group management server 32 deletes the terminal ID of the content processing apparatus 10 of the registration cancellation request source from the record of the authenticated user in the group registration database 324. Thereupon, the recorder ID of the content processing apparatus 10 of the registration cancellation request source is left without being deleted from the group registration database 324. Consequently, when the ripping content sharing service is provided, such a disadvantage that an excessively great number of content processing apparatus 10 having a ripping function are registered and ripped contents from the excessively great number of content processing apparatus 10 become sharable can be prevented.

Then, the group management server 32 sends a registration cancellation completion notification to the content processing apparatus 10 whose registration is canceled (S120).

In this manner, in the registration cancellation process of the content processing apparatus 10, service data is invalidated (S112) first on the content processing apparatus 10 side, and then the registration cancellation process (S118) is carried out by the group management server 32 side. Consequently, as regards the content processing apparatus 10 whose registration in the group management server 32 is canceled, service data possessed by the content processing apparatus 10 can be invalidated with certainty to delete the group ID and so forth from the source ID list L. Therefore, such a situation that, although the registration of the content processing apparatus 10 is canceled on the group management server 32, service data is not actually invalidated on the content processing apparatus 10 can be prevented.

The group registration process and the registration cancellation process of a content processing apparatus (PC) 10 are described above. It is to be noted that, in order to register a content processing apparatus 10, which is registered already, again, the registration must be canceled once.

Figure 16:
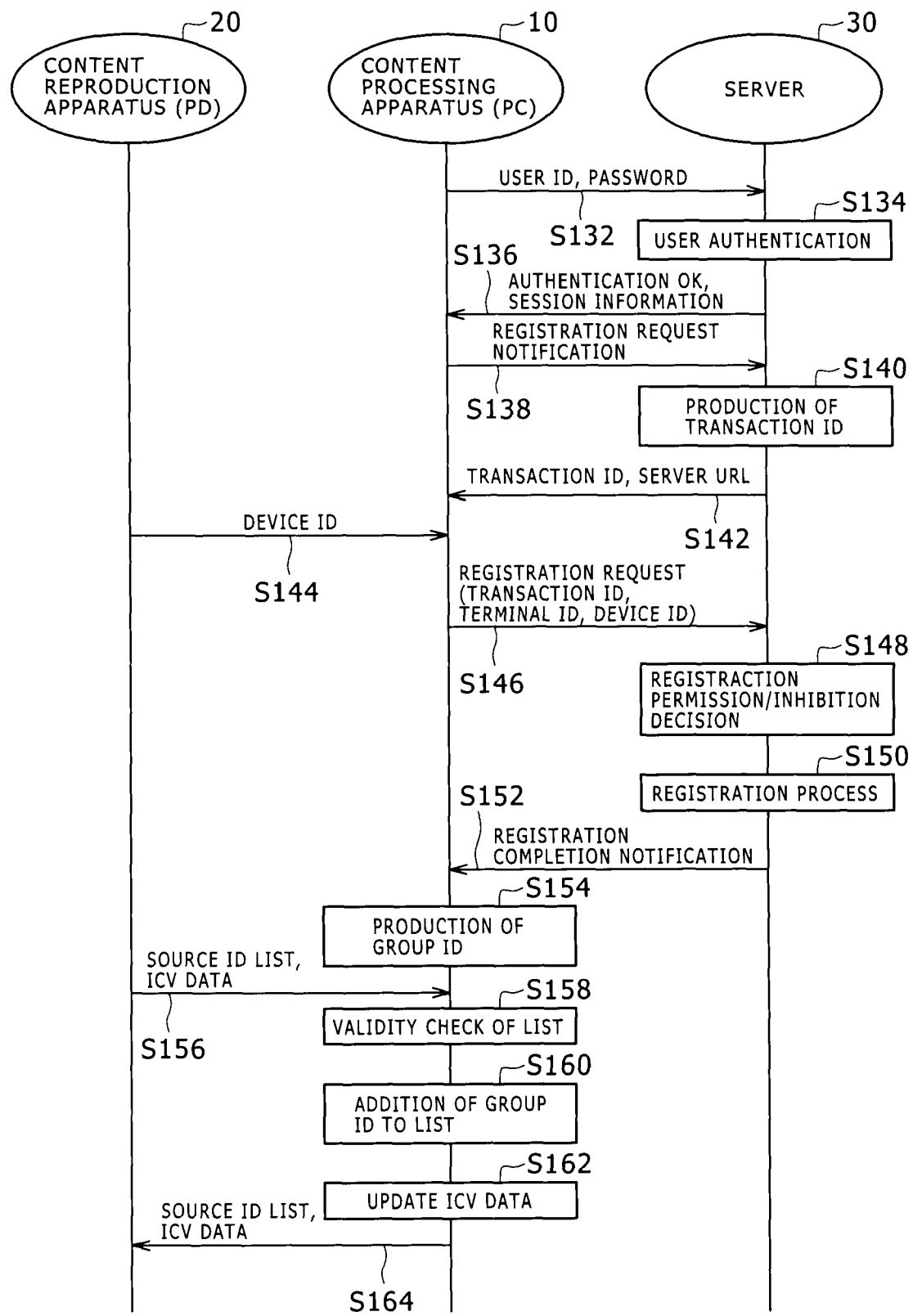
FIG. 16 is a timing chart illustrating a group registration process of a content reproduction apparatus (PD) according to the embodiment.

Now, a process (group registration process) of apparatus-registering a content reproduction apparatus (PD) 20 according to the present embodiment is described with reference to FIG. 16. FIG. 16 is a timing chart illustrating a group registration process of the content reproduction apparatus (PD) 20 according to the present embodiment.

When a content reproduction apparatus (PD) 20 is to be group-registered, the content reproduction apparatus (PD) 20 of a registration object is connected to a content processing apparatus (PC) 10 which is group-registered already through the local line 9 such that the content reproduction apparatus (PD) 20 is group-registered into the group management server 32 by the content processing apparatus (PC) 10.

As illustrated in FIG. 16, first at steps S132 to S142, a communication connection through the network 5 is established in safety between the content processing apparatus 10 of the registration request source connected to the content reproduction apparatus 20 of the registration object and the server apparatus 30, and user authentication is carried out. The processing at steps S132 to S142 is carried out between the browser of the content processing apparatus 10 and the WWW server 31 of the server apparatus 30. It is to be noted that the processing at steps S132 to S142 is substantially same as that at steps S60 to S70 of the group registration process of the content processing apparatus 10 described hereinabove with reference to FIG. 14 except that a registration request notification of the content reproduction apparatus 20 is sent from the content processing apparatus 10 to the WWW server 31 at step S138. Therefore, detailed description of the processing is omitted.

At next steps S144 to S164, processing for actually registering the content reproduction apparatus 20 into the group management server 32 by the content processing apparatus 10 is carried out. This processing at steps S144 to S164 is carried out among the content reproduction apparatus 20, the copyright management section of the content processing apparatus 10 and the group management server 32 of the server apparatus 30.

In particular, the content processing apparatus 10 first acquires the device ID of the content reproduction apparatus 20 from the content reproduction apparatus 20 of the registration object through the network 5 (S144). Then, the content processing apparatus 10 sends the transaction ID received at step S142 described hereinabove, the terminal ID of the content processing apparatus 10 itself and the device ID of the content reproduction apparatus 20 to the group management server 32 and requests the group management server 32 to register the content reproduction apparatus 20 (S146). It is to be noted that the information transferred at this step S144 can be sent and received in safety because falsification thereof from the outside is prevented by the session information.

Then, upon reception of the registration request described above, the group management server 32 decides whether registration of the content reproduction apparatus 20 of the registration object is permitted or inhibited (S148). In the present embodiment, since there is no restriction to the number of registrations of content reproduction apparatus 20, the registration is permitted unconditionally. However, the registration is not limited to such an example as just described, but an upper limit number may be set for the number of registrations of content reproduction apparatus 20. Then, the group management server 32 searches the group registration database 324 based on the terminal ID to decide whether or not the content processing apparatus 10 of the registration request source is registered already. If a result of the decision indicates that the content processing apparatus 10 is not registered as yet, then the registration of the content reproduction apparatus 20 of the registration object is not permitted.

If it is decided as a result of the registration permission/inhibition decision at step S148 that the registration is not permitted, then the group management server 32 sends an error notification that the registration is inhibited to the content processing apparatus 10.

On the other hand, if it is decided as a result of the registration permission/inhibition decision at step S148 that the registration is permitted, then the group management server 32 carries out a registration process of the content reproduction apparatus 20 of the registration object (S150). In particular, the group management server 32 specifies a record of the authenticated user in the group registration database 324 based on the terminal ID of the content processing apparatus 10 of the registration request source and so forth and writes the device ID of the content reproduction apparatus 20 of the registration object into the record. Further, the group management server 32 sends a registration completion notification to the content processing apparatus 10 of the registration request source (S152).

Then, when the content processing apparatus 10 receives the registration completion notification, it produces a group ID (both of the first group ID and the second group ID) based on the leaf ID included in the service data acquired upon registration of the content processing apparatus 10 itself (S154).

Then, the content processing apparatus 10 acquires the source ID list L and the ICV data of the content reproduction apparatus 20 from the registered content reproduction apparatus 20 (S156).

Further, the content processing apparatus 10 checks the validity of the acquired source ID list L based on the ICV data acquired at S156 (S158). As described hereinabove, since, in the copyright management scheme of the group management system, a MAC value which is a hash value of the source ID list L is included in the ICV data, the content processing apparatus 10 can determine whether or not the source ID list L is in a falsified state by determining the MAC value of the source ID list L acquired from the content processing apparatus 10 and comparing the determined MAC value with the MAC value of the ICV data.

If it is decided as a result of the check of the validity at step S158 that the source ID list L is not legal (is in a falsified state), then this indicates an error, and the decision of the source ID list L is not carried out.

On the other hand, if it is decided as a result of the check of the validity at step S158 that the source ID list L is legal, then the content processing apparatus 10 updates the source ID list L of the content reproduction apparatus 20 (S160). In particular, the content processing apparatus 10 adds the group ID produced at step S154 described hereinabove to the source ID list L acquired from the content reproduction apparatus 20. Thereupon, the content processing apparatus 10 may further add the recorder ID included in the source ID list L of the content processing apparatus 10 itself to the source ID list L acquired from the content reproduction apparatus 20.

Furthermore, the content processing apparatus 10 updates the ICV data of the content reproduction apparatus 20 (S162). In particular, the content processing apparatus 10 determines the MAC value of the source ID list L of the content reproduction apparatus 20 updated at step S160 described hereinabove and produces new ICV data.

Thereafter, the content processing apparatus 10 sends the source ID list L updated at step S160 described hereinabove and the ICV data updated at step S162 described hereinabove to the content reproduction apparatus 20 so as to be written into the storage section of the content reproduction apparatus 20 (S164). It is to be noted that, at S156 and S164, session information is used to send and receive the ICV data so that the ICV data may not be falsified between the content processing apparatus 10 and the content reproduction apparatus 20.

Since the group ID is added to the source ID list L of the content reproduction apparatus 20 itself by such a group registration process of the content reproduction apparatus 20 as described above, the content reproduction apparatus 20 is thereafter permitted to reproduce a distribution content to which the group ID is added.

Figure 17:
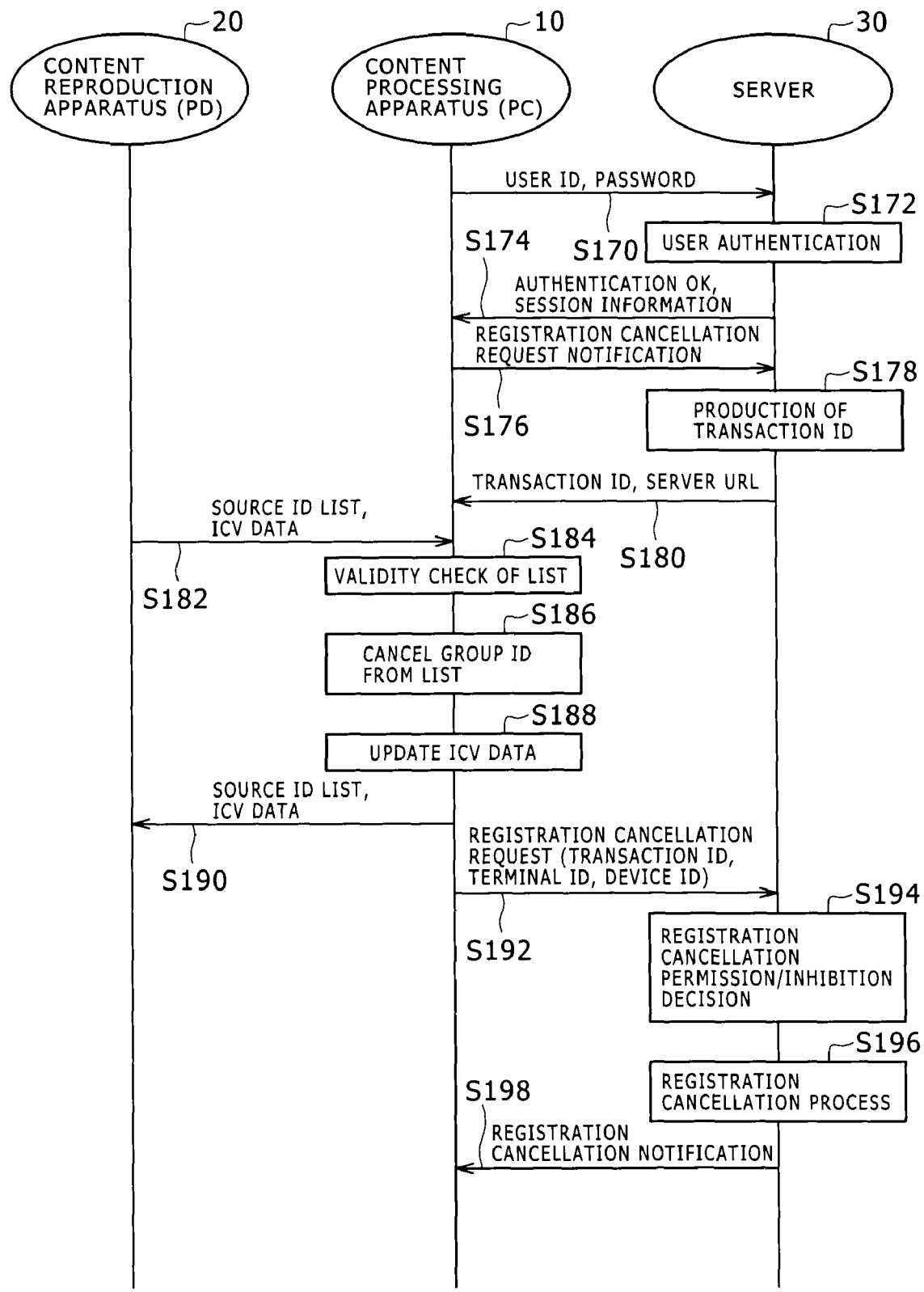
FIG. 17 is a timing chart illustrating a group registration cancellation process of the content reproduction apparatus (PD) according to the embodiment.

Now, a process (group registration cancellation process) of canceling a registration of a content reproduction apparatus (PD) 20 according to the present embodiment from an apparatus group registered already is described with reference to FIG. 17. FIG. 17 is a timing chart illustrating the group registration cancellation process of the content reproduction apparatus (PD) 20 according to the present embodiment.

Also such a group registration cancellation process of the content reproduction apparatus (PD)20 as mentioned above is carried out by locally connecting the content reproduction apparatus (PD)20 to the content processing apparatus (PC)10 such that the content processing apparatus 10 issues a registration cancellation request to the server apparatus 30 similarly as in the group registration process of the content reproduction apparatus (PD)20 described hereinabove.

As illustrated in FIG. 17, first at steps S170 to S180, a communication connection through the network 5 is established in safety between the content processing apparatus 10 of the registration cancellation request source and the server apparatus 30, and user authentication is carried out. The processing at steps S170 to S180 is carried out between the browser of the content processing apparatus 10 and the WWW server 31 of the server apparatus 30. It is to be noted that the processing at steps S170 to S180 is substantially same as that at steps S60 to S70 of the group registration process of the content processing apparatus 10 described hereinabove with reference to FIG. 14 except that a registration cancellation request notification of the content reproduction apparatus 20 is sent from the content processing apparatus 10 to the WWW server 31 at step S176. Therefore, detailed description of the processing is omitted.

At next steps S182 to S198, processing for actually canceling the registration of the content processing apparatus 10 is carried out. The processing at steps S182 to S198 is carried out between the copyright management section of the content processing apparatus 10 of the registration cancellation request source and the group management server 32 of the server apparatus 30.

In particular, the content processing apparatus 10 first acquires the source ID list L and the ICV data of the content reproduction apparatus 20 from the content reproduction apparatus 20 of the registration cancellation object (S182).

Further, the content processing apparatus 10 checks the validity of the acquired source ID list L based on the ICV data acquired at S182 (S184), similarly as in s158 described hereinabove. If it is decided as a result of the check of the validity at this step S184 that the source ID list L is not legal (is in a falsified state), then this indicates an error, and updating of the source ID list L is not carried out.

On the other hand, if it is decided as a result of the check of the validity at S184 that the source ID list L is legal, then the content processing apparatus 10 updates the source ID list L of the content reproduction apparatus 20 (S186). In particular, the content processing apparatus 10 deletes the group ID from the source ID list L acquired from the content reproduction apparatus 20. Thereupon, the content processing apparatus 10 may further delete the recorded ID included in the source ID list L. By this, the content reproduction apparatus 20 is disabled from reproduction of a content to which the source ID is added.

Further, the content processing apparatus 10 updates the ICV data of the content reproduction apparatus 20 (S188). In particular, the content processing apparatus 10 determines the MAC value of the source ID list L of the content reproduction apparatus 20 updated at step S186 described hereinabove and produces new ICV data.

Thereafter, the content processing apparatus 10 sends the source ID list L updated at step S186 described hereinabove and the ICV data updated at step S188 described hereinabove to the content reproduction apparatus 20 so as to be written into the storage section of the content reproduction apparatus 20 (S190).

Then, the content processing apparatus 10 issues a registration cancellation request of the content reproduction apparatus 20 of the registration cancellation object to the group management server 32 (S192). In particular, the content processing apparatus 10 sends the transaction ID received at step S180 described hereinabove, the terminal ID corresponding to the content processing apparatus 10 itself and the device ID of the content reproduction apparatus 20 of the registration cancellation object to the group management server 32 to carry out registration cancellation request. It is to be noted that the information sent at this 192 can be sent in safety because falsification thereof from the outside is prevented by the session information described hereinabove.

Then, when the registration cancellation request is received, the group management server 32 decides whether cancellation of the registration of the content reproduction apparatus 20 is permitted or inhibited (S194). For example, in a case wherein the registration cancellation request is an illegal registration cancellation request or in a like case, the group management server 32 does not permit the registration cancellation.

If it is decided as a result of such a registration permission/inhibition decision at step S194 as described above that the registration cancellation is not permitted, then the group management server 32 sends an error notification that the registration cancellation is inhibited to the content processing apparatus 10.

On the other hand, if it is decided as a result of the registration permission/inhibition decision at step S194 that the registration cancellation is permitted, then the group management server 32 carries out a registration cancellation process of the content reproduction apparatus 20 of the registration cancellation object (S196). In particular, the group management server 32 specifies a record of the authenticated user in the group registration database 324 based on the terminal ID and so forth of the content processing apparatus 10 of the registration request source and deletes the device D of the content reproduction apparatus 20 of the registration cancellation object.

Thereafter, the group management server 32 sends a registration cancellation completion notification to the content processing apparatus 10 of the registration cancellation request source (S198).

As described above, in the registration cancellation process of the content reproduction apparatus 20, the group ID is deleted from the source ID list L of the content reproduction apparatus 20 first on the content processing apparatus 10 side (S186), and then, the registration cancellation process (S196) is carried out on the group management server 32 side. By this, as regards the content reproduction apparatus 20 whose registration is canceled by the group management server 32, the group ID can be deleted with certainty from the source ID list L of the content reproduction apparatus 20. Therefore, such a situation that, although the registration of the group ID is canceled on the group management server 32, it remains on the actual source ID list L of the content reproduction apparatus 20 can be prevented.

The basic flows of the group registration process and the group registration cancellation process of the content processing apparatus 10 and the content reproduction apparatus 20 are described above. By such processes, even if the owner of the same content processing apparatus 10 or content reproduction apparatus 20 is changed, group change of the content processing apparatus 10 can be carried out by carrying out registration cancellation and re-registration.

It is to be noted that, even where new group registration or group change of a content processing apparatus 10 having a ripping function occurs, the recorder ID of the content processing apparatus 10 does not change. Therefore, a content ripped by the content processing apparatus 10 before the new group registration or group change can be reproduced freely by an apparatus of the apparatus group to which the content processing apparatus 10 belongs even after the new group registration or group change. By this, the convenience to the user of a content processing apparatus 10 having a ripping function is enhanced and the merit in purchase is raised.

<8. Reproduction Control Process of the Group Management System>

Figure 18:
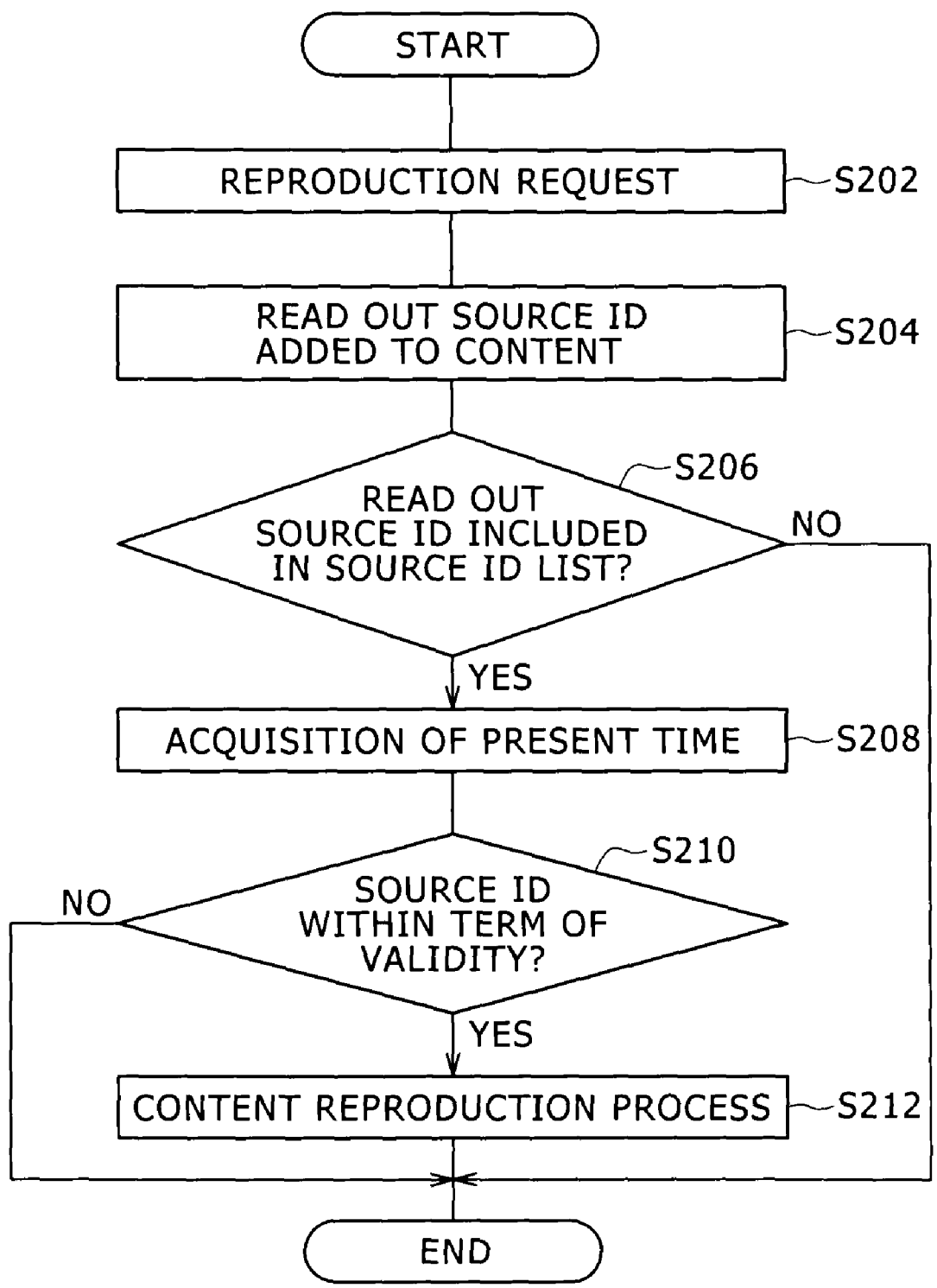
FIG. 18 is a flow chart illustrating a content reproduction control process of a group management system of the content reproduction apparatus (PC) according to the embodiment.

Now, a content reproduction control process of the group management system by a content processing apparatus 10 according to the present embodiment is described with reference to FIG. 18. FIG. 18 is a flow chart illustrating the content reproduction control process of the group management system by the content processing apparatus 10 according to the present embodiment. It is to be noted that the reproduction control process of the group management system is a process of controlling reproduction of a content based on a source ID added to the content and a source ID list L.

As illustrated in FIG. 18, first at step S202, a reproduction request is issued, for example, by the user (step S202: reproduction requesting step). The user would operate the inputting apparatus 108 of the content processing apparatus 10 to select a desired content and issue an instruction to the content reproduction section 170 to reproduce the selected content.

Then at step S204, the source ID added to the content is read out (step S204). The reproduction permission/inhibition decision section 172 of the content reproduction section 170 first reads out the content whose reproduction is requested as described above from the content database 116, storage medium 7 or the like and reads out the source ID included in the license added to this content and then interprets the source ID.

Further, at step S206, it is decided whether or not the source ID read out from the content described above is included in the source ID list L of the content processing apparatus 10 (step S206). In particular, the reproduction permission/inhibition decision section 172 of the content reproduction section 170 reads out the source ID list L, for example, from the storage apparatus 111 and interprets the source ID list L. Then, the reproduction permission/inhibition decision section 172 compares the source ID read out from the content described hereinabove and the source ID included in the source ID list L with each other to decide whether or not the source ID read out from the content described hereinabove is included in the source ID list L.

If it is decided as a result of the decision that the source ID read out from the content is included in the source ID list L, then the reproduction permission/inhibition decision section 172 permits reproduction of the content, and the processing advances to step S208. On the other hand, if the source ID read out from the content is not included in the source ID list L, then the reproduction permission/inhibition decision section 172 does not permit reproduction of the content but ends the reproduction control process.

Further, at step S208, the time at present is acquired (step S208). The reproduction permission/inhibition decision section 172 acquires the time at present from a time counting device (not shown) built in the content processing apparatus 10.

Thereafter, at step S210, it is decided whether or not the acquired time at present described above is within the term of validity of the source ID read out from the content described hereinabove (step S210). In particular, the reproduction permission/inhibition decision section 172 first reads out validity term information corresponding to the source ID read out from the content described hereinabove from the source ID list L. The validity term information corresponding to the source ID read out from the content described hereinabove is recorded in an associated relationship with the source ID, for example, in the source ID list L.

Thereafter, the reproduction permission/inhibition decision section 172 decides whether or not the acquired time at present described hereinabove exceeds the term of validity of the source ID described hereinabove. If it is decided as a result of this decision that the time at present exceeds the validity term of the source ID described hereinabove, then the term of the source ID has expired. Therefore, the reproduction permission/inhibition decision section 172 does not permit reproduction of the content described hereinabove but ends the reproduction control process.

On the other hand, if the time at present is within the term of validity of the source ID described hereinabove, the reproduction permission/inhibition decision section 172 permits reproduction of the content and advances the processing to step S212. As a result, at step S212, the reproduction execution section 174 reproduces the content (step S212).

As described above, the content reproduction control process of the group management system according to the present embodiment is executed based on a source ID and validity term information of the source ID in a source ID list L added to a content. According to such reproduction control as just described, it is possible to set the term of validity of reproduction of the content in a unit of a source ID and permit/inhibit reproduction of the content. It is to be noted that the term of validity of a source ID need not necessarily be set.

<9. Updating Process of the Source ID List of the Group Management System>

Figure 19:
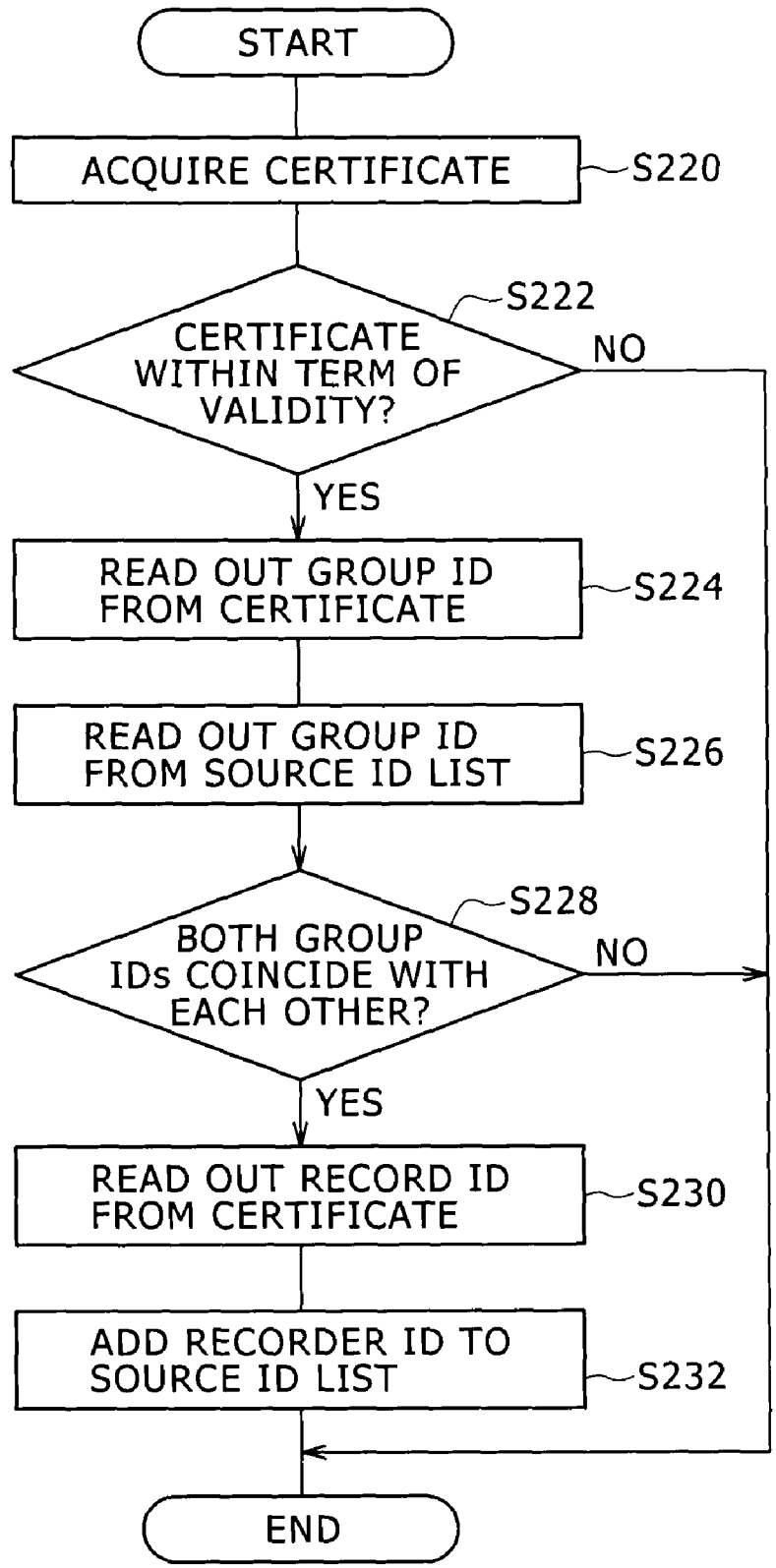
FIG. 19 is a flow chart illustrating a source ID list updating process of the content processing apparatus according to the embodiment.

Now, an updating process of the source ID list L in the content processing apparatus (PC) 10 according to the present embodiment is described with reference to FIG. 19. FIG. 19 is a flow chart illustrating an updating process of the source ID list L in the content processing apparatus 10 according to the present embodiment. This list updating process is an example wherein a content processing apparatus 10 acquires a group certificate G distributed thereto and the source ID list L of the content processing apparatus 10 itself or the source ID list L of a content reproduction apparatus 20 locally connected to the content processing apparatus 10 is updated based on the group certificate G.

As shown in FIG. 19, first at S220, the content processing apparatus 10 acquires a group certificate G distributed from a different content processing apparatus 10 or the certificate management server 36 (step S220). The content processing apparatus 10 can acquire the group certificate G by receiving the group certificate G through the network 5 or a storage medium 7 or reading out the group certificate G recorded on a storage medium 7.

Then at step S222, it is decided whether or not the acquired group certificate G is within the term of validity (step S222). In particular, the list updating section 184 of the content processing apparatus 10 reads out the validity term information included in the group certificate G and acquires the present time information from the time counting device built in the content processing apparatus 10. Then, the list updating section 184 decides whether or not the time at present is within the term of validity of the group certificate G. If it is decided as a result of the decision that the group certificate G is within the term of validity, then the processing advances to step S224. On the other hand, if the group certificate G is outside the term of validity, then the list updating is rejected and the list updating process is ended.

Further, at step S224, the group ID included in the acquired group certificate G is read out by the list updating section 184 (step S224).

Thereafter, at step S226, the group ID held by the content processing apparatus 10 itself is read out by the list updating section 184 (step S226). In the present embodiment, since the group is retained in the source ID list L in each content processing apparatus 10, the list updating section 184 reads out the group ID corresponding to the content processing apparatus 10 from the source ID list L.

Then at step S228, the list updating section 184 decides whether or not the group ID read out from the acquired group certificate G and the group ID corresponding to the content processing apparatus 10 itself coincide with each other (step S228). If it is decided as a result of the decision that the two group IDs coincide with each other, then the list updating is permitted and the processing advances to step S230. On the other hand, if the two group IDs are different from each other, then the list updating is rejected and the list updating process is ended.

Further, at step S230, the recorder ID included in the group certificate G is added to the source ID list L by the list updating section 184 (step S230). In particular, the list updating section 184 reads out the recorder ID from the acquired group certificate G and writes the recorder ID into the source ID list L. By this, the content processing apparatus 10 is thereafter permitted to reproduce a ripped content to which the recorder ID is added. The updating process of the source ID list L based on the group certificate G is ended therewith.

<10. Effects of the Copyright Management of the Group Management System>

The copyright management system 100 and the basic configuration of the content sharing method utilizing the copyright management system 100 according to the present embodiment are described above. Such a copyright management system 100 as described above can implement the copyright management of the group management system.

In particular, the copyright management system 100 carries out the copyright management of contents by managing contents shared among a plurality of apparatus in a unit of a content providing unit (a unit of a user or a unit of an apparatus of a providing source) and restricting reproduction of each content by the copyright management system 100 in response to the content providing source. In other words, the copyright management system 100 can permit/inhibit sharing of a content between the apparatus in a unit of a content providing source.

Therefore, where the content providing source is an illegal content providing source, a content processing apparatus 10 of the content acquiring side can collectively inhibit reproduction of all contents acquired from the illegal content providing source or inhibit transfer of a content. Accordingly, such illegal acts as a mass distribution act of a ripped content to an unspecified great number of users or an act of laying a distribution content open for downloading on the Internet can be prevented effectively.

On the other hand, where the providing source of a content is a legal content providing source, if the source ID of this content providing source is added to the source ID list L once to permit sharing of the content, then even a different content can thereafter be reproduced freely if it is provided from the permitted content information providing source. Therefore, within the range of private use, the content can be copied freely between a plurality of apparatus. Consequently, copyright management proximate to that of a conventional distribution system for analog contents which acknowledges unlimited copying only for private use can be implemented.

Therefore, the copyright management system 100 according to the embodiment described above can achieve both of (1) a copyright management function of restricting an act of illegally utilizing a content without paying a reasonable consideration to a content distribution service and so forth and (2) to raise the degree of freedom in content utilization within the range of private use with a reasonable consideration paid.

Further, in such a copyright management process of the group management system as described above, only it is necessary to carry out a process of adding a source ID to a source ID list L basically only once upon registration of the content distribution service or the ripping content sharing service or in a like case. Accordingly, improvement in efficiency of a copyright management process can be anticipated when compared with an alternative case wherein the copyright management process is executed every time copying (check-in check-out) of a content is carried out as in the conventional copyright management process of the check-in check-out system.

Furthermore, since different apparatus are group-registered in a unit of an owner (user) of content processing apparatus 10 or content reproduction apparatus 20, a content can be copied and utilized freely between those apparatus which are registered in the same apparatus group. Therefore, a legal user who carries out private use can freely copy a content between apparatus owned by the user itself. Further, since the user need not be conscious of a copying source or the number of times of copying of a content, the user is less likely to feel the presence of the copyright management system. Accordingly, within the range of personal use, the degree of freedom and the convenience in content utilization by a user can be further improved, and user-friendly copyright management can be executed.

<11. Outline of the User Link Function>

Now, an outline of a function (user link function) of linking a plurality of users having a close relationship to each other in such a copyright management system 100 of the group management system as described above is described with reference to FIGS. 20 and 21. It is to be noted that FIGS. 20 and 21 are explanatory views illustrating an outline of a function of linking a plurality of users to each other in the copyright management system 100 according to the present embodiment.

In the following, a content processing apparatus 10 is referred to as PC 10, and a content reproduction apparatus 20 is referred to as PD 20. It is to be noted, however, that the content processing apparatus of the present invention is not limited to an example of a personal computer (PC), and also the content reproduction apparatus of the present invention is not limited to an example of a portable device (PD).

Figure 20:
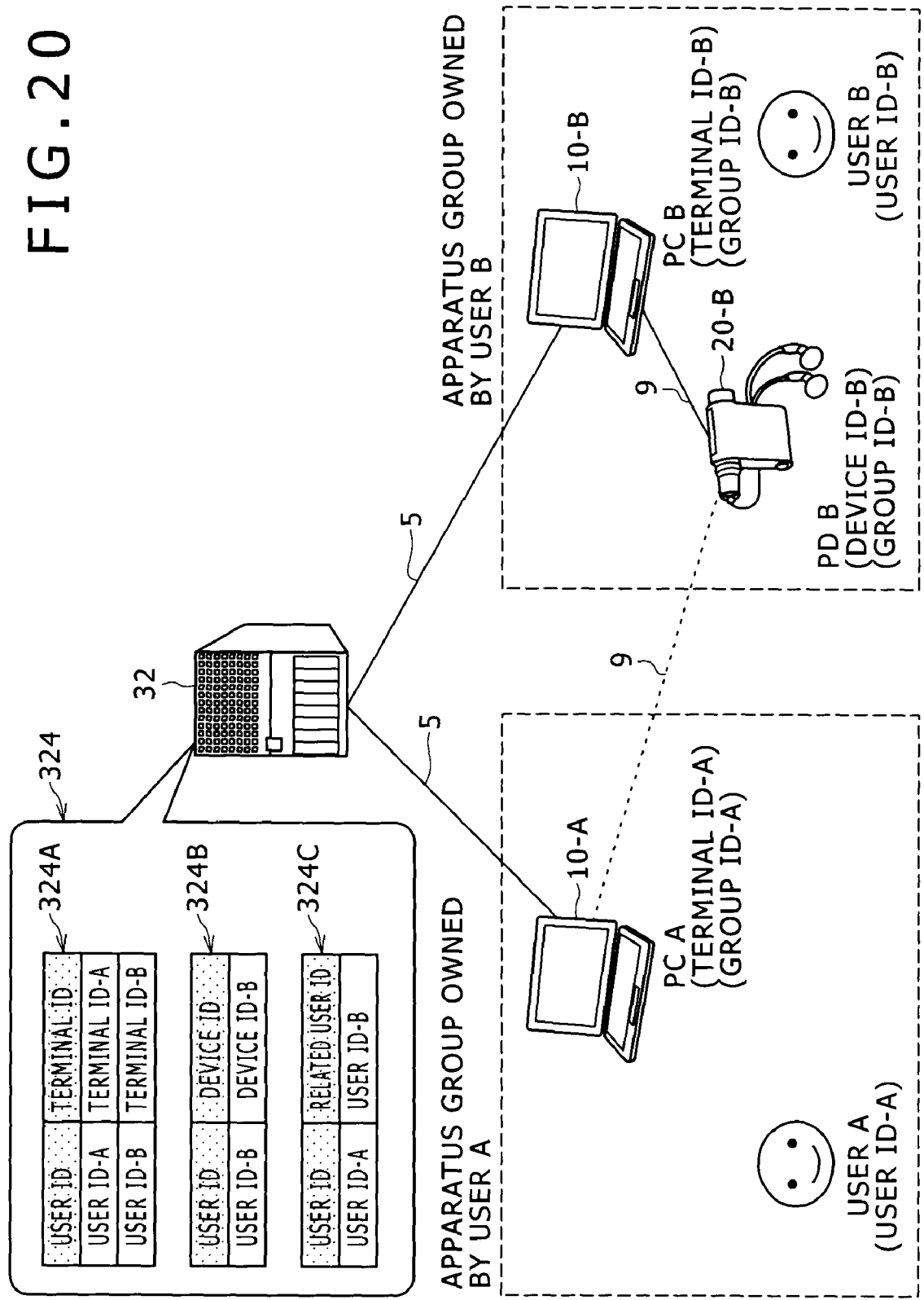
FIG. 20 is an explanatory view illustrating an outline of a function of linking a plurality of users to each other in the content processing apparatus according to the embodiment.
Figure 21:
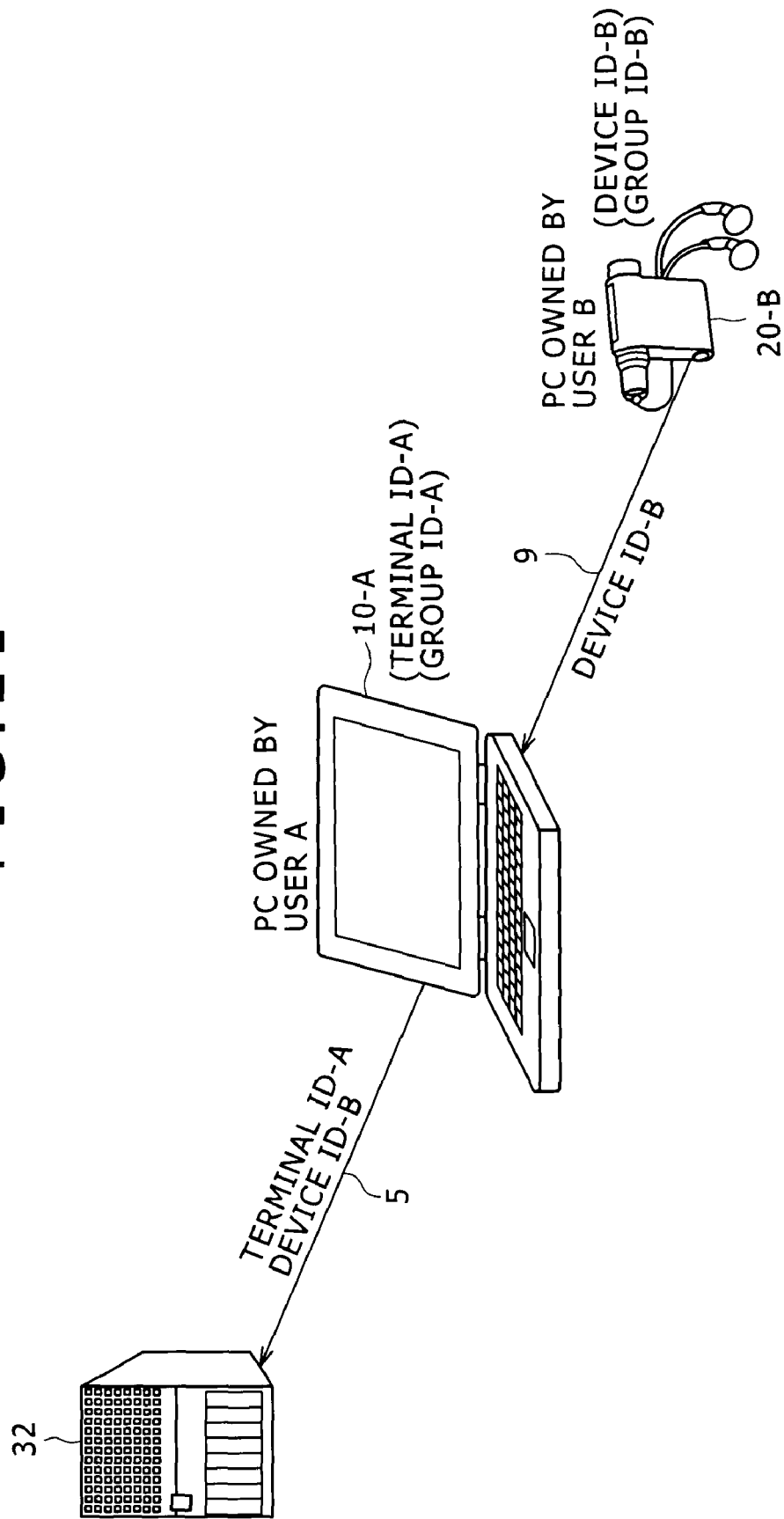
FIG. 21 is an explanatory view illustrating an outline of the function of linking a plurality of users to each other in the content processing apparatus according to the embodiment.

As shown in FIG. 20, in the copyright management system 100 described above, the group management server 32 retains the user ID which is user identification information of each user, the terminal ID of each PC owned by each user and the device ID of each PD 20 owned by each user in an associated relationship with each other in the group registration database 324, and group-registers each apparatus in a unit of a user.

In particular, each user user-registered in the content sharing service and the content distribution service described above has a unique user ID applied thereto. This user ID is applied in a unit of a user by user registration of each user into the group management server 32 using a PC 10 of the user itself and is managed by the group management server 32.

Further, each PC 10 has a unique terminal ID. When a PC 10 is to be group-registered, the terminal ID of the PC 10 is sent to the group management server 32, and the group management server 32 manages the user ID of the user who owns the PC 10 and the terminal ID of the PC 10 in an associated relationship with each other (refer to a table 324A of FIG. 20). By this, it can be decided which PC 10 is registered for each user. Further, upon such group registration, a group ID corresponding, for example, in a 1:1 corresponding relationship to the user ID described above is stored as user identification information representative of the user of the PC 10 into the PC 10.

Meanwhile, each PD 20 has a unique device ID. When a PD 20 is to be group-registered, the device ID of the PD 20 is sent to the group management server 32 through a PC 10, and the group management server 32 manages the user ID of the user who owns the PD 20 and the device ID of the PD 20 in an associated relationship with each other (refer to a table 324B of FIG. 20). By this, it can be decided which PD 20 is registered for each user. Further, upon such group registration, a group ID which corresponds, for example, in a 1:1 corresponding relationship to the user ID is stored as user identification information representative of the user of the PD 20 into the PD 20.

It is assumed that, in a state wherein a plurality of PCs 10-A and 10-B and PD 20-B are group-registered in a unit of a user in this manner as illustrated in FIG. 20, the PC 10-A owned by a certain user A and the PD 20 owned by another user B are connected to each other through the local line 9.

In this instance, conventionally only it is displayed on the display screen of the PC 10-A that a PD 20 of a different user B is connected, and this information is not uploaded to the service providing side (server apparatus 30).

In contrast, in the present embodiment, if a PD 20 of a different user is connected to a PC 10, then the PC 10 displays on the display screen that a PD of the different user is connected thereto, and further confirms with the user whether or not the user of the PD 20 should be user-linked. Then, if it is confirmed that the user of the PD 20 should be user-linked, as shown in FIG. 21, then the PC 10-A acquires the device ID-B of the PD 20-B and transfers the device ID-B and the terminal ID-A of the PC 10-A itself to the group management server 32. By this, the group management server 32 can specify the user ID-B corresponding to the PD 20-B (the user B who owns the PD 20-B) and can specify the user ID-B corresponding to the PC 10-A (the user A who owns the PC 10-A) by searching the group registration database 324 based on the device ID-B and the terminal ID-A transferred thereto. Accordingly, the group management server 32 can link the user A and the user B on the server to group them into the same user group by storing the user ID-A of the user A and the user ID-B of the user B specified in this manner in an associated relationship with each other into the group registration database 324 (refer to a table 324C of FIG. 20).

As described above, in the present embodiment, if the PC 10-A and the PD 20-B owned by different users are connected to each other through the local line 9, then the user A and the user B are linked to each other based on the device ID-B of the PD 20 and the terminal ID-A of the PC 10. Then, sharing of a content is permitted comparatively freely between a plurality of apparatus owned by the two users A and B.

The reason why a user link is permitted in this manner is that the user A and the user B are considered to be in a relationship of friendly acquaintances such as intimate friends or families. In other words, that the PD 20-B of the user B can be connected to the PC-A of the user A signifies that the user A and the user B approach each other to physically short distances, and if so, then the possibility is high that the user A and the user B are friendly acquaintances such as families or friends. It is considered that, where two or more users are friendly acquaintances like friends or families in this manner, even if a content is shared and utilized between the users, such sharing is utilization within the range of private use and can be permitted under the copyright law.

Therefore, in the present embodiment, when a plurality of users are linked, it is decided that the user of the PC 10 and the user of the apparatus of the PD 20 are friendly acquaintances under the condition that the PC 10 and the PD 20 can be connected to each other at physically short distances. Then, on the group management server 32, the user ID of the user who owns the PD 20 is registered in an associated relationship as a relating user ID with the user ID of the user who owns the PC 10 to link the two users to each other (user link function). Further, it is permitted to share a content between apparatus owned by a plurality of user-linked users or allow the users to access content reproduction histories of the other users. By this, the degree of freedom in content utilization can be enhanced.

<12. Functional Configuration for Implementing the User Link>

Now, a functional configuration for implementing the user link function in the copyright management system 100 according to the present embodiment is described with reference to FIG. 22. It is to be noted that FIG. 22 is a functional block diagram showing a functional configuration of the PC 10 and the group management server 32 for implementing the user link function in the copyright management system 100 according to the present embodiment.

Figure 22:
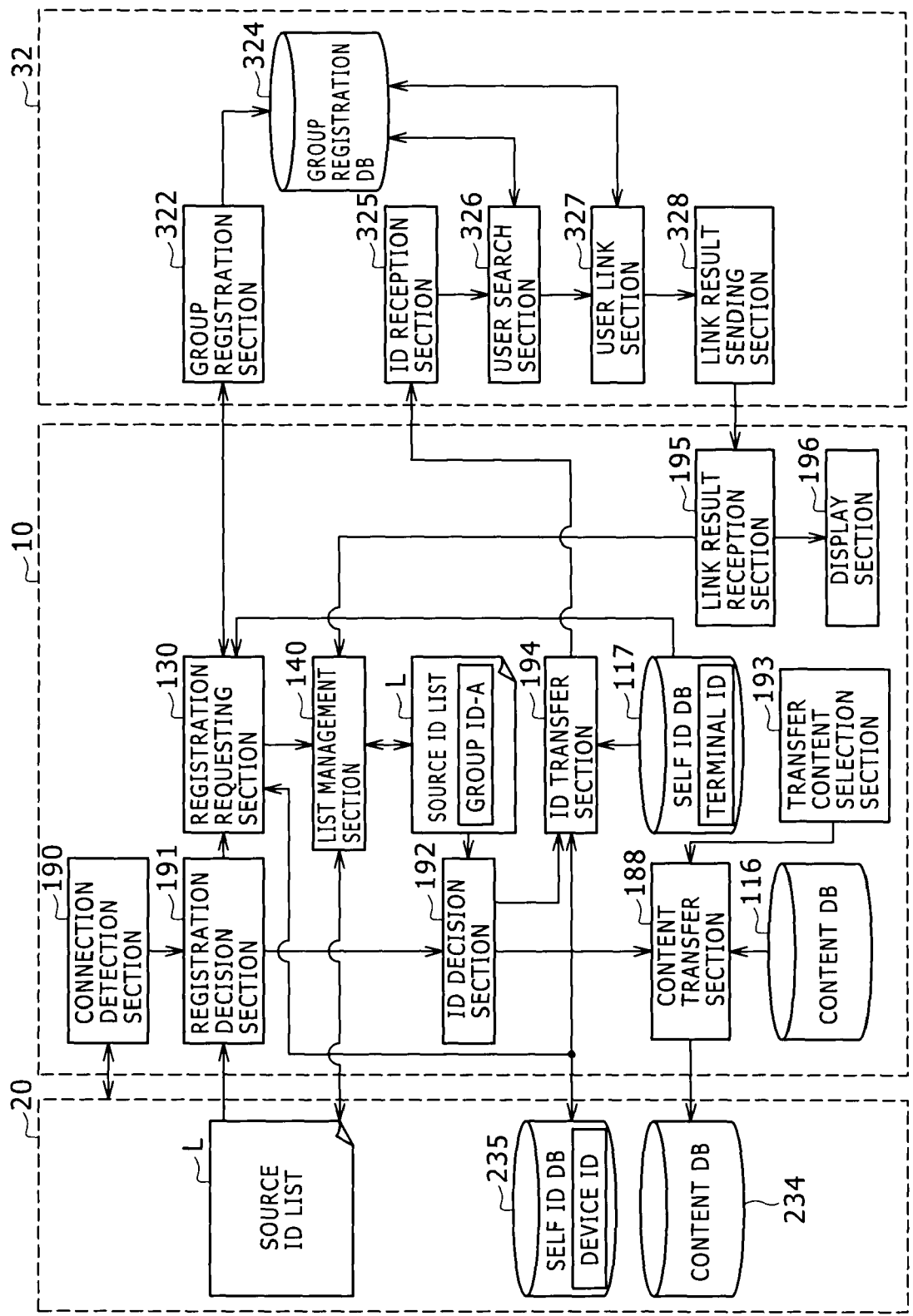
FIG. 22 is a functional block diagram showing a functional configuration of a PC and a group management server for implementing the user link function of the copyright management system according to the embodiment.

As shown in FIG. 22, the PC 10 includes, for example, a connection detection section 190, a registration decision section 191, the above-described registration requesting section 130, the above-described list management section 140, the above-described source ID list L, an ID decision section 192, the above-described content transfer section 188, a transfer content selection section 193, the above-described content database 116, the above-described self ID database 117, an ID transfer section 194, a link result reception section 195, and a display section 196.

Meanwhile, the group management server 32 includes, for example, the above-described group registration section 322, the above-described group registration database 324, an ID reception section 325, a user search section 326, a user link section 327 and a link result sending section 328. It is to be noted that the PD 20 includes the above-described source ID list L, the above-described content database 234, and the above-described self ID database 235. The components mentioned are described in detail below.

The connection detection section 190 of the PC 10 detects that the PD 20 is connected to the PC 10. For example, if the PC 10 and the PD 20 are physically locally connected to each other through the local line 9, then the connection detection section 190 detects the connection and outputs a connection detection signal to the registration decision section 191 to notify the registration decision section 191 that the PC 10 and the PD 20 are connected to each other.

When the PC 10 itself and the PD 20 are connected to each other, the registration decision section 191 decides whether or not the PD 20 is group-registered, that is, whether or not the PD 20 has a group ID. In particular, if the connection detection signal is inputted from the registration decision section 191, then the registration decision section 191 reads out and acquires the source ID list L stored in the PD 20 from the PD 20 connected to the PC 10 and detects whether or not a group ID is included in the source ID list L. If a group ID is included in the source ID list L, then the registration decision section 191 can decide that the PD 20 is in a group-registered state. On the other hand, if a group ID is not included in the source ID list L, then the registration decision section 191 can decide that the PD 20 is not in a group-registered state.

If the registration decision section 191 decides as a result of the registration decision that the PD 20 does not hold a group ID, then it issues an instruction to the registration requesting section 130 to group-register the PD 20. At this time, a screen image for confirming with the user, for example, whether or not the user wants to group-register the PD 20 may be displayed such that, if an instruction input to register the PD 20 is inputted by the user, then registration decision section 191 requests the registration requesting section 130 to register the PD 20, but if another instruction input not to register the PD 20 is inputted, then the processing is ended.

If a registration request is received from the registration decision section 191, then the registration requesting section 130 transfers the device ID of the PD 20 acquired from the self ID database 235 of the PD 20 and the terminal ID read out from the self ID database 235 of the PC 10 to the group management server 32 and requests the group management server 32 to register the PD 20.

When the group registration section 322 of the group management server 32 receives the device ID of the PD 20 and the terminal ID of the PC 10 in the group registration request, it registers the device ID in an associated relationship with first user identification information associated with the terminal ID in the group registration database 324 (the user ID of the user A who owns the PC 10). By this, the PD 20 can be group-registered in an associated relationship with the user A corresponding to the first user identification information. Further, in response to the group registration, the group registration section 322 sends a registration completion notification to the PC 10.

Furthermore, when the group registration section 322 of the PC 10 receives this registration completion notification from the group management server 32, the list management section 140 reads out the group ID included in the source ID list L of the PC 10 and adds the group ID to the source ID list L of the PD 20.

In this manner, where the PD 20 is not registered as yet, the PD 20 is group-registered into the same apparatus group as that of the PC 10 so that it has the same group ID. Consequently, the PC 10 and the PD 20 can share a content to which the group ID is added.

On the other hand, if it is decided as a result of the registration decision described above that the PD 20 holds a group ID, then the registration decision section 191 reads out the group ID from the source ID list L and outputs the group ID to the ID decision section 192.

The ID decision section 192 decides whether or not the group ID held by the PD 20 and the group ID held by the PC 10 coincide with each other. In particular, if it is decided by the registration decision section 191 that the PD 20 holds a group ID and the group ID is inputted to the ID decision section 192, then the ID decision section 192 decides whether or not this group ID of the PD 20 and the group ID in the source ID list L of the PC 10 coincide with each other.

If it is decided as a result of the ID coincidence decision that the two group IDs coincide with each other, then it can be decided that the PC 10 and the PD 20 are group-registered in an apparatus group owned by the same user. Therefore, the ID decision section 192 permits the content transfer section 188 to transfer a content between the PC 10 and the PD 20. In this instance, the transfer content selection section 193 reads out, for example, a content selected based on a user input by the transfer content selection section 193 from the content database 116 of the PC 10 and transfers the content to the PD 20 so that the content is recorded into the content database 234 of the PD 20.

On the other hand, if it is decided as a result of the ID coincidence decision that the two group IDs do not coincide with each other, then it can be decided that the PC 10 and the PD 20 are registered in apparatus groups of different users. In this instance, the ID decision section 192 outputs a notification to the ID transfer section 194 that the group IDs of the PC 10 and the PD 20 do not coincide with each other.

If the notification that the group IDs do not coincide with each other is received from the ID transfer section 194, then the ID transfer section 194 transfers the device ID of the PD 20 and the terminal ID of the PC 10 to the group management server 32 in order to link the user of the PC 10 and the user of the PD 20 to each other. In particular, the ID transfer section 194 acquires the device ID of the PD 20 from the self ID database 235 of the PD 20 and reads out the terminal ID of the PC 10 from the self ID database 235 of the PC 10, and then transfers the device ID of the PD 20 and the terminal ID of the PC 10 to the group management server 32. Such a transfer process of the device ID and the terminal ID by the ID transfer section 194 as just described may be executed under the condition that a confirmation input by the user is provided. By this, only when the users want the user link, the user of the PC 10 and the user of the PD 20 can be linked to each other.

The ID reception section 325 of the group management server 32 receives the device ID of the PD 20 and the terminal ID of the PC 10 from the ID transfer section 194. The ID reception section 325 outputs the received device ID and terminal ID to the user search section 326.

The user search section 326 searches the group registration database 324 based on the device ID and the terminal ID received by the ID reception section 326 to specify first user identification information associated with the device ID (that is, the user ID of the user who owns the PD 20) and second user identification information associated with the terminal ID received by the reception section described above (that is, the user ID of the user who owns the PC 10). When the group ID held by the PC 10 and the group ID held by the PD 20 are different from each other, since the device ID of the PC 10 and the device ID of the PD 20 are transferred as described above, the first user identification information and the second user identification information searched out based on the terminal ID and the device ID by the user search section 326 correspond to different users from each other and do not coincide with each other. The user search section 326 outputs the searched out first and second user identification information to the user link section 327.

The user link section 327 records the first user identification information and the second user identification searched out by the user search section 326 in an associated relationship with each other into the group registration database 324. In particular, as illustrated in FIGS. 12 and 20, the user link section 327 records a first user ID corresponding to the terminal ID described above (for example, the user ID-A of the user A who is an owner of the PC 10) and a second user ID corresponding to the device ID (for example, the user ID-B of the user B whose is an owner of the PD 20) in an associated relationship with each other. By this, the user of the first user ID corresponding to the terminal ID and the user of the second user ID corresponding to the device ID can be linked to each other.

Meanwhile, two techniques are available for carrying out such user link as described above. First, in the first user link technique, the user link section 327 associates the second user ID corresponding to the device ID as a related user ID with the first user ID corresponding to the terminal ID while it does not associate the first user ID corresponding to the terminal ID as a relating user ID with the second user ID corresponding to the device ID. By this, when the PD 20 is connected to the PC 10, the user B of the PD 20 is linked only with the user A of the PC 10 while the user A of the PC 10 is not linked with the user B of the PD 20, whereby a user link in only one direction wherein the user of the PC 10 is the core can be provided.

On the other hand, in the second user link technique, the user link section 327 associates the second user ID corresponding to the device ID as a related user ID with the first user ID corresponding to the terminal ID and associates the first user ID corresponding to the first terminal as a related user ID also with the second user ID corresponding to the device ID. By this, where the PD 20 is connected to the PC 10, the user A of the PC 10 and the user B of the PD 20 can be linked bidirectionally.

Or, the user link section 327 may restrict the number of users who can be user-linked to one user to a predetermined number or less (for example, to four or less). In particular, if more than a predetermined upper limit number (for example, four) related user IDs are associated already with the first user ID corresponding to the terminal ID described above, then the user link section 327 inhibits association with a further second user ID. In this instance, the user link section 327 may send an error notification that the user link number already reaches the upper limit number from the link result sending section 328 to the PC 10. By providing the upper limit to the user link number in this manner, such a situation that such a great number of users by which the range of private use is exceeded are associated with one user can be prevented. Accordingly, such a situation that a user link is provided among an excessively great number of users and causes abuse or misuse of a shared content can be prevented, and consequently, copyright management can be carried out precisely.

If such association of the first and second user identification information by the group registration database 324 as described above (that is, the user link) is completed, then the link result sending section 328 sends user link completion information representing that the association of the first and second user identification information is completed to the PC 10.

When the user link completion information is received from the link result sending section 328 of the group management server 32 described above, the link result reception section 195 causes the display section 196 to display that the user link is completed (for example, "User link of the user ID-A and the user ID-B is completed!"). By this, the user of the PC 10 can access the display to grasp that the user link is completed. It is to be noted that the display section 196 is formed from the outputting apparatus 110 of the display apparatus described hereinabove or the like.

Furthermore, when the user link completion information described hereinabove is received, the link result reception section 195 notifies the list management section 140 of this. Consequently, the list management section 140 reads out the group ID-A included in the source ID list L of the PC 10 and adds the group ID-A to the source ID list L of the PD 20. Further, the list management section 140 reads out the group ID-B included in the source ID list L of the PD 20 and adds the group ID-B to the source ID list L of the PC 10. By this, both of the group ID-A and the group ID-B are included in the source ID lists L of the PC 10 and the PD 20. Consequently, both of the PC 10 and the PD 20 can share a distribution content purchased by the user A who is an owner of the PC 10 and a distribution content purchased by the user B who is an owner of the PD 20 such that the distribution contents can be reproduced by any of the apparatus (content sharing).

As described above, in the present embodiment, two users can be linked to each other by a simple operation of connecting the PC 10 and the PD 20 of the different users. It is to be noted that a storage medium which retains a secure medium ID (for example, a storage medium with a copyright management function or the like) may be selected as a link object in place of the PD 20 described hereinabove. In this instance, it is possible to connect the storage medium and the PC 10 to each other or load the storage medium into the PC 10 to read out the medium ID of the storage medium and then link a user who owns the storage medium to the user who owns the PC 10 in a similar manner as in the case of the PD 20 based on the medium ID and the terminal ID.

<13. Communication Processing Flow Upon Connection of a PC and a PD>

Now, a processing method of the PC 10 when the PC 10 and the PD 20 according to the present embodiment are connected to each other is described with reference to FIG. 23. It is to be noted that FIG. 23 is a flow chart illustrating a processing method of the PC 10 when the PC 10 and the PD 20 according to the present embodiment are connected to each other.

Figure 23:
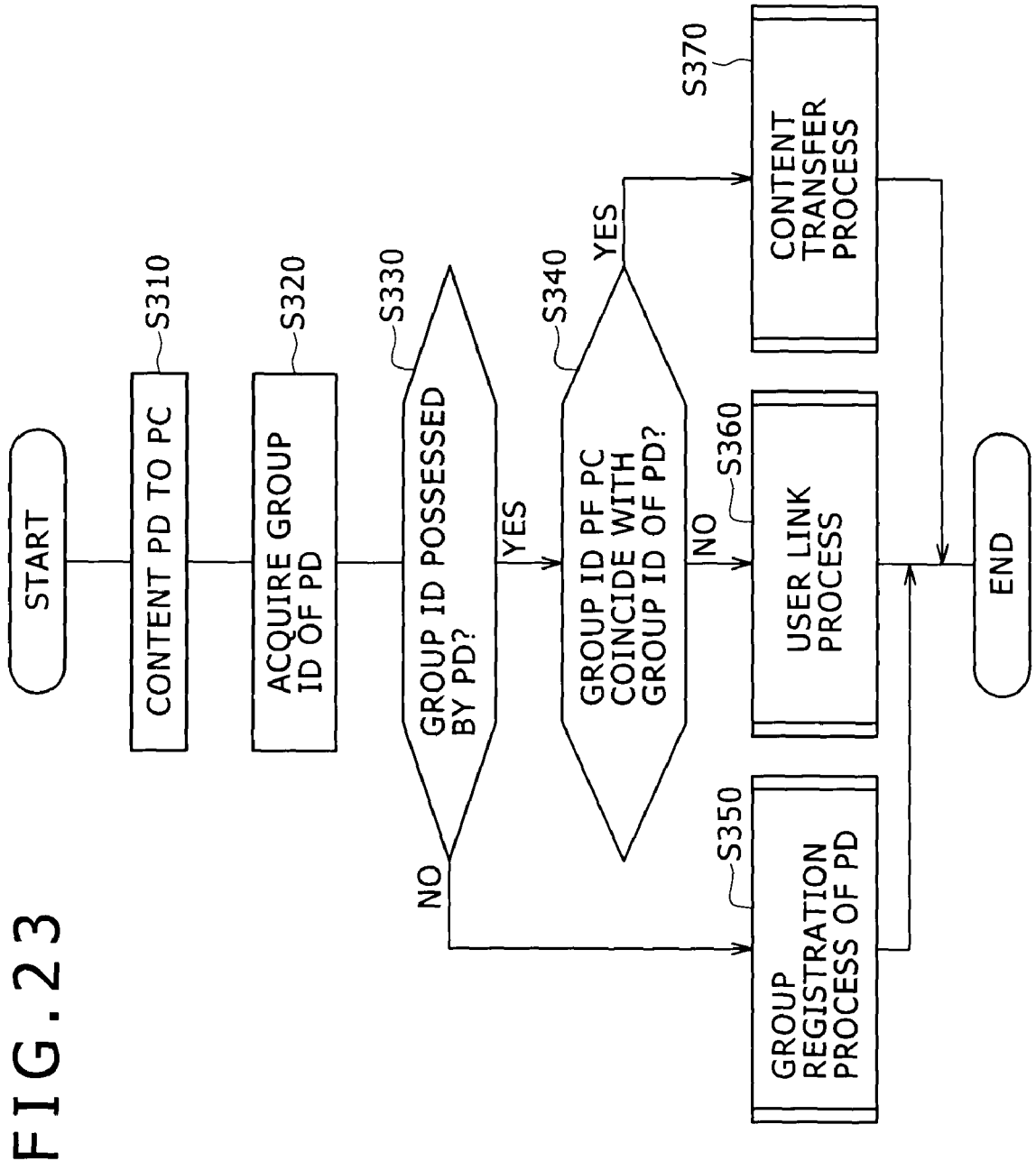
FIG. 23 is a flow chart illustrating a processing method of the PC when the PC and the PD according to the embodiment are connected to each other.

As shown in FIG. 23, first at step S310, a PC 10 and a PD 20 are connected to each other (step S310). In particular, the PC 10 and the PD 20 are logically connected to each other at physically short distances through the local line 9 such as, for example, a USB cable.

Then, at step S320, after it is detected that the PD 20 is connected, the PC 10 acquires the group ID held by the PD 20 connected to the PC 10 from the PD 20 (step S320). For example, the PC 10 can read out the source ID list L stored in the PD 20 and acquire the group ID held by the PD 20 from within the source ID list L. It is to be noted that, where the PD 20 does not hold a source ID list L, since the group ID cannot be acquired at step S320, it is decided at a next step that the PD 20 does not hold a group ID.

Further, at step S330, the PC 10 decides whether or not the PD 20 holds a group ID (step S330; registration decision step). The PC 10 decides whether or not the PD 20 connected to the PC 10 holds a group ID, that is, whether or not the PD 20 is in a group-registered state. In particular, the PC 10 detects whether or not a group ID is included in the source ID list L acquired from the PD 20. As a result, if a group ID is not included in the source ID list L, then it is decided that the PD 20 is not in a group-registered state and holds no group ID, and the processing advances to step S350, at which a group registration process is executed among the PC 10, PD 20 and server apparatus 30. On the other hand, if a group ID is included in the source ID list L, then it is decided that the PD 20 is in a group-registered state and holds a group ID, and the processing advances to step S340.

Then at step S340, the PC 10 decides whether or not the group ID held by the PC 10 and the group ID held by the PD 20 coincide with each other (step S340; ID decision step). In particular, if it is decided at the registration decision step S330 that the PD 20 holds a group ID, then the PC 10 decides whether or not the group ID of the PD 20 read out from the source ID list L of the PD 20 and the group ID read out from the source ID list L of the PC 10 coincide with each other.

If it is decided as a result of this decision that the group ID held by the PC 10 and the group ID held by the PD 20 do not coincide with each other, then the processing advances to step S360, at which a user link process which is a characteristic of the present embodiment is executed between the PC 10 and the server apparatus 30. On the other hand, if the group ID held by the PC 10 and the group ID held by the PD 20 do not coincide with each other, then the processing advances to step S370, at which a content transfer process is executed between the PC 10 and the PD 20.

Figure 24:
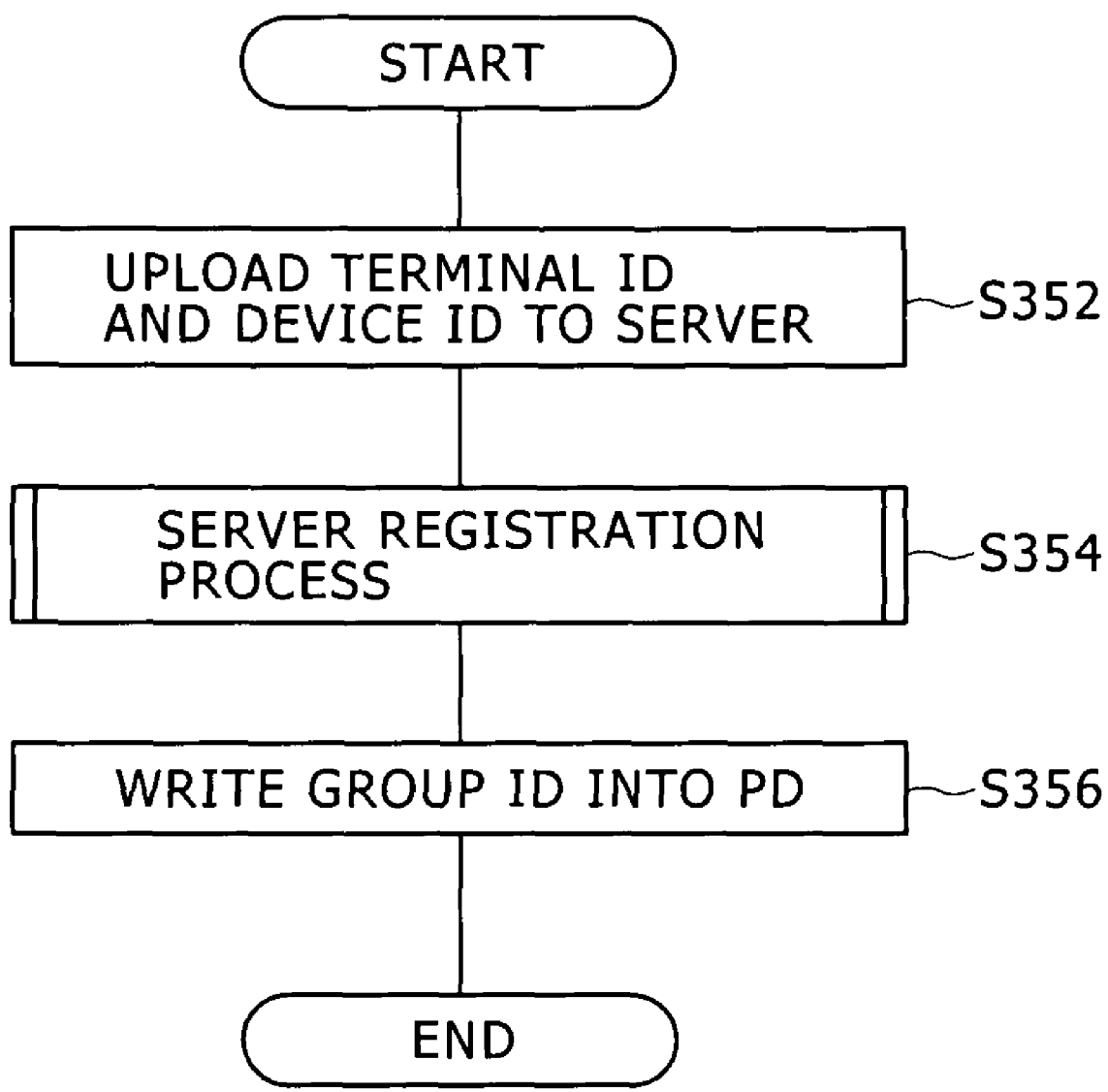
FIG. 24 is a flow chart illustrating an outline of a group registration process of the PD according to the embodiment.

Here, an outline of a group registration process of the PD 20 at step S350 of FIG. 23 described hereinabove is described with reference to FIG. 24. FIG. 24 is a flow chart illustrating an outline of the group registration process of the PD 20 according to the present embodiment.

As illustrated in FIG. 24, first at step S352, the PC 10 transfers the terminal ID of the PC 10 and the device ID of the PD 20 to the group management server 32 and issues a request for group registration of the PD 20 (step S352; registration requesting step).

Then at step S354, the group management server 32 group-registers the PD 20 in response to the group registration request described above (step S354; PD registration step). In particular, the group management server 32 searches the group registration database 324 for a user ID with which the transferred terminal ID is associated, and records the user ID in an associated relationship with the transferred device ID. By this, the PD 20 is group-registered into the apparatus group of the user of the user ID.

Thereafter, at step S356, the PC 10 adds a group ID same as the group ID included in the source ID list of the PC 10 to the source ID list L of the PD 20 (step S356; group ID addition step). Consequently, the PC 10 and the PD 20 hold the same group ID and can share a content corresponding to the group ID and owned by the user.

An outline of the group registration process of the PD 20 is described above with reference to FIG. 24. Details of the group registration process of this PD 20 are such as described hereinabove with reference to FIG. 16, and detailed description here is omitted.

Figure 25:
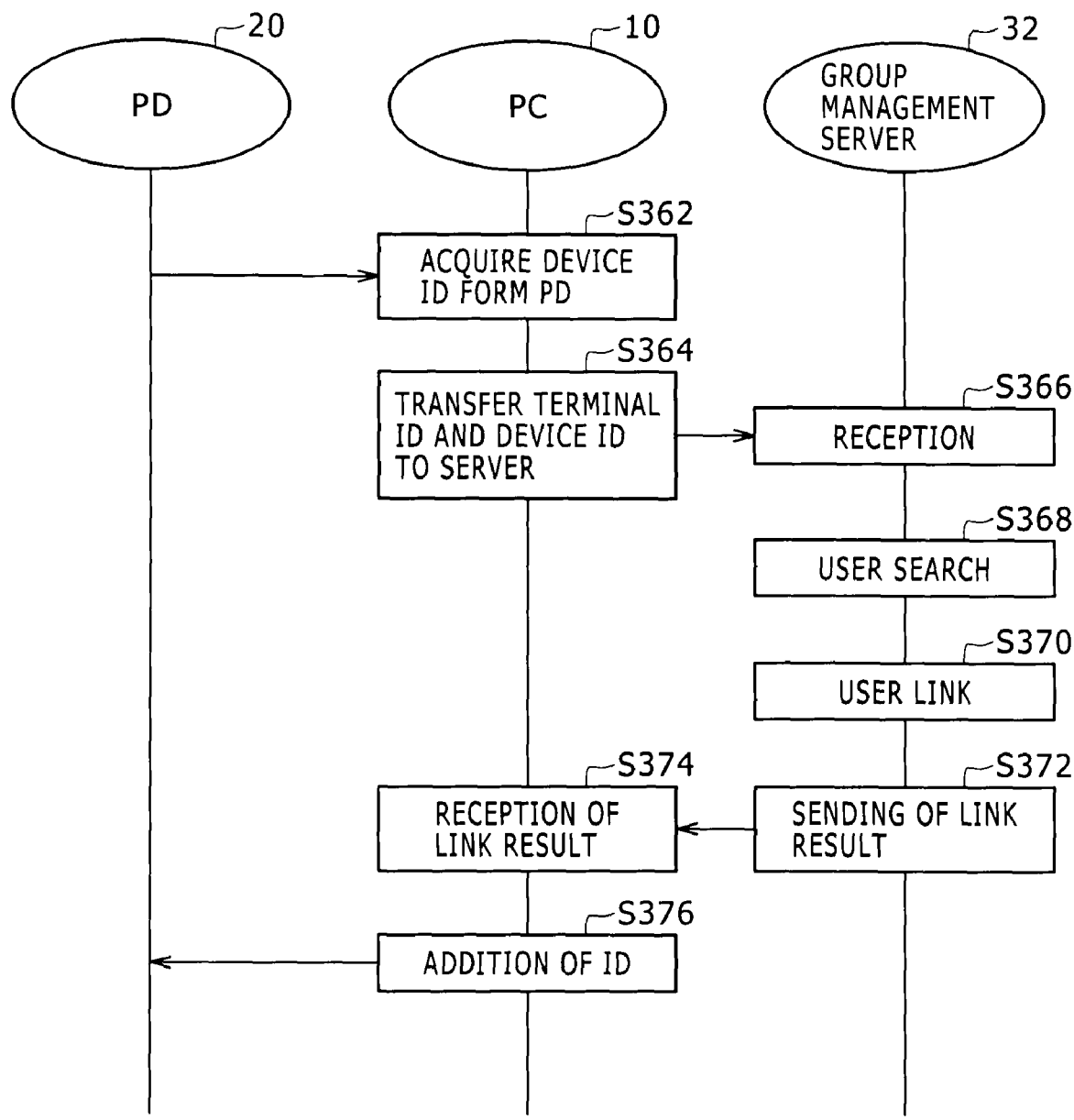
FIG. 25 is a sequence diagram illustrating the user link process according to the embodiment.

Now, a user link process at step S360 of FIG. 23 described hereinabove is described with reference to FIG. 25. FIG. 25 is a sequence diagram illustrating the user link process according to the present embodiment.

As shown in FIG. 25, if it is decided at step S340 described hereinabove that the group ID of the PC 10 and the group ID of the PD 20 do not coincide with each other, then the PC 10 first reads out and acquires the device ID of the PD 20 stored in the self ID database 235 of the PD 20 (step S362; device ID acquisition step). Further, the PC 10 reads out and acquires the terminal ID of the PC 10 stored in the self ID database 117.

Then, the PC 10 transfers the device ID of the PD 20 and the terminal ID of the PC 10 acquired as described above to the group management server 32 (step S364; ID transfer step). Consequently, the group management server 32 receives the device ID of the PD 20 and the terminal ID of the PC 10 (step S366; ID reception step).

Further, the group management server 32 searches the group registration database 324 based on the device ID of the PD 20 and the terminal ID of the PC 10 received as described above to specify first user identification information associated with the device ID (that is, the user ID-B of the user B who owns the PD 20) and second user identification information associated with the terminal ID (that is, the user ID-A of the user A who owns the PC 10) (step S368; user search step).

Thereafter, the group management server 32 records the first user identification information (user ID-A) and the second user identification information (user ID-B) searched out as described above in an associated relationship with each other into the group registration database 324 (step S370; user link step).

Then, after the association of the first and second user identification information described above is completed, the group management server 32 sends user link completion information representing that the association is completed to the PC 10 (step S372; link result sending step), and the PC 10 receives this user link completion information from the group management server 32 (step S374; link result reception step).

Furthermore, the PC 10 reads out the group ID-A included in the source ID list L of the PC 10 in response to reception of the user link completion information and adds the group ID-A to the source ID list L of the PD 20. Further, the PC 10 reads out the group ID-B included in the source ID list L of the PD 20 and adds the group ID-B to the source ID list L of the PC 10 (step S376; ID addition step). By this, both of the group ID-A and the group ID-B are included in the source ID lists L of the PC 10 and the PD 20. Therefore, both of the PC 10 and the PD 20 can share a distribution content purchased by the user A who is an owner of the PC 10 and another distribution content purchased by the user B who is an owner of the PD 20 such that the distribution contents can be reproduced by any of the apparatus.

The user link process ends therewith. In this manner, both users can be linked to each other by a simple operation of connecting the PC 10 and the PD 20 of different users to each other.

Figure 26:
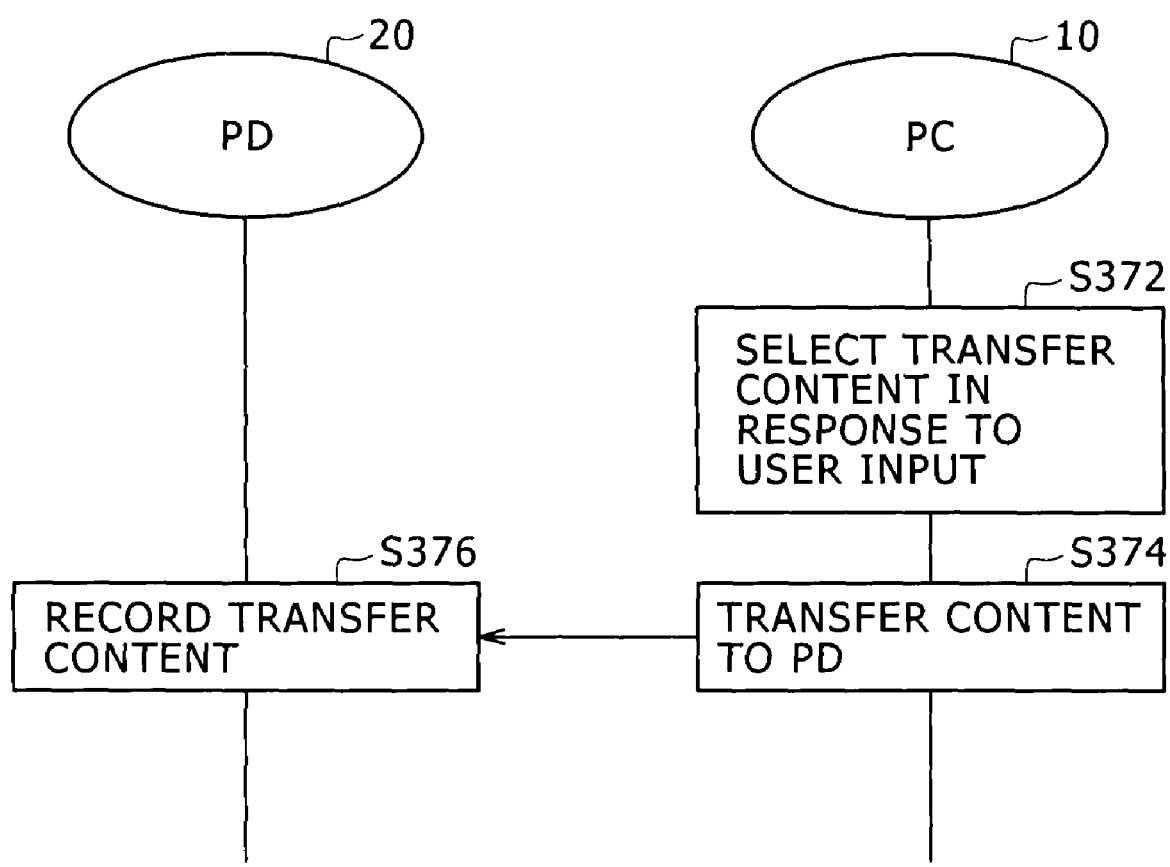
FIG. 26 is a flow chart illustrating a content transfer process according to the embodiment.

Now, the content transfer process at step S370 of FIG. 23 described hereinabove is described with reference to FIG. 26. FIG. 26 is a flow chart illustrating the content transfer process according to the present embodiment.

As illustrated in FIG. 26, if it is decided at step S340 described hereinabove that the group ID of the PC 10 and the group ID of the PD 20 coincide with each other, then the PC 10 first selects one, two or more contents of an object of transfer, for example, in response to a user input (step S372; transfer content selection step).

Then, if it is decided at step S340 described hereinabove that the group ID of the PC 10 and the group ID of the PD 20 coincide with each other, then the PC 10 selects one, two or more contents of an object of transfer, for example, in response to a user input (step S372; transfer content selection step).

Thereafter, the PC 10 reads out the contents selected based on the user input from within the content database 116 of the PC 10 and transfers the contents to the PD 20 (step S347; content transfer step). Further, the PC 10 records the thus transferred contents into the content database 234 of the PD 20 (step S376; content recording step).

The content transfer process ends therewith. By transferring the contents in this manner, the contents held by the PC 10 can be duplicated into the PD 20 between the PC 10 and the PD 20 which hold the same group ID. It is to be noted that, while, in the embodiment described above, a transfer content is selected in response to a user input, selection of a transfer content is not limited to such an example as just described, but the PC 10 may automatically select a transfer content or contents. In this instance, for example, the PC 10 may automatically transfer all contents which are not held by the PD 20 from among contents held by the PC 10 to the PD 20.

<14. Content Sharing Based on a User Link>

Now, a technique of sharing a content between a plurality of apparatus utilizing the user link function in the copyright management system 100 described hereinabove is described. It is to be noted that FIG. 27 is an explanatory view illustrating an outline of a technique of sharing a content between a plurality of apparatus utilizing a user link function in the copyright management system 100 according to the present embodiment.

Figure 27:
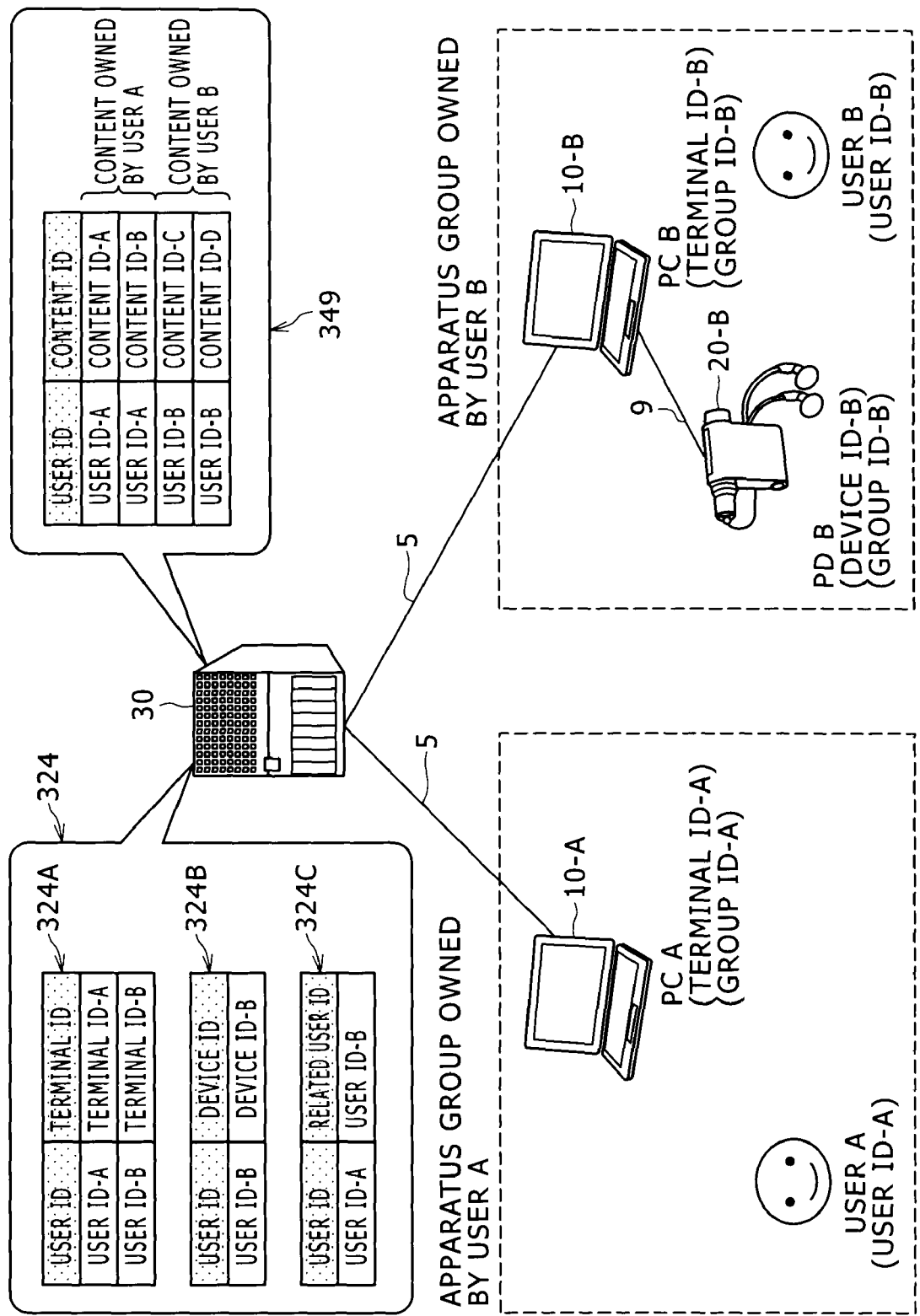
FIG. 27 is an explanatory view illustrating an outline of a technique of sharing a content between a plurality of apparatus utilizing the user link function in the copy management system according to the embodiment.

As shown in FIG. 27, in the copyright management system 100 according to the present embodiment, a plurality of users are group-managed on the server apparatus 30 based on user identification information user-linked to each other as described above, and apparatus of a user who belongs to the same user group can share a distribution content.

In particular, the server apparatus 30 includes a group management database 324 including a table 324C representing a user link state as described above, and a distribution content information database 349 which is a table of contents owned by different users.

The distribution content information database 349 is formed from a table wherein content IDs of distribution contents distributed from the content distribution server 34 to the PC 10 and user identification information (user IDs) of users who own the PCs 10 of the distribution destinations are associated with each other. When a user utilizes a PC 10 of the user itself to utilize the content distribution service to purchase a content (that is, when the content is distributed), the content distribution server 34 adds the content ID of the purchased content into the distribution content information database 349 described hereinabove.

By associating users and purchased contents with each other by such a distribution content information database 349 as described above, the content distribution server 34 can distribute (re-download) a content purchased and owned already by the user to the PC 10 of the user again. In other words, the user can use the PC 10 of the user itself to re-download a content purchased already by any number of times from the content distribution server 34. For example, in the example of FIG. 27, the user A of the user ID-A has already purchased and owns contents of the content ID-A and the content ID-B, and in this instance, the two contents can be re-downloaded from the content distribution server 34.

Further, the content distribution server 34 can distribute a content purchased and owned already by a different user linked to a certain user to a PC 10 of the certain user (download between friends). In other words, the user can use a PC 10 of the user itself to download a content owned by a different user-linked user such as a friend or a family from the content distribution server 34.

In this instance, the PC 10 of the user can download a content same as the content owned already by the different user from the content distribution server 34 and can acquire a license of the user ID of the user itself as a license. For example, in the example of FIG. 27, the user A and the user B who are friends are in a user-linked state, and the user A already purchases and owns two contents of the content ID-A and the content ID-B. In this instance, the user B can use the PC 10-B owned by the user B itself to download the two contents owned by the user A from the content distribution server 34 and reproduce the contents on the PC 10-B and the PD 20-B owned by the user B. In this manner, contents owned by the users A and B can be shared (share) between the user A and the user B linked to each other as friends or the like.

Now, a functional configuration of the copyright management system 100 according to the present embodiment for implementing the sharing function of a content utilizing the user link function is described with reference to FIG. 28. It is to be noted that FIG. 28 is a functional block diagram showing a functional configuration of the PC 10 and the server apparatus 30 for implementing the content sharing function utilizing the user link function.

Figure 28:
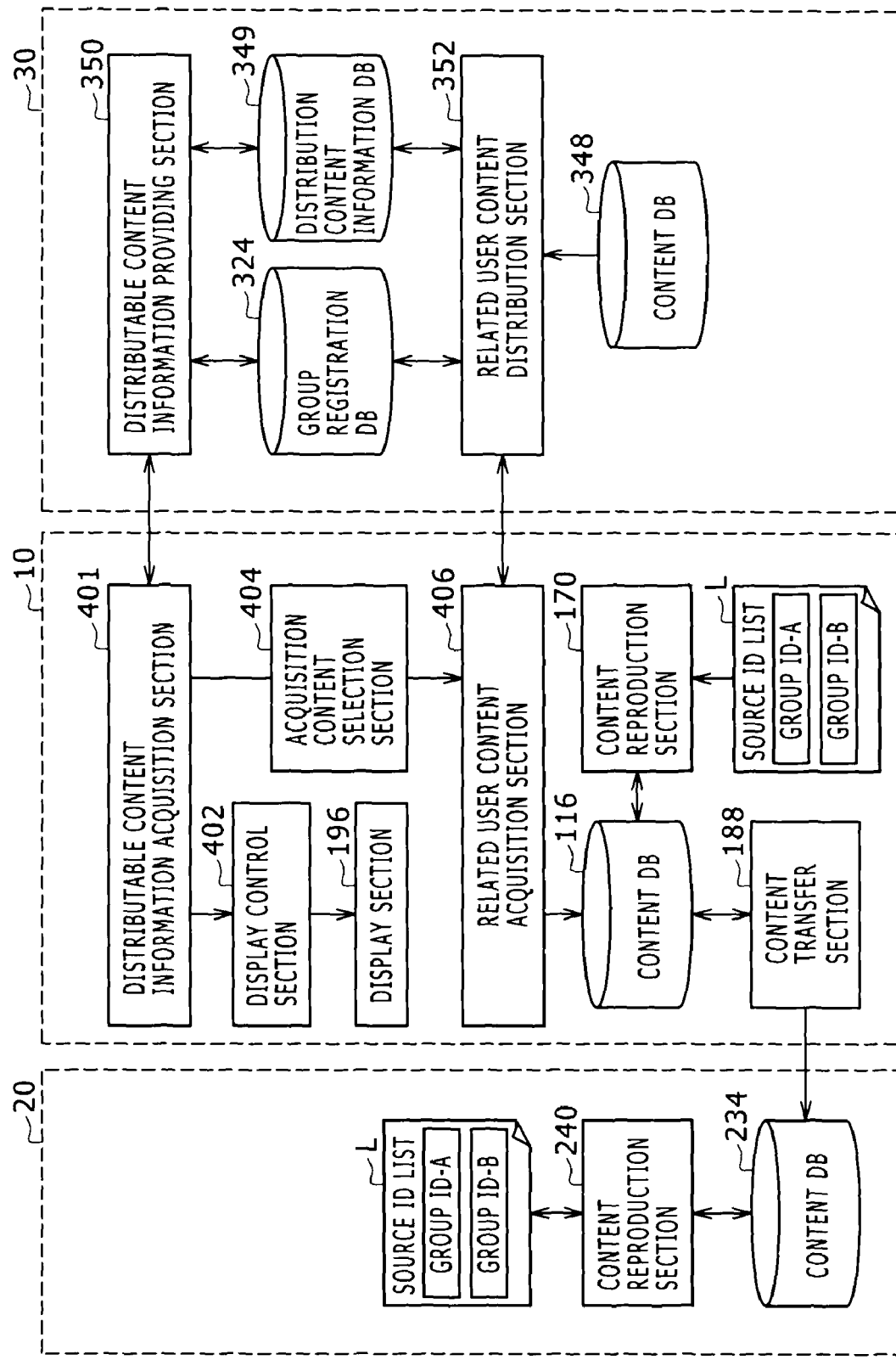
FIG. 28 is a functional block diagram of a PC and a server apparatus for implementing the content sharing function utilizing the user link function in the copyright management system according to the embodiment.

Referring to FIG. 28, the PC 10 includes, for example, a distributable content information acquisition section 401, a display control section 402, the above-described display section 196, an acquisition content selection section 404, a related user content acquisition section 406, the above-described content database 116, the above-described source ID list L, the above described content reproduction section 170 and the above-described content transfer section 188.

Meanwhile, the server apparatus 30 including the group management server 32 and the content distribution server 34 described hereinabove includes, for example, a distributable content information providing section 350, the above-described group registration database 324, the above-described distribution content information database 349, the above-described content database 348, and a related user content distribution section 352. It is to be noted that the PD 20 includes the above-described content database 234, the above-described source ID list L and the above-described content reproduction section 240.

In the following, the components mentioned are described in detail. It is to be noted that, in the following description, a particular example wherein the user A and the user B are already user-linked as illustrated in FIG. 27 and besides the user A already owns the contents of the content ID-A and the content ID-B while the user B already owns the contents of the content ID-C and the content ID-D is described.

The distributable content information acquisition section 401 of the PC 10 sends a distributable content accessing request to the server apparatus 30, and the distributable content information providing section 350 of the server apparatus 30 sends a table of distributable contents to the PC 10 in response to the distributable content accessing request.

In particular, the distributable content information acquisition section 401 of the PC 10 first sends a distributable content accessing request for requesting for a table of distributable contents to the server apparatus 30, for example, in response to a user input.

Consequently, when the distributable content accessing request is received, the distributable content information providing section 350 of the server apparatus 30 searches for second user identification information (for example, the user ID-B of the user B user-linked to the user A) associated with first user identification information corresponding to the PC 10 (for example, the user ID-A of the user A who owns the PC 10) from within the group registration database 324. Then, the distributable content information providing section 350 searches the distribution content information database 349 to read out one, two or more pieces of content identification information (for example, the content ID-C and the content ID-D of a plurality of contents owned by the user B) associated with the second user identification information.

Further, the distributable content information providing section 350 searches the distribution content information database 349 to read out one, two or more pieces of content identification information (for example, the content ID-A and the content ID-B of a plurality of contents owned by the user A) associated with the first user identification (for example, the user ID-A of the user A who owns the PC 10) corresponding to the PC 10.

Furthermore, the distributable content information providing section 350 sends the one, two or more content IDs searched out in this manner (for example, the content ID-C and the content ID-D owned by the user B and the content ID-A and the content ID-B owned by the user A) to the PC 10. It is to be noted that, upon such sending, attribute information of the content (a tune name, an album name, an artist name, reproduction time and so forth) may be sent together with the content ID.

Then, the distributable content information acquisition section 401 of the PC 10 receives the one, two or more pieces of content identification information (for example, the content ID-A, content ID-B, content ID-C and content ID-D) sent from the server apparatus 30 and outputs the received content identification information to the display control section 402.

Consequently, the display control section 402 controls the display section 196 to display the content identification information. By this, the user A of the PC 10 can access the content ID-A and the content ID-B owned by the user A and the content ID-C and the content ID-D owned by the user B user-linked as a friend or the like to selectively input a content desired to download.

The acquisition content selection section 404 of the PC 10 selects a content of a distribution object in response to such a selective input of the user as described above. In particular, the acquisition content selection section 404 extracts content IDs (for example, the content ID-B and the content ID-C described above) selected in response to the selective input of the user from among the content IDs (for example, the content ID-A, content ID-B, content ID-C and content ID-D described hereinabove) inputted from the distributable content information acquisition section 401 described hereinabove and outputs the extracted contents IDs to the related user content acquisition section 406.

The related user content acquisition section 406 sends a content distribution request to the server apparatus 30. Consequently, the related user content distribution section 352 of the server apparatus 30 distributes the contents owned by the user linked to the user of the PC 10 and/or the contents owned by the user of the PC 10 to the PC 10 in response to the content distribution request. At this time, the related user content acquisition section 406 requests for distribution of contents corresponding to the content identification information selected, for example, in response to the user input through the acquisition content selection section 404.

In particular, the related user content acquisition section 406 of the PC 10 first sends a content distribution request for requesting for distribution, for example, of the contents selected by the acquisition content selection section 404 to the server apparatus 30. This content distribution request includes the content IDs (for example, the content ID-B and the content ID-C) of the contents of the distribution object selected by the acquisition content selection section 404 described above. Further, where distribution of all distributable contents is to be requested, the content distribution request described hereinabove may not include the content IDs of the contents of the distribution object.

If the content distribution request is received from the PC 10, then the related user content distribution section 352 of the server apparatus 30 searches for one, two or more pieces of second user identification information (for example, the user ID-B of the user B user-linked to the user A) associated with the first user identification information (for example, the user ID-A of the user A who owns the PC 10) corresponding to the PC 10 from within the group registration database 324. Then, the related user content distribution section 352 searches the distribution content information database 349 to read out one, two or more pieces of content identification information (for example, the content ID-C and the content ID-D owned by the user B) corresponding to the searched out second user identification information. Further, the related user content distribution section 352 reads out the contents corresponding to the read out content identification information from the content database 348 and distributes the read out contents to the PC 10. In this manner, contents owned by the user B linked to the user A who owns the PC 10 are distributed to the PC 10 of the user A.

Further, when the content distribution request is received from the PC 10, the related user content distribution section 352 searches the distribution content information database 349 to read out one, two or more pieces of content identification information (for example, the content ID-A and the content ID-B owned by the user A) corresponding to the first user identification information (for example, the user ID-A of the user A who owns the PC 10) corresponding to the PC 10. Further, the related user content distribution section 352 reads out the contents corresponding to the read out content identification information from the content database 348 and distributes the read out contents to the PC 10. In this manner, the contents owned by the user A who owns the PC 10 are distributed again to the PC 10 of the user A.

It is to be noted that such a search process for a content by the related user content distribution section 352 as described above is carried out where the content distribution request from the PC 10 includes the content IDs of contents of a distribution object.

On the other hand, where the content distribution request from the PC 10 does not include the content IDs (for example, the content ID-B and the content ID-C) of contents of a distribution object, the related user content distribution section 352 can search the content database 348 based on the content IDs to read out the contents corresponding to the content IDs (for example, the content ID-B and the content ID-C) from the content database 348 and distribute the contents to the PC 10. The search process can be simplified thereby.

As a result of such content distribution by the related user content distribution section 352 as described above, the related user content acquisition section 406 of the PC 10 receives the contents (for example, the content of the content ID-C owned by the user B and the content of the content ID-B owned by the user A) in response to the content distribution request described hereinabove) and records the distributed contents into the content database 116. By this, the content reproduction section 170 of the PC 10 can reproduce the distributed contents based on the source ID list L of the PC 10.

Further, the content transfer section 188 of the PC 10 transfers the distributed contents to the PD 20 so as to be recorded into the content database 116 of the PD 20. By this, the content reproduction section 240 of the PD 20 can reproduce the distributed contents based on the source ID list L of the PD 20.

In this instance, although any content owned by the other user B has the group ID-B of the user B added thereto, since the group ID-B of the user B is added to the source ID lists L of the PC 10 and the PD 20 of the user A upon user link described hereinabove, the PC 10 and the PD 20 of the user A can reproduce a content to which the group ID-B is added.

It is to be noted that, in the present embodiment, when, to a PC 10 of a certain user A, a content of a different user B user-lined to the user A is to be distributed, the group ID-B of the different user B is added to the content. However, the present invention is not limited to such an example as just described above, but upon content distribution of the different user B, the group ID-A of the user A may be added to the content of the user B. By this, even if such a configuration that, upon user link of the user A and the user B, the group ID of the different user B is not added to the source ID list L of the PC 10 or the PD 20 of the user A is adopted, the PC 10 and the PD 20 of the user A can reproduce a content of the user B based on the group ID-A of the user A in the source ID list L.

Now, a processing flow of distributing, between the server apparatus 30 and a PC 10 according to the present embodiment, a content of a different user making use of the user link function is described with reference to FIGS. 29 to 30. It is to be noted that FIG. 29 is a sequence diagram illustrating a processing flow of distributing a content of a different user between the server apparatus 30 and a PC 10 according to the present embodiment, and FIG. 30 is a flow chart illustrating a specification processing flow of a distributable content of FIG. 29 in detail.

Figure 29:
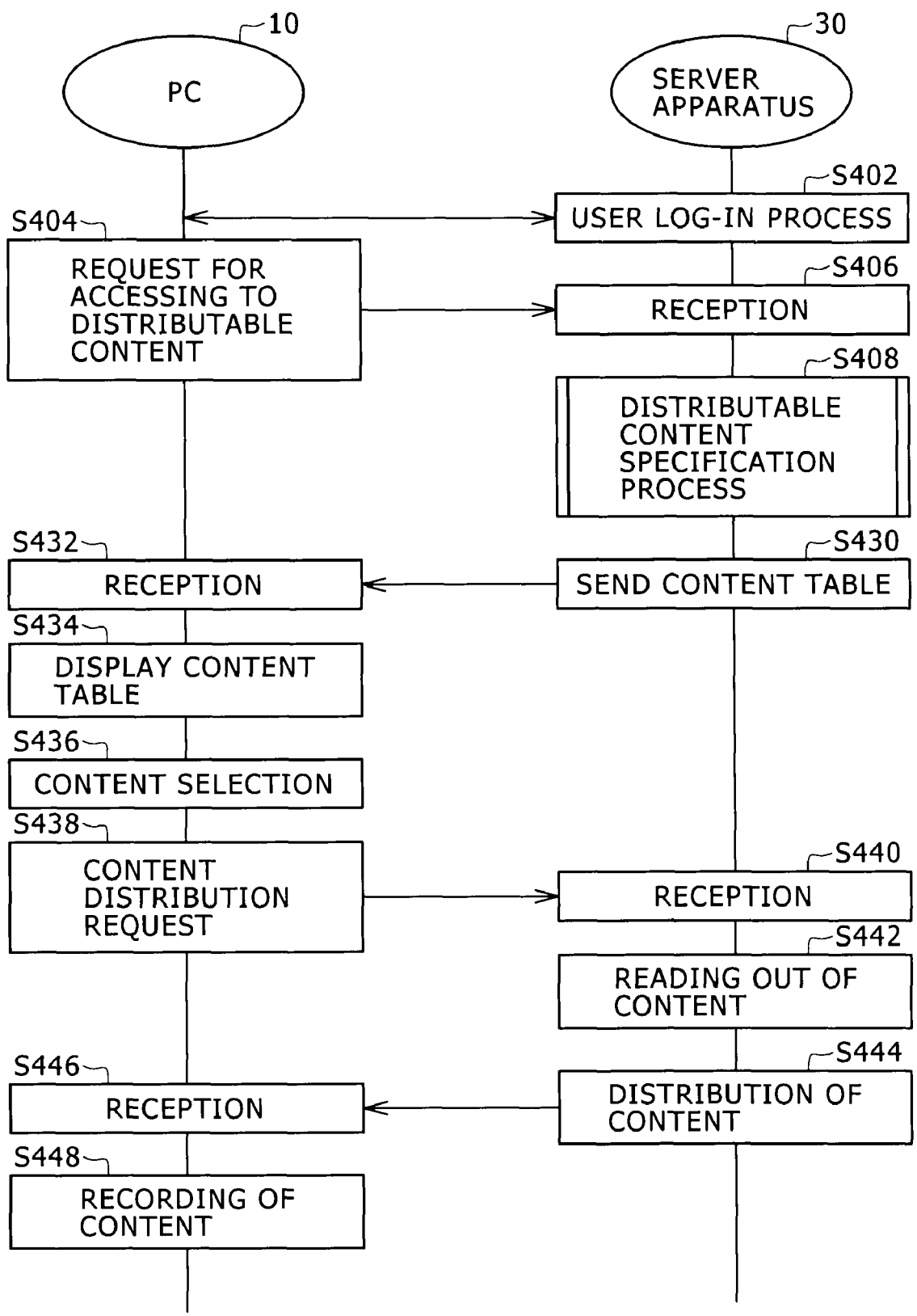
FIG. 29 is a sequence diagram illustrating a processing flow for distributing a content of a different user between the server apparatus and a PC according to the embodiment.

As shown in FIG. 29, first at step S402, the server apparatus 30 carries out a log-in process of a user of a PC 10 (step S402). In particular, after the server apparatus 30 receives a user ID and a password inputted by the user from the PC 10, it carries out an authentication process of the user to decide whether or not log-in should be permitted. If the log-in is recognized, then the server apparatus 30 notifies the PC 10 of this and then advances the processing to a next step.

Then, the PC 10 sends a distributable content accessing request for requesting for a table of distributable contents to the server apparatus 30 (step S404; distributable content accessing request sending step), and the server apparatus 30 receives the distributable content accessing request (step S406; distributable content accessing request reception step). In response to this, the server apparatus 30 executes a specification process of a distributable content (step S410).

Figure 30:
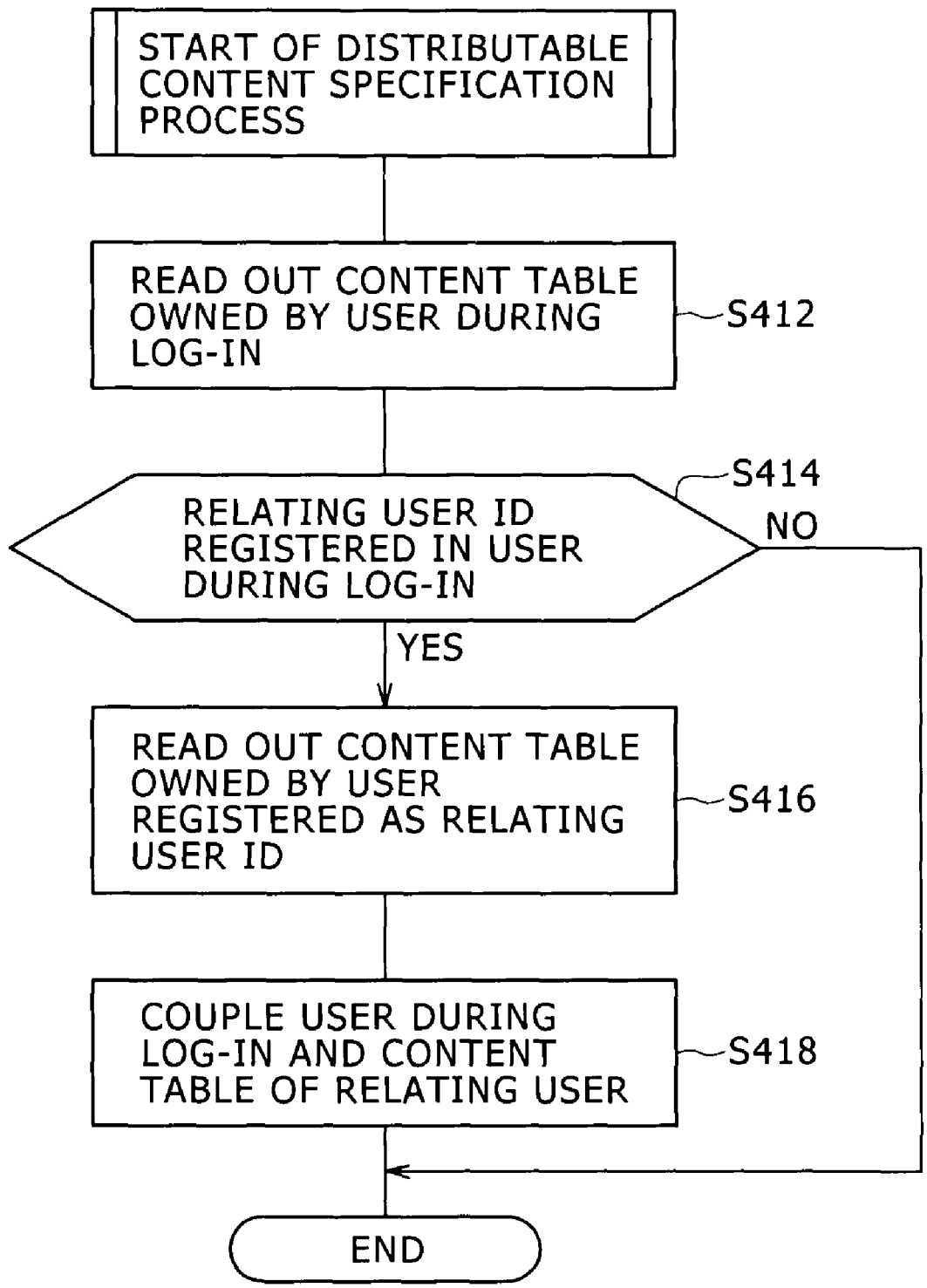
FIG. 30 is a flow chart particularly illustrating a specification processing flow of a distributable content of FIG. 29.

In particular, as illustrated in FIG. 30, first at step S412, the server apparatus 30 reads out a table of content identification information of contents owned already by the user during log-in (step S412). In particular, the group management server 32 of the server apparatus 30 searches the distribution content information database 349 based on first user identification information (user IDA of the user A) corresponding to the user A during log-in to read out all of one, two or more pieces of content identification information (content ID-A and content ID-B of a plurality of contents owned by the user A) associated with the first user identification information.

Then at step S414, the server apparatus 30 decides whether or not a different user is user-liked to the user during log-in, that is, whether or not a related user ID is registered in an associated relationship with the user ID of the user during log-in (step S414). In particular, the group management server 32 searches the group registration database 324 to decide whether or not a user ID of a different user is registered as a related user ID to the user ID-A of the user A during log-in. If it is decided as a result of this decision that a related user ID is not registered (where no different user is user-linked), then the specification process of a distributable content is ended, and the processing advances to step S430 of FIG. 29. At step S430, only a table of one, two or more pieces of content identification information read out at step S412 described hereinabove (a table of the content ID-A and the content ID-B of a plurality of contents owned by the user A) is sent as a table of distributable contents to the PC 10 (step S430; distributable content information providing step).

On the other hand, if it is decided as a result of the decision at step S414 that a related user ID is registered (where a different user is user-linked), the processing advances to step S416, at which production of a table of contents owned by the different user is carried out.

Then, at step S416, the server apparatus 30 reads out a table of contents owned by the different user user-linked to the user during log-in, that is, a table of content identification information associated with the user ID registered as the related user ID described hereinabove (step S416). In particular, the group management server 32 first searches for one, two or more pieces of second user identification information (for example, the user ID-B of the user B user-linked to the user A) associated with the first user identification information (for example, the user ID-A of the user A) corresponding to high-ranked user during log-in from within the group registration database 324. Further, the content distribution server 34 searches the distribution content information database 349 to read out all of one, two or more pieces of content identification information (for example, the content ID-C and the content ID-D owned by the user B) corresponding to the searched out second user identification information.

Then at step S418, the server apparatus 30 couples the content table of the user during log-in read out at step S412 described hereinabove and the content table of the related user read out at step S416 described hereinabove (step S418). In particular, the content distribution server 64 combines one, two or more pieces of content identification information (for example, the content ID-A and the content ID-B owned by the user A) corresponding to the first user identification information read out at step S412 described hereinabove and one, two or more pieces of content identification information (for example, the content ID-C and the content ID-D owned by the user B) corresponding to the second user identification information read out at step S416 described hereinabove to produce a table of distributable contents (a list of the content ID-A, content ID-B, content ID-C and content ID-D).

At this step S418, all processing of the distributable content specification process (S410) ends, and the processing advances to step S430 of FIG. 29, at which a list which is a combination of the content table of the user during log-in and the content table of the related user produced as described above is sent as a table of distributable contents to the PC 10 (step S430; distributable content information providing step).

Then at step S432 of FIG. 29, the PC 10 receives the table of distributable contents sent from the server apparatus 30 (step S432; distributable content information acquisition step), and causes the display section 196 to display the table of distributable contents (step S434; distributable content display step). Consequently, the user of the PC 10 can access the table of distributable contents and selectively input a content desired to download.

Further, at step S436, the PC 10 selects one, two or more contents of a distribution object from within the table of distributable contents in response to a selective input of the user (step S436; distribution content selection step). Then, the PC 10 sends a content distribution request to the server apparatus 30 (step S438; content distribution requesting step). This content distribution request includes content IDs corresponding to the selected one, two or more contents of a distribution object (for example, the content ID-B owned by the user A and the content ID-C owned by the user B).

Consequently, the server apparatus 30 receives the content distribution request from the PC 10 (step S440; content distribution request reception step). Further, the server apparatus 30 reads out one, two or more contents corresponding to the content identification information (for example, the content ID-B and the content ID-C) included in the content distribution request received from the PC 10 from the content database 348 (step S442) and sends the read out contents to the PC 10 of the distribution requesting source (step S444).

Consequently, the PC 10 receives the contents whose distribution was requested (step S446) and records the contents into the content database 116 (step S448). Further, the PC 10 may transfer the distributed contents to the PD 20 connected to the PC 10 so as to be recorded into the PD 20.

As described above, the user link function can be utilized to download, using the PC 10 owned by the user A, a content owned by a different user B linked to the user A and share the content. Thereupon, since a table of distributable contents can be accessed before the downloading, the user can select a desired content from within the table conveniently.

<15. Reproduction History Accessing Function Based on a User Link>

Now, a technique for sharing a reproduction history of contents by a different user making use of the user link function in the copyright management system 100 described hereinabove is described.

In the copyright management system 100 according to the present embodiment, a function can be implemented which can upload a reproduction history of contents on each apparatus in advance into the server apparatus 30 and lay such reproduction histories open only to those users which are user-lined to each other based on user identification information user-linked to each other as described above.

In particular, the server apparatus 30 retains a group registration database 324 (refer to FIG. 20) including a table 324C representative of a user link state as described above and a reproduction history database 354 (refer to FIG. 31) which is a table of reproduction histories of contents in the apparatus owned by the individual users.

This reproduction history database 354 is formed from a table which associates the user IDs of the individual users and reproduction histories (for example, content IDs and reproduction date and hour data) of contents reproduced by the individual users. If a user uses a PC 10 of the user itself to reproduce a content, then the content ID and the reproduction date and hour of the reproduced content are uploaded from the PC 10 to the server apparatus 30. The server apparatus 30 records the content ID and the reproduction date and hour as a reproduction history in an associated relationship with the user ID of the user into the reproduction history database 354. By this, the server apparatus 30 can transfer, to a PC 10 owned by a certain user A, the reproduction history of a different user B linked to the user A. As a result, the user A can cause the PC 10 of the user A itself to display the reproduction history of the user B and access the reproduction history. Consequently, the user A can grasp the liking or the frequency of reproduction of contents by the user B who is a friend, a family or the like or load and reproduce a content which is reproduced frequently by the user B, and therefore, the variation in utilization of contents is expanded.

Here, a functional configuration for implementing the sharing function of reproduction histories utilizing the user link function in the copyright management system 100 according to the present embodiment is described with reference to FIG. 31. It is to be noted that FIG. 31 is a functional block diagram showing a functional configuration of a PC 10 and the server apparatus 30 for implementing the sharing function of reproduction histories utilizing the user link function in the copyright management system 100 according to the present embodiment.

Figure 31:
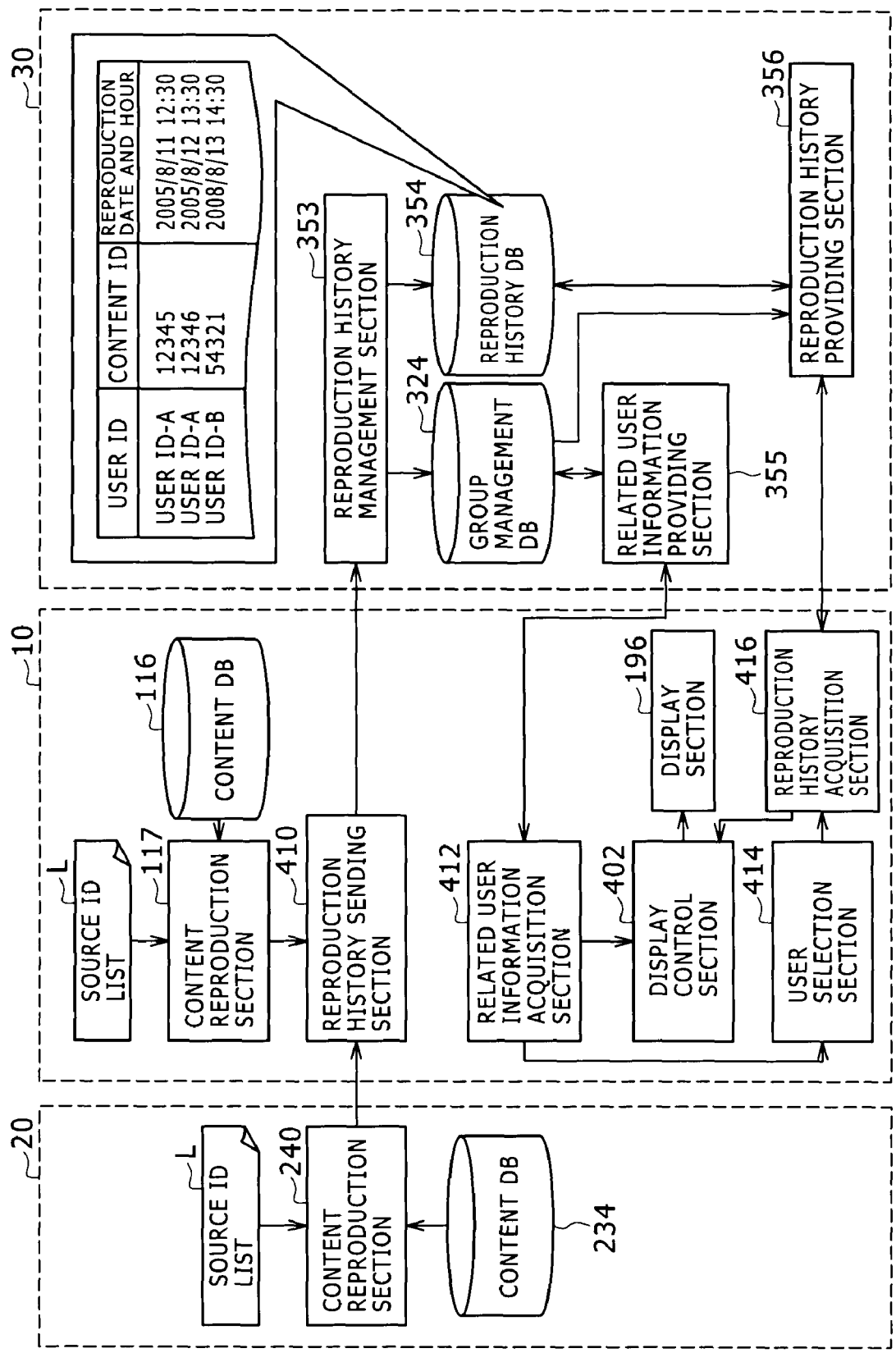
FIG. 31 is a functional block diagram showing a functional configuration of a PC and a server apparatus for implementing the sharing function of a reproduction history utilizing the user link function in the copyright management system according to the embodiment.

As shown in FIG. 31, the PC 10 includes, for example, the above-described content database 116, the above-described source ID list L, the above-described content reproduction section 170, a reproduction history sending section 410, a related user information acquisition section 412, the above-described display control section 402, the above-described display section 196, a user selection section 414 and a reproduction history acquisition section 416.

Meanwhile, the server apparatus 30 including the group management server 32 and the content distribution server 34 described hereinabove includes, for example, a reproduction history management section 353, the above-described group registration database 324, a reproduction history database 354, a related user information providing section 355, and a reproduction history providing section 356. It is to be noted that the PD 20 includes the above-described content database 234, the above-described source ID list L, and the above-described content reproduction section 240.

In the following, the individual components are described. It is to be noted that, in the following description, a particular example wherein a user A, another user B and a further user C are user-liked to each other already is described.

The content reproduction section 170 of the PC 10 can read out a plurality of contents stored in the content database 116 and reproduce the contents based on the source ID list L.

The reproduction history sending section 410 sends a reproduction history of contents reproduced by such a content reproduction section 170 as described above to the server apparatus 30. In particular, for example, every time reproduction of a content is started by the content reproduction section 170, the reproduction history sending section 410 sends the content ID of the content as a reproduction history to the server apparatus 30. Thereupon, the PC 10 may send reproduction date and hour information as a reproduction history together with the content ID so that the reproduction date and hour of the content can be managed on the server apparatus 30 side. It is to be noted that, where the server apparatus 30 side can record the date and hour information upon reception of the content ID together with the content ID, the PC 10 need not send the date and hour information.

Further, also the content reproduction section 240 of the PD 20 can read out a plurality of contents stored in the content database 234 and reproduce the contents based on the source ID list L. Therefore, where the PC 10 and the PD 20 are connected to each other, the reproduction history sending section 410 of the PC 10 can send also a reproduction history of contents reproduced by the content reproduction section 240 of the PD 20 to the server apparatus 30. At this time, where the PC 10 and the PD 20 are connected continuously, the reproduction history sending section 410 can send the reproduction history of the PD 20 on the real time basis, for example, at the timing of the starting of reproduction by the PD 20 to the server apparatus 30. On the other hand, where the PC 10 and the PD 20 are not connected to each other, every time a content is reproduced on the PD 20 side, a reproduction history of the content (content ID, reproduction date and hour and so forth) may be stored such that, when the PC 10 and the PD 20 are connected to each other later, all of the reproduction histories of the PD 20 stored in the PD 20 can be sent to the server apparatus 30.

The reproduction history management section 353 of the server apparatus 30 records the reproduction histories (content IDs and so forth) received from the PC 10 described hereinabove into the reproduction history database 354 and manages the reproduction histories. In particular, every time a reproduction history (content ID and so forth) sent from the PC 10 described hereinabove is received, the reproduction history management section 353 records this reproduction history in an associated relationship with user identification information (user ID of the user who owns the PC 10) corresponding to the PC 10 of the sending source into the reproduction history database 354. As a result, as illustrated in FIG. 31, the content IDs of contents reproduced by the users A, B and C are successively recorded and accumulated as reproduction histories in an associated relationship with the user ID-A, user ID-B and user ID-C into the reproduction history database 354, respectively.

Now, a function of accessing the reproduction histories of the users accumulated in the server apparatus 30 in this manner is described.

The related user information acquisition section 412 of the PC 10 sends a related user accessing request for requesting for accessing to user identification information of a different user linked to a user who owns the PC 10 to the server apparatus 30, for example, in response to a user input which requests for accessing to reproduction histories. In order to allow the different user to be specified on the server apparatus 30 side, the related user accessing request may include, for example, the terminal ID stored in the PC 10 or may include the first user identification information inputted by the user.

Consequently, when the related user information providing section 324 of the server apparatus 30 receives the related user accessing request from the PC 10, the related user information providing section 324 searches the group registration database 324 based on the terminal ID or the user ID included in the related user accessing request to read out one, two or more pieces of second user identification information (for example, the content ID-B and the content ID-C linked to the user ID-A) associated with first user information (for example, the user ID-A of the user A who owns the PC 10) corresponding to the PC 10. Then, the related user information providing section 324 sends the read out second user identification information to the PC 10.

The related user information acquisition section 412 of the PC 10 receives the second user identification information (for example, the content ID-B and the content ID-C) sent from the server apparatus 30 in response to the reproduction history accessing request described hereinabove and outputs the second user identification information to the display control section 402.

Consequently, the display control section 402 controls the display section 196 to display the second user identification information. By this, the user A of the PC 10 can access the information of the user user-linked as a friend or the like with the user A itself (for example, the content ID-B and the content ID-C) and selectively input a user (for example the user ID-B) whose reproduction history the user A desires to access.

The user selection section 414 of the PC 10 selects a user of an accessing object of a reproduction history in response to such a selective input of a user. In particular, the acquisition content selection section 404 extracts, from among the user IDs (for example, the content ID-B and the content ID-C) inputted from the related user information acquisition section 412, the content ID (for example, the user ID-B) selected by the selective input of the user described above and outputs the extracted content ID to the reproduction history acquisition section 416.

The reproduction history acquisition section 416 sends a reproduction history accessing request for requesting for accessing to a reproduction history relating to the related user. Consequently, the reproduction history providing section 356 of the server apparatus 30 searches for one, two or more pieces of second user identification information (content ID-B and content ID-C) associated with the first user identification information (user ID-A) corresponding to the PC 10 from the group registration database 324 in response to the reproduction history accessing request. Then, the reproduction history providing section 356 reads out the reproduction histories corresponding to the searched out second user identification information from the reproduction history database 354 and sends the reproduction histories to the PC 1 of the requesting source.

It is to be noted that such a search process of a reproduction history by the reproduction history acquisition section 416 as described above is carried out where the reproduction history accessing request from the PC 10 does not include second user identification information of the user of an accessing object.

On the other hand, where the reproduction history accessing request from the PC 10 includes second user identification information (for example, the user ID-B) corresponding to the user of the accessing object selected by the user selection section 414 described hereinabove, the reproduction history acquisition section 416 can search the reproduction history database 354 based on the second user identification information to read out reproduction histories (for example, reproduction histories of the user B) corresponding to the second user identification information and send the reproduction histories to the PC 1 of the requesting source. By this, the search process can be simplified.

In response to sending of such reproduction histories by the reproduction history providing section 356 of the server apparatus 30, the reproduction history acquisition section 416 of the PC 10 outputs the reproduction histories sent from the server apparatus 30 and outputs the reproduction histories to the display control section 402.

Consequently, the display control section 402 controls the display section 196 to display the reproduction histories received by the reproduction history acquisition section 416 (for example, a content ID of a content, a tune name, an album name, an artist name and reproduction date and hour). By this, the user A of the PC 10 can access the reproduction histories of the user B user-linked as a friend or the like with the user A itself to grasp the liking of contents, the liking of artists, reproduction frequencies and so forth of the user B.

Now, a processing flow of displaying a content reproduction history of a different user utilizing the user link function between the server apparatus 30 and a PC 10 according to the present embodiment is described with reference to FIG. 32. It is to be noted that FIG. 32 is a sequence diagram illustrating a processing flow of displaying a content reproduction history of a different user utilizing the user link function between the server apparatus 30 and a PC 10 according to the present embodiment.

Figure 32:
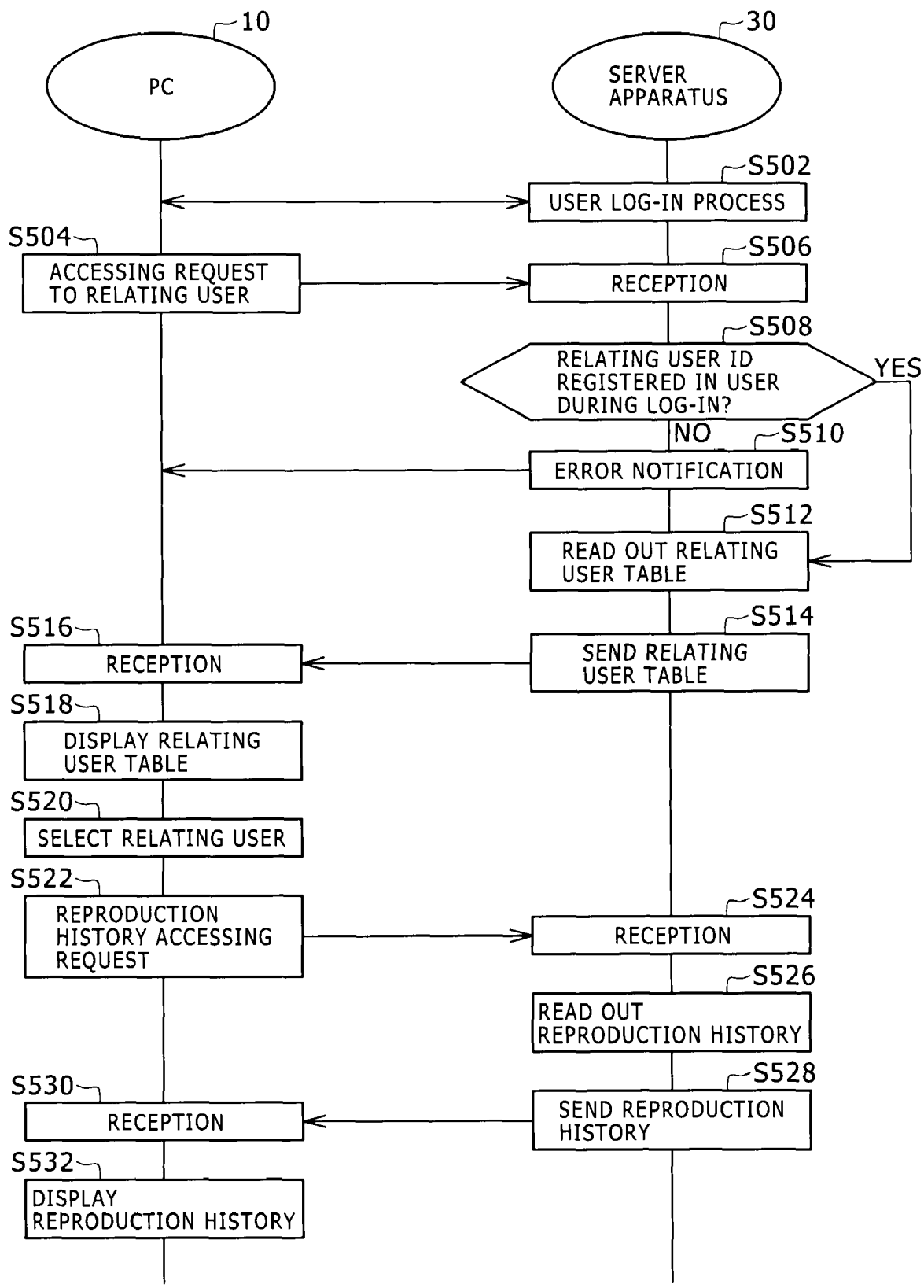
FIG. 32 is a sequence diagram illustrating a processing flow for displaying a content reproduction history of a different user utilizing the user link function between the server apparatus and a PC according to the embodiment.

As shown in FIG. 32, first at step S502, the server apparatus 30 carries out a log-in process of the user of the PC 10 (step S502). In particular, when the server apparatus 30 receives a user ID and a password inputted by the user of the PC 10 from the PC 10, it carries out an authentication process of the user to decide whether or not the log-in of the user should be acknowledged. If the log-in should be acknowledged, then the server apparatus 30 notifies the PC 10 of this and then advances the processing to a next step.

Then, the PC 10 sends a related user accessing request for requesting for a table of other users linked to the user who owns the PC 10 to the server apparatus 30 in response to a user input (step S504; related user accessing request sending step). The server apparatus 30 receives this related user accessing request (step S506; related user accessing request reception step).

Then, the server apparatus 30 executes a process of producing a table of related users in response to this related user accessing request.

In particular, first at step S508, the server apparatus 30 decides whether or not a different user is user-linked to the user during log-in, that is, whether or not a related user ID is registered in an associated relationship with the user ID of the user during log-in (step S508). In particular, the group management server 32 searches the group registration database 324, for example, based the user ID-A of the user A during log-in to decide whether or not the user ID of a different user is registered as a related user ID to the user ID-A. If it is decided as a result of this decision that no related user ID is registered (where a different user is not user-linked), the server apparatus 30 carries out error notification that a related user is not registered as yet to the PC 10 (step S510) and then ends all processes. On the other hand, if it is decided as a result of the decision at step S508 that a related user ID is registered (where a different user is user-linked), the processing advances to step S512).

Then at step S512, the server apparatus 30 searches the group registration database 324 to read out all of one, two or more user IDs (for example, the user ID-B and the user ID-C) associated as related user IDs with the user ID of the user during log-in (step S512).

Furthermore, at step S514, the server apparatus 30 sends the one, two or more user IDs read out at step S512 described above as a table of related users to the PC 10 (step S514; related user information providing step).

Then at step S516, the PC 10 receives the table of related users sent from the server apparatus 30 described hereinabove (step S516; related user information acquisition step) and controls the display section 196 to display this table of related users (step S8518; related user display step). By this, the user A of the PC 10 can access the information of users (for example, the content ID-B and the content ID-C) user-liked as a friend or the like with the user A itself and selectively input a user (for example, the user ID-B) desired to access the reproduction history.

Furthermore, at step S520, the PC 10 selects a related user of an accessing object of the reproduction history in response to such a selective input of the user as described above (step S520; user selection step). Then, the PC 10 sends a reproduction history accessing request of the selected related user described above to the server apparatus 30 (step S522; reproduction history accessing requesting step). This reproduction history accessing request includes user IDs (for example, the user ID-B) corresponding to the one, two or more related users of an accessing object selected as described above.

Consequently, the server apparatus 30 receives the reproduction history accessing request from the PC 10 (step S524; reproduction history accessing request reception step). Further, the server apparatus 30 reads out reproduction histories corresponding to the user ID (for example, the user ID-B) included in the reproduction history accessing request received from the PC 10 from the reproduction history database 354 (step S526) and sends the read out reproduction history to the PC 10 of the accessing request object (step S528).

By this, the PC 10 receives the reproduction histories of the user who issued the request for accessing from the server apparatus 30 (step S530) and causes the display section 196 to display the reproduction histories (step S532).

By utilizing the user link function, a content reproduction history of the different user B linked to the user A can be downloaded and displayed using the PC 10 owned by the user A in such a manner as described above. By this, the user A of the PC 10 can access the reproduction history of the user B user-linked as a friend or the like to the user A itself to grasp the liking of the user B regarding contents or the liking, reproduction frequency and so fort of the user B regarding artists.

The copyright management system according to the present embodiment and the PC 10, PD 20 and server apparatus 30 which composes the copyright management system as well as the processing operations of the components are described above. According to the present embodiment, a user who owns a PC 10 and a different user who owns a PD 20 are linked to each other under the condition that the PC 10 and the PD 20 can be physically connected to each other at short distances. By this, the users of the PC 10 and the PD 20 can be linked to each other by a simple operation of connecting the PC 10 and the PD 20. Further, those users who make an object of user link can be restricted to those persons who have a relationship that the PC 10 and the PD 20 of them can be physically connected to each other, for example, to acquaintances such as intimate friends or families.

Accordingly, since, among such users, a content is utilized within the range of personal use, sharing of a content or mutual accessing to reproduction histories can be acknowledged thereby to improve the degree of freedom in content utilization. Meanwhile, with regard to such a relationship as total strangers, the user link can be restricted, and therefore, such an illegal act as to share a content among such an unspecified great number of users as mentioned above can be prevented to execute copyright management precisely.

While a preferred embodiment of the present invention has been described above with reference to the accompanying drawings, naturally the present invention is not limited to the embodiment. It is apparent that a person skilled in the art could have made various alterations or modifications without departing from the spirit and scope of the invention as defined in claims, and it is understood that also such alterations and modifications naturally fall within the technical scope of the present invention.

For example, while, in the embodiment described above, each content processing apparatus (PC) 10 produces a group ID based on user identification information (leaf ID) received from the server apparatus 30, the present invention is not limited to such an example as just mentioned. For example, the server apparatus 30 may produce a group ID in a unit of a user. In this instance, upon registration of each apparatus, the group management server 32 may notify the content processing apparatus 10 of a group ID in place of the leaf ID described above, and the content processing apparatus 10 may store the received group ID into the source ID list. Further, the content distribution server 34 may send the group ID in an associated relationship with a distribution content in place of the leaf ID. At this time, it is possible also for the content distribution server 34 to send the group ID to the content processing apparatus 10 with the group ID added in advance in a file of the distribution content.

Also it is possible to exchange a playlist between apparatus of different users user-linked to each other. A playlist is a list which defines a reproduction order of a plurality of contents grouped in accordance with a specific criterion. This playlist can be produced freely by the user in response to the liking of the user itself or can be produced by the content distribution side by grouping contents to be recommended and distributed to the PC 10.

By sharing such a playlist as described above among apparatus of different users, the variation of content utilization by the users expands. For example, a playlist produced by the user A and stored in a PC 10 of the user A may be transferred together with a content included in the playlist to a PC 10 of a different user B user-linked to the user A. By this, the user B can easily acquire a plurality of contents conforming to the liking of the user A who is a friend or the like and reproduce and enjoy the contents on the PC 10 of the user B.

INDUSTRIAL APPLICABILITY

The present invention can be applied to a copyright management system which copyright-manages content data among a plurality of content processing apparatus.

The invention claimed is:

1. A content processing apparatus connectable to a content reproduction apparatus which can at least reproduce content data and capable of communicating with a server apparatus which manages the content reproduction apparatus and said content processing apparatus and recording and/or reproducing content data, comprising:
    a storage device configured to store a source ID list which is a list of source IDs for permitting reproduction from among source IDs representative of providing sources of content data and to which, when said content processing apparatus is registered in a unit of a user into the server apparatus, a group ID which is applied in a unit of a user is added as a source ID for permitting the reproduction;
    a content reproduction section, implemented by a processor, that controls reproduction of content data of a reproduction object based on whether or not the source ID added to the content data of the reproduction object is included in said source ID list;
    a registration decision section that decides, when said content processing apparatus itself and the content reproduction apparatus are connected to each other, whether or not the content reproduction apparatus holds a group ID which is applied in a unit of a user through registration of the content reproduction apparatus in a unit of a user into the server apparatus;
    an ID decision section that decides, where it is decided by said registration decision section that the content reproduction apparatus holds a group ID, whether or not the group ID held by the content reproduction apparatus and the group ID in said source ID list coincide with each other;
    an ID transfer section that transfers, where it is decided by said ID decision section that the group ID held by the content reproduction apparatus and the group ID in said source ID list do not coincide with each other, a device ID acquired from the content reproduction apparatus and corresponding to the content reproduction apparatus and a terminal ID stored in said content processing apparatus and corresponding to said content processing apparatus to the server apparatus; and
    a link result reception section that receives user link completion information representing that association of first user identification information corresponding to the transferred terminal ID and second user identification information corresponding to the transferred device ID is completed from said server apparatus.

2. The content processing apparatus according to claim 1, further comprising:
    a registration requesting section that transfers, where it is decided by said registration decision section that the content reproduction apparatus do not hold the group ID, the device ID acquired from the content reproduction apparatus and corresponding to the content reproduction apparatus and the terminal ID of said content processing apparatus itself to the server apparatus to carry out registration request of the content reproduction apparatus; and
    a list management section that adds, when a registration completion notification is received from the server apparatus in response to the registration request, the group ID in said source ID list held by said content processing apparatus to a source ID list held by the content reproduction apparatus.

3. The content processing apparatus according to claim 1, further comprising:
    a content transfer section that transfers, where it is decided by said ID decision section that the group ID held by the content reproduction apparatus and the group ID in said source ID list coincide with each other, one, two or more content data stored in said content processing apparatus to the content reproduction apparatus.

4. The content processing apparatus according to claim 1, further comprising:
    a list management section that adds, when the user link completion information is received by said link result reception section, a group ID in a source ID list held by the content reproduction apparatus to said source ID list held by said content processing apparatus and add the group ID in the source ID list held by said content processing apparatus to the source ID list held by the content reproduction apparatus.

5. The content processing apparatus according to claim 1, further comprising:
a related user content acquisition section that sends a content distribution request for requesting for distribution of content data held by related users to said server apparatus and receive content data corresponding to one, two or more pieces of content identification information corresponding to one, two or more pieces of the second user identification information associated with the first identification information corresponding to said content processing apparatus from the server apparatus in response to the content distribution request.

6. The content processing apparatus according to claim 5, further comprising:
a distributable content information acquisition section that sends a distributable content accessing request for requesting for a table of distributable content data to the server apparatus and receive one, two or more pieces of content identification information corresponding to one, two or more pieces of the second user identification information associated with the first user identification information corresponding to said content processing apparatus from the server apparatus in response to the distributable content accessing request; and
a display control section that causes a display section to display the content identification information received by said distributable content information acquisition section;
said related user content acquisition section requesting for distribution of content data corresponding to content identification information selected by a user from within the content identification information displayed on said display section.

7. The content processing apparatus according to claim 1, further comprising:
a reproduction history sending section that sends a reproduction history of content data by said content reproduction section or a reproduction history of content data by the content reproduction apparatus connected to said content processing apparatus to the server apparatus;
a reproduction history acquisition section that sends a reproduction history accessing request for requesting for accessing to reproduction histories relating to related users and receive the reproduction history corresponding to one, two or more pieces of the second user identification information associated with the first user identification information corresponding to said content processing apparatus from said server apparatus in response to the reproduction history accessing request; and
a display control section that causes a display section to display the reproduction history received by said reproduction history acquisition section.

8. The content processing apparatus according to claim 1, further comprising:
a related user information acquisition section that sends a related user accessing request for requesting for accessing to the second user identification information associated with the first user identification information corresponding to said content processing apparatus to the server apparatus and receive one, two or more pieces of the second user identification information coordinated with the first user identification information corresponding to said content processing apparatus from the server apparatus in response to the reproduction history accessing request; and
a display control section that causes a display section to display the second user identification information received by said related user information acquisition section.

9. A server apparatus capable of communicating with a content processing apparatus which can record and/or reproduce content data and configured to manage said content processing apparatus and a content reproduction apparatus which can be connected to said content processing apparatus and can reproduce content data, said server apparatus comprising:
a group registration section that records a terminal ID corresponding to the content processing apparatus or a device ID corresponding to the content reproduction apparatus in an associated relationship with user identification information corresponding to a user who owns the content processing apparatus or the content reproduction apparatus into a group registration database, which is a storage device, to group-register the content processing apparatus or the content reproduction apparatus in a unit of a user;
an ID reception section that receives the device ID corresponding to the content reproduction apparatus connected to the content processing apparatus and the terminal ID corresponding to the content processing apparatus from the content processing apparatus;
a user search section, implemented by a processor, that searches for first user identification information associated with the device ID received by said ID reception section and second user identification information associated with the terminal ID received by said ID reception section from said group registration database;
a user link section that records the first user identification information and the second user identification information searched out by said user search section in an associated relationship with each other into said group registration database; and
a link result sending section that sends user link completion information representing that the association between the first and second user identification information by said user link section is completed to the content processing apparatus.

10. The server apparatus according to claim 9, wherein, when the device ID corresponding to the content reproduction apparatus and the terminal ID corresponding to the content processing apparatus are received from the content processing apparatus, said group registration section records the device ID in an associated relationship with the first user identification information associated with the terminal ID into said group management database thereby to group-register the content reproduction apparatus in an associated relationship with a user corresponding to the first user identification information and transmits a registration completion notification to the content processing apparatus.

11. The server apparatus according to claim 9, further comprising:
a content distribution section that distributes one, two or more content data to the content processing apparatus and record content identification information corresponding to the distributed content data in an associated relationship with the user identification information into said content information database; and
a related user content distribution section that searches, when a content distribution request is received from the content processing apparatus, for one, two or more pieces of the second user identification information associated with the first user identification information corresponding to the content processing apparatus from said group registration database, reads out one, two or more pieces of the content identification information corresponding to the searched out second user identification information from said distribution content information database and distributes content data corresponding to the content identification information to the content processing apparatus.

12. The server apparatus according to claim 11, further comprising:
a distributable content information providing section that searches, when a distributable content accessing request is received from the content processing apparatus, for one, two or more pieces of the second user identification information associated with the first user identification corresponding to the content processing apparatus from said group registration database, read out one, two or more pieces of content identification information corresponding to the searched out second user identification information from said distribution content database and send the read out content identification information to the content processing apparatus.

13. The server apparatus according to claim 9, further comprising:
a reproduction history management section that receives a reproduction history of content data by the content reproduction apparatus or a reproduction history of content data by the content reproduction apparatus connected to the content processing apparatus from the content processing apparatus and record the received reproduction history in an associated relationship with the user identification information corresponding to the content processing apparatus into a reproduction history database; and
a reproduction history providing section that searches, when a reproduction history accessing request is received from the content processing apparatus, for one, two or more pieces of the second user identification information associated with the first user identification information corresponding to the content processing apparatus from said group registration database, reads out the reproduction history corresponding to the searched out second user identification information from said reproduction history database and sends the read out reproduction history to the content processing apparatus.

14. The server apparatus according to claim 9, further comprising:
a related user information providing section that searches, when a related user accessing request is received from the content processing apparatus, for one, two or more pieces of the second user identification information associated with the first user identification information corresponding to the content processing apparatus from said group registration database and send the searched out second user identification information to the content processing apparatus.

15. A communication method for a content processing apparatus, which includes a storage device and a processor, connectable to a content reproduction apparatus which can at least reproduce content data and capable of communicating with a server apparatus which manages the content reproduction apparatus and the content processing apparatus and recording and/or reproducing content data, comprising:

a content reproduction step, by the content processing apparatus, of controlling reproduction of content data of a reproduction object based on whether or not a source ID list which is a list of source IDs for permitting reproduction from among source IDs representative of providing sources of content data and to which, when the content processing apparatus is registered in a unit of a user into the server apparatus, a group ID which is applied in a unit of a user is added as a source ID for permitting the reproduction includes the source ID added to the content data of the reproduction object;
a registration decision step, by the content processing apparatus, of deciding, when the content processing apparatus itself and the content reproduction apparatus are connected to each other, whether or not the content reproduction apparatus holds a group ID which is applied in a unit of a user through registration of the content reproduction apparatus in a unit of a user into the server apparatus;
an ID decision step, by the content processing apparatus, of deciding, where it is decided by the registration decision step that the content reproduction apparatus holds a group ID, whether or not the group ID held by the content reproduction apparatus and the group ID in the source ID list coincide with each other;
an ID transfer step, by the content processing apparatus, of transferring, where it is decided by the ID decision step that the group ID held by the content reproduction apparatus and the group ID in the source ID list do not coincide with each other, a device ID acquired from the content reproduction apparatus and corresponding to the content reproduction apparatus and a terminal ID stored in the content processing apparatus and corresponding to the content processing apparatus to the server apparatus; and
a link result reception step, by the content processing apparatus, of receiving user link completion information representing that association of first user identification information corresponding to the transferred terminal ID and second user identification information corresponding to the transferred device ID is completed from the server apparatus.

16. The communication method according to claim 15, further comprising:
a registration requesting step of transferring, where it is decided by the registration decision step that the content reproduction apparatus do not hold the group ID, the device ID acquired from the content reproduction apparatus and corresponding to the content reproduction apparatus and the terminal ID of the content processing apparatus itself to the server apparatus to carry out registration request of the content reproduction apparatus; and
an ID addition step of adding, when a registration completion notification is received from the server apparatus in response to the registration request, the group ID in the source ID list held by the content processing apparatus to a source ID list held by the content reproduction apparatus.

17. The communication method according to claim 15, further comprising:
a content transfer step of transferring, where it is decided by the ID decision step that the group ID held by the content reproduction apparatus and the group ID in the source ID list coincide with each other, one, two or more content data stored in the content processing apparatus to the content reproduction apparatus.

18. The communication method according to claim 15, further comprising:

an ID addition step of adding, when the user link completion information is received by the link result reception step, a group ID in a source ID list held by the content reproduction apparatus to the source ID list held by the content processing apparatus and adding the group ID in the source ID list held by the content processing apparatus to the source ID list held by the content reproduction apparatus.

19. The communication method according to claim 15, further comprising:

a content distribution requesting step of sending a content distribution request for requesting for distribution of content data held by related users to the server apparatus; and a related user content acquisition step of receiving content data corresponding to one, two or more pieces of content identification information corresponding to one, two or more pieces of the second user identification information associated with the first identification information corresponding to the content processing apparatus from the server apparatus in response to the content distribution request.

20. The communication method according to claim 19, further comprising:

a distributable content accessing requesting step of sending a distributable content accessing request for requesting for a table of distributable content data to the server apparatus;

a distributable content information acquisition step of receiving one, two or more pieces of content identification information corresponding to one, two or more pieces of the second user identification information associated with the first user identification information corresponding to the content processing apparatus from the server apparatus in response to the distributable content accessing request; and a display step of causing a display section to display the content identification information received by the distributable content information acquisition step;

the related user content acquisition step including requesting for distribution of content data corresponding to content identification information selected by a user from within the content identification information displayed on the display section.

21. The communication method according to claim 15, further comprising:

a reproduction history sending step of sending a reproduction history of content data by the content reproduction apparatus or a reproduction history of content data by the content reproduction apparatus connected to the content processing apparatus to the server apparatus;

a reproduction history accessing requesting step of sending a reproduction history accessing request for requesting for accessing to reproduction histories relating to related users;

a reproduction history acquisition step of receiving the reproduction history corresponding to one, two or more pieces of the second user identification information associated with the first user identification information corresponding to the content processing apparatus from the server apparatus in response to the reproduction history accessing request; and a display step of causing a display section to display the reproduction history received by the reproduction history acquisition step.

22. The communication method according to claim 15, further comprising:

a related user accessing requesting step of sending a related user accessing request for requesting for accessing to the second user identification information associated with the first user identification information corresponding to the content processing apparatus to the server apparatus;

a related user information acquisition step of receiving one, two or more pieces of the second user identification information coordinated with the first user identification information corresponding to the content processing apparatus from the server apparatus in response to the reproduction history accessing request; and a display step of causing a display section to display the second user identification information received by the related user information acquisition step.

23. A communication method for a server apparatus, which includes a storage device and a processor, capable of communicating with a content processing apparatus which can record and/or reproduce content data and configured to manage the content processing apparatus and a content reproduction apparatus which can be connected to the content processing apparatus and can reproduce content data, the communication method comprising:

a group registration step, by the server apparatus, of recording a terminal ID corresponding to the content processing apparatus or a device ID corresponding to the content reproduction apparatus in an associated relationship with user identification information corresponding to a user who owns the content processing apparatus or the content reproduction apparatus into a group registration database to group-register the content processing apparatus or the content reproduction apparatus in a unit of a user;

an ID reception step, by the server apparatus, of receiving the device ID corresponding to the content reproduction apparatus connected to the content processing apparatus and the terminal ID corresponding to the content processing apparatus from the content processing apparatus;

a user search step, by the server apparatus, of searching for first user identification information associated with the device ID received by the ID reception step and second user identification information associated with the terminal ID received by the ID reception step from the group registration database;

a user link step, by the server apparatus, of recording the first user identification information and the second user identification information searched out by the user search step in an associated relationship with each other into the group registration database; and a link result sending step, by the server apparatus, of send user link completion information representing that the association between the first and second user identification information by the user link step is completed to the content processing apparatus.

24. The communication method according to claim 23, wherein the group recording step includes:

a step of receiving the device ID corresponding to the content reproduction apparatus and the terminal ID corresponding to the content processing apparatus from the content processing apparatus; and a step of recording the device ID in an associated relationship with the first user identification information associated with the terminal ID into the group management database thereby to group-register the content reproduction apparatus in an associated relationship with a user corresponding to the first user identification information and transmitting a registration completion notification to the content processing apparatus.

25. The communication method according to claim 23, further comprising:
a content distribution step of distributing one, two or more content data to the content processing apparatus and recording content identification information corresponding to the distributed content data in an associated relationship with the user identification information into the content information database;
a content distribution request reception step of receiving a content distribution request from the content processing apparatus; and
a related user content distribution step of searching for one, two or more pieces of the second user identification information associated with the first user identification information corresponding to the content processing apparatus of the distribution request source from the group registration database, reading out one, two or more pieces of the content identification information corresponding to the searched out second user identification information from the distribution content information database and distributing content data corresponding to the content identification information to the content processing apparatus.

26. The communication method according to claim 25, further comprising:
a distributable content accessing request reception step of receiving a distributable content accessing request from the content processing apparatus; and
a distributable content information providing step of searching for one, two or more pieces of the second user identification information associated with the first user identification corresponding to the content processing apparatus of the accessing request source from the group registration database, reading out one, two or more pieces of content identification information corresponding to the searched out second user identification information from the distribution content database and sending the read out content identification information to the content processing apparatus.

27. The communication method according to claim 23, further comprising:
a reproduction history management step of receiving a reproduction history of content data by the content reproduction apparatus or a reproduction history of content data by the content reproduction apparatus connected to the content processing apparatus from the content processing apparatus and recording the received reproduction history in an associated relationship with the user identification information corresponding to the content processing apparatus into a reproduction history database;
a reproduction history accessing request reception step of receiving a reproduction history accessing request from the content processing apparatus; and
a reproduction history providing step of searching for one, two or more pieces of the second user identification information associated with the first user identification information corresponding to the content processing apparatus of the accessing request source from the group registration database, reading out the reproduction history corresponding to the searched out second user identification information from the reproduction history database and sending the read out reproduction history to the content processing apparatus.

28. The communication method according to claim 23, further comprising:
a related user accessing request reception step of receiving a related user accessing request from the content processing apparatus; and
a related user information providing step of searching for one, two or more pieces of the second user identification information associated with the first user identification information corresponding to the content processing apparatus from the group registration database and sending the searched out second user identification information to the content processing apparatus.

29. A non-transitory computer readable storage medium in which a computer program is stored, said computer program causing a content processing apparatus, which is connectable to a content reproduction apparatus which can at least reproduce content data and capable of communicating with a server apparatus which manages the content reproduction apparatus and the content processing apparatus and recording and/or reproducing content data, to execute:
a content reproduction process of controlling reproduction of content data of a reproduction object based on whether or not a source ID list which is a list of source IDs for permitting reproduction from among source IDs representative of providing sources of content data and to which, when the content processing apparatus is registered in a unit of a user into the server apparatus, a group ID which is applied in a unit of a user is added as a source ID for permitting the reproduction includes the source ID added to the content data of the reproduction object;
a registration decision process of deciding, when the content processing apparatus itself and the content reproduction apparatus are connected to each other, whether or not the content reproduction apparatus holds a group ID which is applied in a unit of a user through registration of the content reproduction apparatus in a unit of a user into the server apparatus;
an ID decision process of deciding, where it is decided by the registration decision process that the content reproduction apparatus holds a group ID, whether or not the group ID held by the content reproduction apparatus and the group ID in the source ID list coincide with each other;
an ID transfer process of transferring, where it is decided by the ID decision process that the group ID held by the content reproduction apparatus and the group ID in the source ID list do not coincide with each other, a device ID acquired from the content reproduction apparatus and corresponding to the content reproduction apparatus and a terminal ID stored in the content processing apparatus and corresponding to the content processing apparatus to the server apparatus; and
a link result reception process of receiving user link completion information representing that association of first user identification information corresponding to the transferred terminal ID and second user identification information corresponding to the transferred device ID is completed from the server apparatus.

30. A non-transitory computer readable storage medium in which a computer program is stored, said computer program causing a server apparatus, which is capable of communicating with a content processing apparatus which can record and/or reproduce content data and is configured to manage the content processing apparatus and a content reproduction apparatus which can be connected to the content processing apparatus and can reproduce content data, to execute:

a group registration process of recording a terminal ID corresponding to the content processing apparatus or a device ID corresponding to the content reproduction apparatus in an associated relationship with user identification information corresponding to a user who owns the content processing apparatus or the content reproduction apparatus into a group registration database to group-register the content processing apparatus or the content reproduction apparatus in a unit of a user;

an ID reception process of receiving the device ID corresponding to the content reproduction apparatus connected to the content processing apparatus and the terminal ID corresponding to the content processing apparatus from the content processing apparatus;

a user search process of searching for first user identification information associated with the device ID received by the ID reception process and second user identification information associated with the terminal ID received by the ID reception process from the group registration database;

a user link process of recording the first user identification information and the second user identification information searched out by the user search process in an associated relationship with each other into the group registration database; and a link result sending process of send user link completion information representing that the association between the first and second user identification information by the user link process is completed to the content processing apparatus.

* * * * *